United States Patent
Hashimoto et al.

(10) Patent No.: US 8,762,307 B2
(45) Date of Patent: Jun. 24, 2014

(54) CONTROL SYSTEM FOR PLANT

(75) Inventors: Eiji Hashimoto, Saitama-ken (JP); Yuji Yasui, Saitama-ken (JP); Hisao Haga, Saitama-ken (JP); Koichi Nakajima, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 317 days.

(21) Appl. No.: 13/282,086

(22) Filed: Oct. 26, 2011

(65) Prior Publication Data
US 2012/0117011 A1    May 10, 2012

(30) Foreign Application Priority Data
Nov. 8, 2010   (JP) .................. 2010-249756

(51) Int. Cl.
G06F 15/18     (2006.01)
G05B 13/02     (2006.01)
G06N 3/02      (2006.01)

(52) U.S. Cl.
CPC ............... G06N 3/02 (2013.01); G05B 13/027 (2013.01)
USPC .......................................................... 706/23

(58) Field of Classification Search
None
See application file for complete search history.

(56) References Cited

U.S. PATENT DOCUMENTS

| | | | | |
|---|---|---|---|---|
| 5,247,445 A | * | 9/1993 | Miyano et al. | 701/115 |
| 5,657,737 A | * | 8/1997 | Ishida et al. | 123/674 |
| 5,755,212 A | * | 5/1998 | Ajima | 123/674 |
| 5,915,368 A | * | 6/1999 | Ishida et al. | 123/675 |
| 6,678,640 B2 | * | 1/2004 | Ishida et al. | 702/189 |
| 6,814,067 B2 | * | 11/2004 | Yasui et al. | 123/679 |
| 7,200,449 B2 | * | 4/2007 | Yasui et al. | 700/28 |
| 7,386,388 B2 | * | 6/2008 | Akazaki et al. | 701/103 |
| 7,493,207 B2 | * | 2/2009 | Yasui et al. | 701/103 |
| 7,587,268 B2 | * | 9/2009 | Tagami et al. | 701/102 |
| 7,610,139 B2 | * | 10/2009 | Mizuno et al. | 701/102 |
| 2003/0041823 A1 | * | 3/2003 | Takemura et al. | 123/90.16 |

FOREIGN PATENT DOCUMENTS

| | | |
|---|---|---|
| JP | 2006-132429 A | 5/2006 |
| JP | 4300239 B2 | 4/2009 |

OTHER PUBLICATIONS

Hunt, K. J. et al.; "Neural Networks for Control Systems—A Survey"; 1992; Pergamon; Automatica, vol. 28, No. 6, pp. 1083-1112.*

Muller, Rainer et al.; "Engine Control using Neural Networks: A New Method in Engine Management Systems"; 1997; Meccanica 32; pp. 423-430.*

Isermann Rolf et al.; "Mechatronic Combustion Engines—from Modeling to Optimal Control"; European Journal of Control (2001)7; pp. 220-247.*

(Continued)

Primary Examiner — Stanley K Hill
(74) Attorney, Agent, or Firm — Arent Fox LLP

(57) ABSTRACT

A control system for a plant e.g. as a non-linear system, which is capable of properly suppressing interaction occurring between a plurality of control inputs and a plurality of controlled variables, thereby making it possible to properly control the controlled variables and easily design the control system. In the control system, each of a plurality of interaction suppression parameters for correcting the control inputs, respectively, such that the interaction is suppressed is calculated using a neural network constructed by using, out of the plurality of control inputs, a control input other than a control input corrected by a calculated interaction suppression parameter, as an input, and the interaction suppression parameter as an output.

5 Claims, 29 Drawing Sheets

(56) References Cited

OTHER PUBLICATIONS

Kalogirou, Soteris A.; "Artificial intelligence for the modeling and control of combustion processes: a review"; Pergamon; Progress in Energy and Combustion Science 29 (2003); pp. 515-566.*

Schoner, Hans-Peter; "Automotive mechatronics"; Elsevier; Conrol Engineering Practice 12 (2004); pp. 1343-1351.*

Ashhab, Moh'd Sami S.; "Fuel economy and torque tracking in camless engines throught optimization of neural networks"; engergy conversion and management 49 (2008); pp. 365-372.*

Isermann, Rolf; "Mechatronic systems—Innovative products with embedded control"; Control Engineering Practice 16 (2008) pp. 14-29.*

\* cited by examiner

F I G. 1 5
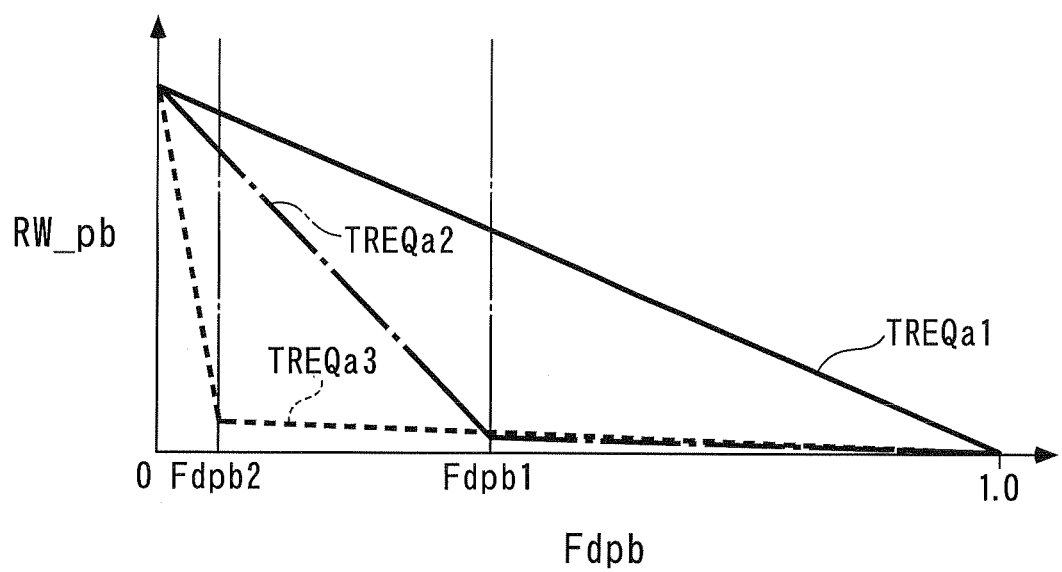

F I G. 2 9
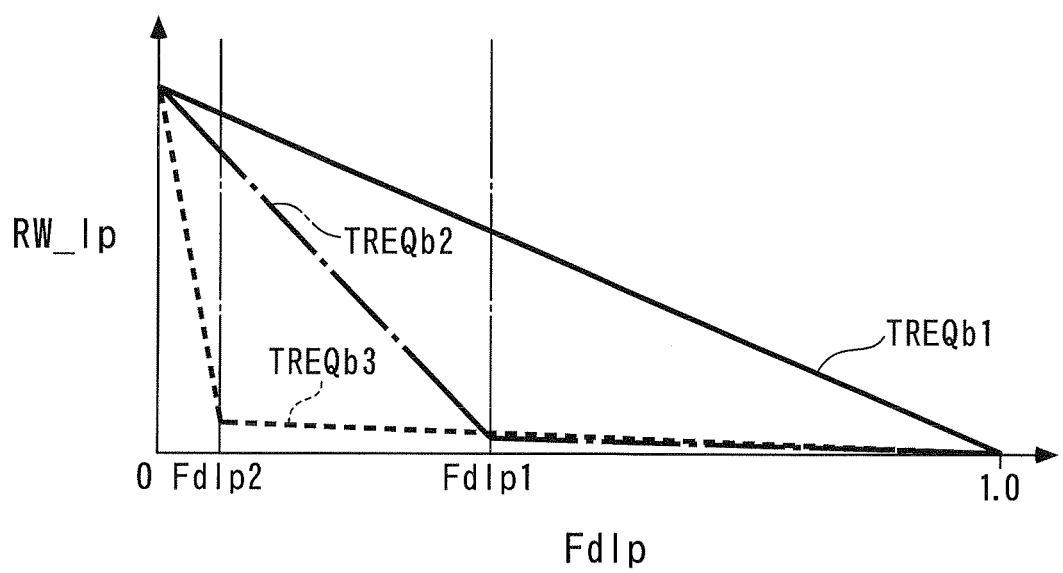

CONTROL SYSTEM FOR PLANT

BACKGROUND OF THE INVENTION

1. Field of the Invention

The present invention relates to a control system for a plant in which a plurality of controlled variables are controlled by a plurality of control inputs, respectively, and interaction occurs between the control inputs and the controlled variables.

2. Description of the Related Art

Conventionally, as a control system of this kind, one disclosed in Japanese Laid-Open Patent Publication (Kokai) No. 2006-132429 is known. An internal combustion engine to which is applied this control system is configured such that the lift of intake valves can be changed. Further, in the conventional control system, a pressure within an intake passage (hereinafter referred to as the "intake pressure") is controlled by controlling the degree of opening of a throttle valve disposed in the intake passage to a target opening thereof, and the amount of intake air drawn into the engine (hereinafter referred to as the "intake air amount") is controlled by controlling the lift of the intake valves to a target lift thereof. In this case, not only the intake pressure but also the intake air amount is changed by controlling the degree of opening of the throttle valve, and further not only the intake air amount but also the intake pressure is changed by controlling the lift of the intake valves. As is apparent from this, interaction occurs between the target opening and the target lift as control inputs, and between the intake pressure and the intake air amount as controlled variables.

To avoid this inconvenience, the conventional control system includes a non-interacting controller for suppressing the above-mentioned interaction. Further, in the conventional control system, based on a non-interacting control law (cross-controller), a system formed by combining the non-interacting controller and the engine is modeled as a linear imaginary plant with no interaction. Furthermore, based on a model equation obtained thereby, the target opening of the throttle valve and the target lift of the intake valves are calculated as non-interacting inputs capable of suppressing the interaction.

As described above, in the conventional control system, the system formed by combining the non-interacting controller and the engine is modeled as the linear imaginary plant with no interaction based on the non-interacting control law, but since the engine is a non-linear system, it is difficult to model the engine by the above-mentioned method. Further, in a case where the conventional control system is applied to a plant with stronger non-linearity than that of the engine, the plant cannot be modeled, which causes a fear that the interaction cannot be suppressed. Further, if control inputs and controlled variables are different, the manners and degrees of interaction are also different, and hence modeling equations as well are different. Therefore, it is necessary to set modeling equations for a plurality of control inputs and a plurality of controlled variables which are different from each other in the manner of interaction and the like, from the beginning, based on the non-interacting control law. This makes the design of the control system very complicated. In view of the above-mentioned point, there is room for improvement of the conventional control system.

SUMMARY OF THE INVENTION

It is an object of the present invention to provide a control system for a plant, which is capable of properly suppressing interaction occurring between a plurality of control inputs and a plurality of controlled variables, thereby making it possible to properly control the controlled variables, and can be easily designed.

To attain the above object, the present invention provides a control system for a plant in which a plurality of controlled variables are controlled by a plurality of control inputs, respectively, and interaction occurs between the plurality of control inputs and the plurality of controlled variables, comprising control input-calculating means for calculating each of the plurality of control inputs, interaction suppression parameter-calculating means for calculating a plurality of interaction suppression parameters for respectively correcting the control inputs such that the interaction is suppressed, the interaction suppression parameter-calculating means calculating each interaction suppression parameter of the plurality of interaction suppression parameters using a neural network constructed by using, out of the plurality of control inputs, control inputs other than a control input corrected by the interaction suppression parameter, as inputs, and the interaction suppression parameter as an output, and correction means for correcting each of the plurality of control inputs calculated by the control input-calculating means, based on an associated one of the calculated interaction suppression parameters.

With the configuration of this control system, interaction occurs between the control inputs and the controlled variables, and the control inputs are calculated by the control input-calculating means. Further, the interaction suppression parameters for correcting the respective control inputs such that the interaction is suppressed, are calculated by the interaction suppression parameter-calculating means, and the control inputs are corrected by the correction means based on the calculated interaction suppression parameters.

Furthermore, each of these interaction suppression parameters is calculated by using the neural network constructed by using, out of the plurality of control inputs, control inputs (hereinafter referred to as "interaction target control inputs") other than a control input corrected by the calculated interaction suppression parameter, as inputs, and the interaction suppression parameter as an output. As a consequence, the interaction suppression parameters are calculated according to the interaction target control inputs out of the control inputs, that is, according to all the control inputs interacting with the control input corrected by the interaction suppression parameter, so that it is possible to properly correct each control input such that it suppresses the interaction.

Further, the neural network has a characteristic that it can model the nonlinear system properly and easily, and hence even when the plant is a system with strong non-linearity, it is possible to properly and easily construct a neural network which is constructed by using the interaction target control inputs as inputs and the interaction suppression parameter as an output. With the above, according to the present invention, even when the plant is a nonlinear system, it is possible to properly suppress the interaction occurring between the control inputs and the controlled variables, thereby making it possible to properly control the controlled variables and easily design the control system.

Preferably, the control system further comprises target value-setting means for setting a plurality of target values that serve as respective targets of the controlled variables, wherein the control input-calculating means calculates the plurality of control inputs such that the plurality of controlled variables become equal to the plurality of target values set by the target value-setting means, respectively, the control system further comprising controlled variable-detecting means for detecting each of the plurality of controlled variables, and learning means for learning neuron parameters, which are parameters used in the neural networks, by reinforcement learning that uses rewards based on results of comparison between the detected controlled variables and the target values, such that each of the plurality of controlled variables controlled by the control inputs corrected by the interaction suppression parameters becomes equal to an associated one of the plurality of target values.

With the configuration of the preferred embodiment, the target values that become targets of the respective controlled variables are set by the target value-setting means, and the control inputs are calculated such that the controlled variables become equal to the set target values, respectively. This controls the controlled variables such that they become equal to the target values.

Further, the neuron parameters, which are parameters used in the neural networks, are learned by the learning means by the reinforcement learning that uses the rewards based on the results of comparison between the detected controlled variables and the target values, such that each of the plurality of controlled variables controlled by the control inputs corrected by the interaction suppression parameters becomes equal to an associated one of the plurality of target values. Since the control inputs are corrected based on the interaction suppression parameters calculated using the neural networks and learned as described above, it is possible to suppress the interaction more properly.

Furthermore, the reinforcement learning is used as a method of learning the neuron parameters. The reinforcement learning has a characteristic that it automatically learns the neuron parameters such that they take optimum values if they are given rewards in advance, and hence there is no need to set a teacher signal, differently from an error back-propagation method. This makes it possible to design the control system more easily. For the same reason, even when neural networks for a plurality of control inputs and a plurality of controlled variables, different from each other in the manner of interaction, are configured on a control input-by-control input and controlled variable-by-controlled variable basis, differently from the above-described conventional case, there is no need to set model equations from the beginning, which makes it possible to construct the neural networks easily. Therefore, in this case as well, the control system can be designed easily.

It is assumed that the term "detect" used in the claims and the specification is intended to encompass not only direct detection by a sensor or the like but also calculation and estimation by computation.

More preferably, the learning means learns each neuron parameter on a neural network-by-neural network basis; before the learning means learns the neuron parameter, the control input-calculating means calculates a learning target control input, which is, out of the plurality of control inputs, a control input which is corrected by an interaction suppression parameter associated with one of the neural networks, which learns the neuron parameter, with a predetermined feedback control algorithm, such that an associated one of the plurality of controlled variables detected by the controlled variable-detecting means becomes equal to an associated one of the target values, and holds a non-learning target control input, which is, out of the plurality of control inputs, a control input other than the learning target control input, at a fixed first predetermined value, the correction means stopping correction of the plurality of control inputs; and during learning of the neuron parameter, the control input-calculating means holds the learning target control input at a value calculated immediately before the start of the learning of the neuron parameter, and holds the non-learning target control input at a fixed second predetermined value different from the first predetermined value, the correction means correcting the learning target control input based on the interaction suppression parameter associated with the neural network that learns the neuron parameter, and stopping the correction based on interaction suppression parameters associated with other neural networks than the neural network, the learning means performing the reinforcement learning by using a reward based on a result of comparison between the detected controlled variable and the target value of the controlled variable, such that the controlled variable controlled by the corrected learning target control input becomes equal to the target value set immediately before the start of the learning of the neuron parameter.

With the configuration of the preferred embodiment, the neuron parameters are learned on a neural network-by-neural network basis. Further, before each neuron parameter is learned, the learning target control input, learning target control input, which is, out of the plurality of control inputs, a control input which is corrected by an interaction suppression parameter associated with one (hereinafter referred to as the "learning target neural network") of the neural networks, which learns the neuron parameter, with a predetermined feedback control algorithm, such that an associated one (hereinafter referred to as the "learning target controlled variable") of the plurality of controlled variables, which has been detected, becomes equal to an associated one of the target values. Furthermore, the non-learning target control input, which is, out of the plurality of control inputs, the other control input than the learning target control input, is held at the fixed first predetermined value, and the correction of the plurality of control inputs based on the interaction suppression parameters is stopped. This holds a controlled variable associated with the non-learning target control input (hereinafter referred to as the "non-learning target controlled variable") at a fixed value associated with the first predetermined value. Further, the learning target controlled variable is controlled by the learning target control input calculated as described above, whereby the learning target controlled variable is held in a state converged to the target value.

Then, when the learning of the neuron parameter is started, during this learning, the non-learning target control input is held at a fixed second predetermined value different from the first predetermined value, and the correction based on interaction suppression parameters associated with other neural networks than the learning target neural network is stopped. In addition, the learning target control input is held at a value calculated immediately before the start of the learning of the neuron parameter without being calculated with the above-mentioned feedback control algorithm. With the above, at the start of the learning, the learning target controlled variable held in a state converged to the target value set immediately before the start of the learning deviates from this target value. Further, as is apparent from the above-described operation, a result of comparison between the learning target controlled variable and the target value at the start of the learning excellently represents the amount of change of the learning target controlled variable caused by interaction of the non-learning target control input.

Furthermore, during the learning of the neuron parameter, the learning target control input is corrected based on the associated interaction suppression parameter, and reinforcement learning of the neuron parameter is performed using a reward based on a result of comparison between the target value set immediately before the start of the learning and the detected learning target controlled variable such that the learning target controlled variable controlled by the corrected learning target control input becomes equal to the target value. As described above, the result of comparison between the learning target controlled variable and the target value at the start of the learning excellently represents the amount of change of the learning target controlled variable caused by the interaction of the non-learning target control input. Therefore, by performing the learning, as described above, using the reward based on the result of comparison between the target value set at the start of the learning of the neuron parameter and the learning target controlled variable determined at the time, it is possible to properly learn the neuron parameter.

Preferably, the plant includes an internal combustion engine provided with a throttle valve mechanism for changing a degree of opening of a throttle valve, and a variable valve lift mechanism for changing a lift of intake valves; the plurality of control inputs are an opening control parameter for controlling the degree of opening of the throttle valve and a lift control parameter for controlling the lift of the intake valves; and the plurality of controlled variables are a pressure within an intake passage of the engine and an amount of intake air drawn into the engine.

With the configuration of the preferred embodiment, the plant includes the engine, which is a non-linear system. The control inputs are the opening control parameter for controlling the degree of opening of the throttle valve and the lift control parameter for controlling the lift of the intake valves. The controlled variables are the pressure within the intake passage of the engine and the amount of intake air drawn into the engine. As is apparent from the above description of the conventional control system, interaction occurs between the opening control parameter and the lift control parameter, and the pressure within the intake passage and the intake air amount. In contrast, according to the present invention, as is apparent from the above description of claim 1 appended hereto, in the plant including the engine as a non-linear system, it is possible to properly suppress the above-described interaction, thereby making it possible to properly control the pressure within the intake passage and the intake air amount.

Preferably, the plant includes an internal combustion engine provided with a first EGR device for recirculating part of burned gases into an intake passage as a first EGR gas, and a second EGR device for recirculating part of burned gases to a location in the intake passage closer to cylinders than the first EGR device is; the plurality of control inputs are a first EGR control parameter for controlling the first EGR device, and a second EGR control parameter for controlling the second EGR device; and wherein the plurality of controlled variables are a flow rate of the first EGR gas, and a flow rate of the second EGR gas.

With the configuration of the preferred embodiment, the plant includes the engine, which is a non-linear system. The control inputs are the first EGR control parameter for controlling the first EGR device and the second EGR control parameter for controlling the second EGR device. The controlled variables are the flow rate of the first EGR gas and the flow rate of the second EGR gas. Since the first and second EGR gases are recirculated into the same intake passage, the control of the first EGR device changes not only the flow rate of the first EGR gas but also that of the second EGR gas, and further the control of the second EGR device changes not only the flow rate of the second EGR gas but also that of the first EGR gas. As is apparent from this, interaction occurs between the first and second EGR control parameters as control inputs and the flow rates of the first and second EGR gases as control variables.

According to the present invention, however, as is apparent from the above description of claim 1 appended hereto, in the plant including the engine as a non-linear system, it is possible to properly suppress the above-described interaction, thereby making it possible to properly control the flow rates of the first and second EGR gases.

The above and other objects, features, and advantages of the present invention will become more apparent from the following detailed description taken in conjunction with the accompanying drawings.

BRIEF DESCRIPTION OF THE DRAWINGS

FIG. 15 is a diagram showing an example of a map for use in the second learning process shown in FIG. 14;

FIG. 29 is a diagram showing an example of a map for use in the second learning process shown in FIG. 28.

DETAILED DESCRIPTION OF PREFERRED EMBODIMENTS

Figure 1:
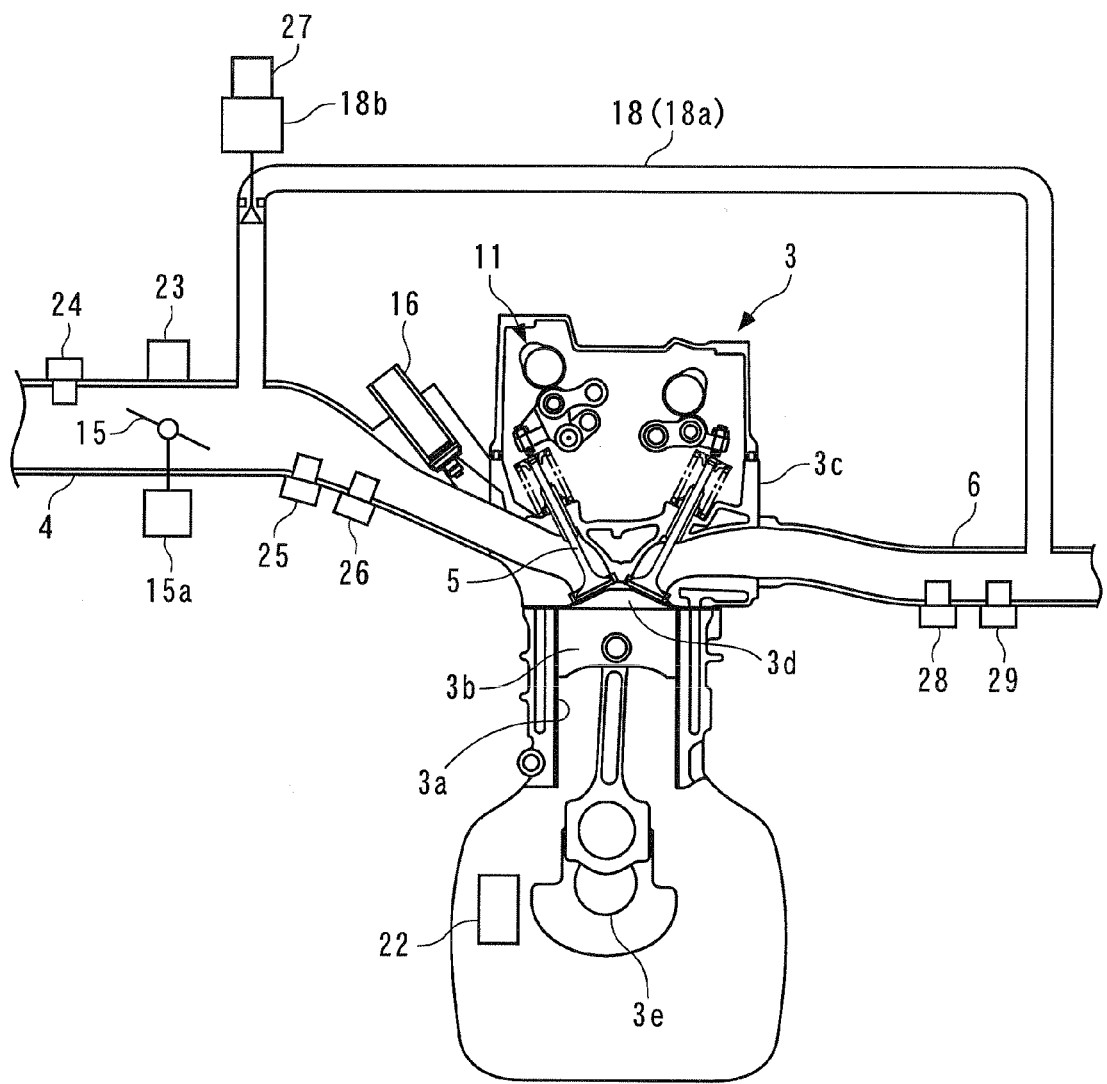
FIG. 1 is a schematic diagram of an internal combustion engine to which is applied a control system according to a first embodiment of the present invention.
Figure 2:
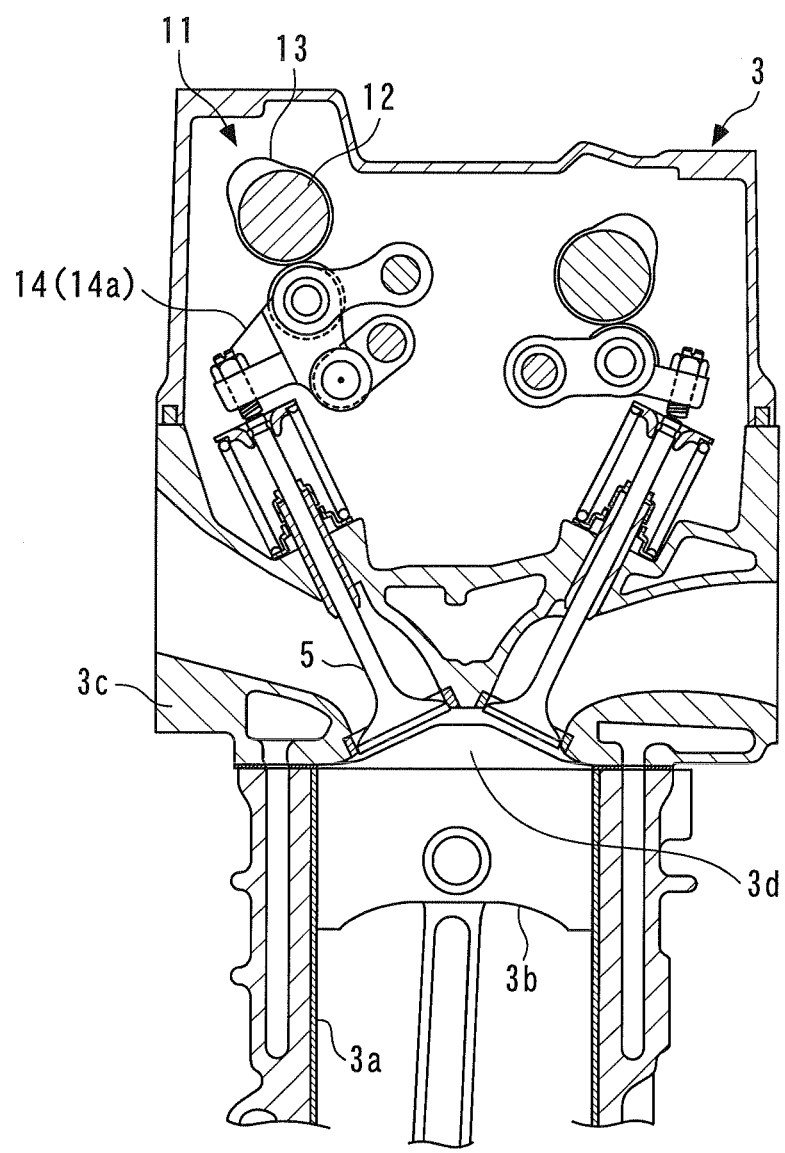
FIG. 2 is a partial enlarged view of FIG. 1.

Hereafter, a control system according to a first embodiment of the invention will be described in detail with reference to drawings. Referring to FIGS. 1 and 2, an internal combustion engine (hereinafter simply referred to as the "engine") 3 is a gasoline engine installed on a vehicle, not shown, as a motive power source. The engine 3 is equipped with four cylinders 3a (only one of which is shown), an intake passage 4 for introducing intake air into the cylinders 3a, intake valves 5 (only one of which is shown) provided for the respective cylinders 3a, and an intake valve-actuating mechanism 11 for actuating the intake valves 5. Each cylinder 3a of the engine 3 has a combustion chamber 3d formed between a piston 3b in the cylinder 3a and a cylinder head 3c (only one of each of which is shown).

The above-mentioned intake passage 4 branches into four branch portions from the downstream side of an intake manifold thereof. The four branch portions are connected to the cylinder heads 3c, and communicate with the four cylinders 3a, respectively. Further, the intake valve-actuating mechanism 11 comprises an intake cam shaft 12, intake cams 13, and a variable valve lift mechanism 14. The intake cam shaft 12 is connected to a crankshaft 3e of the engine 3 via a timing belt (not shown). This causes the intake cam shaft 12 to rotate once whenever the crankshaft 3e rotates twice. The intake cams 13 are integrally formed on the intake cam shaft 12, for the cylinders 3a, respectively.

The above-mentioned variable valve lift mechanism 14 is configured to be capable of changing the amount of intake air drawn into the engine 3 (hereinafter referred to as the "intake air amount") by opening and closing the intake valves 5 along with rotation of the intake cam 13 and changing the lift of the intake valves 5 (hereinafter referred to as the "valve lift"). In the present embodiment, the term "valve lift" is intended to mean the maximum lift of the intake valves 5. Further, the variable valve lift mechanism 14 comprises rocker arm mechanisms 14a of a four joint link type, provided for the respective cylinders 3a, and a lift actuator 14b (see FIG. 3) simultaneously actuating these rocker arm mechanisms 14a. The variable valve lift mechanism 14 is configured similarly to a variable valve lift mechanism disclosed in Japanese Patent No. 4300239 proposed by the present assignee, and hence description of the arrangement thereof is omitted. Hereinafter, a brief description will be given of an operation executed when the valve lift is changed.

In the variable valve lift mechanism 14, the lift actuator 14b comprises a short arm (not shown) connected to the rocker arm mechanisms 14a. The short arm is pivotally moved to drive the rocker arm mechanisms 14a, whereby the valve lift is steplessly changed. In this case, by inputting a lift control input Ulift from an ECU 2, referred to hereinafter, of the control system 1 to the lift actuator 14b, a pivot angle through which the short arm is pivotally moved is changed to change the valve lift, whereby the intake air amount is controlled.

Figure 3:
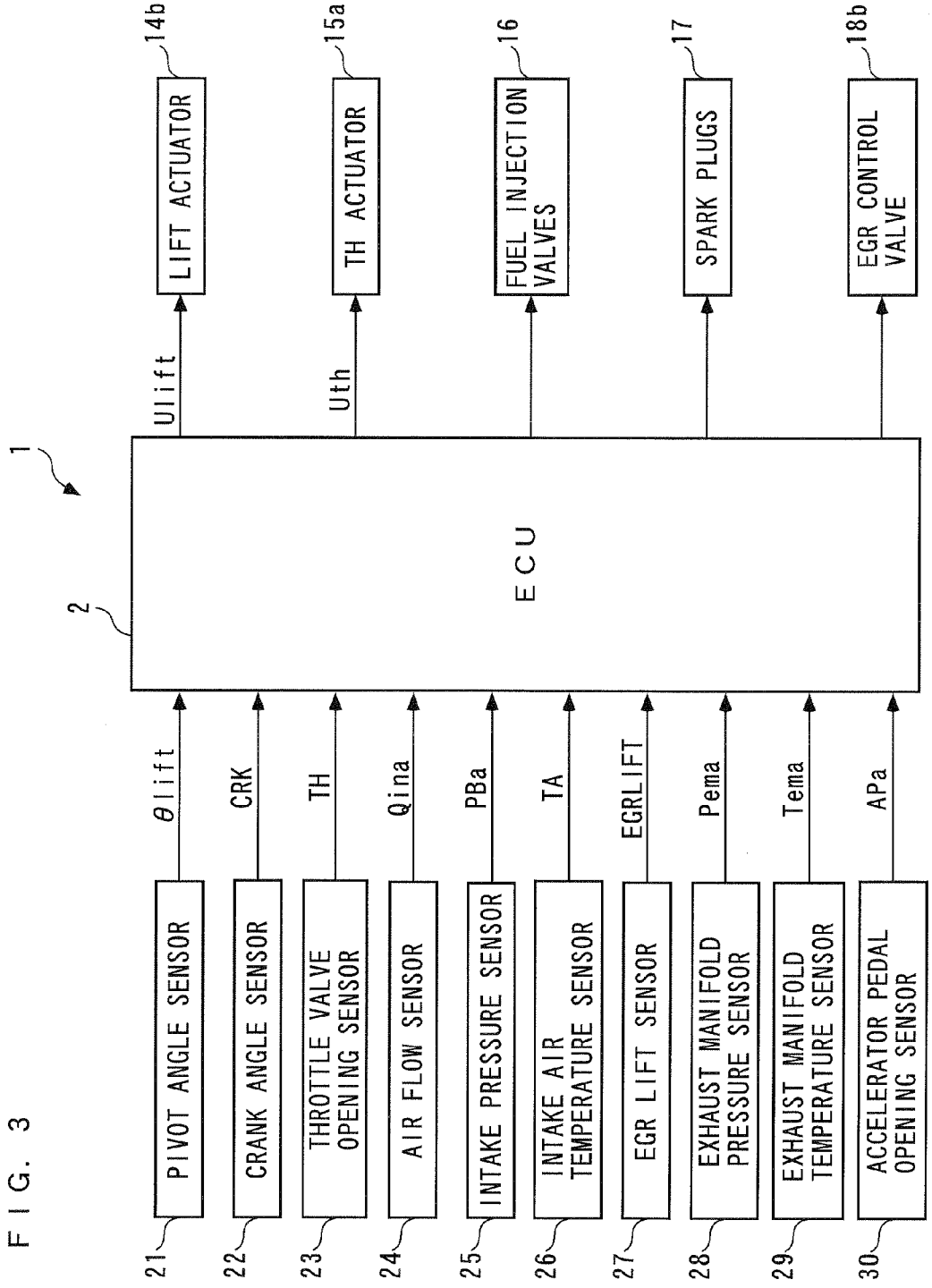
FIG. 3 is a block diagram of an ECU and the like of the control system according to the first embodiment.

Further, the engine 3 is provided with a pivot angle sensor 21 (see FIG. 3). The pivot angle sensor 21 detects the pivot angle, denoted by θ lift, of the short arm of the lift actuator 14b, and delivers a signal indicative of the detected pivot angle θ lift to the ECU 2. As described above, since the valve lift is changed according to the pivot angle θ lift of the short arm, the ECU 2 calculates the valve lift, denoted by Lift, based on the pivot angle θ lift.

The engine 3 is provided with a crank angle sensor 22. The crank angle sensor 22 is formed by a magnet rotor and an MRE pickup, and delivers a CRKa signal, which is a pulse signal, to the ECU 2 along with rotation of the crankshaft 3e. Each pulse of the CRKa signal is generated whenever the crankshaft rotates through a predetermined crank angle. The ECU 2 calculates a rotational speed NEa of the engine 3 (hereinafter referred to as the "engine speed NEa") based on the CRKa signal.

Further, the above-mentioned intake passage 4 is provided with a throttle valve 15. The throttle valve 15 is implemented by a butterfly valve, and is connected to a TH actuator 15a formed by an electric motor. The degree of opening of the throttle valve 15 (hereinafter referred to as the "throttle valve opening") is changed by inputting a throttle control input Uth, referred to hereinafter, from the ECU 2 to the TH actuator 15a, whereby a pressure within the intake passage 4 (hereinafter referred to as the "intake pressure") on the downstream side of the throttle valve 15 is controlled. Furthermore, a throttle valve opening sensor 23, which is implemented e.g. by a potentiometer, detects the throttle valve opening, denoted by TH, to deliver a signal indicative of the detected throttle valve opening TH to the ECU 2.

Further, the intake passage 4 is provided with an air flow sensor 24 at a location upstream of the throttle valve 15. The air flow sensor 24 is formed e.g. by a hot-wire air flow meter, and detects a flow rate Qina of air passing through the intake passage 4 (hereinafter referred to as the "air flow rate Qina"), to deliver a signal indicative of the detected air flow rate Qina to the ECU 2.

Further, the intake passage 4 is provided with an intake pressure sensor 25, an intake air temperature sensor 26, and fuel injection valves 16 at respective locations downstream of the throttle valve 15. The fuel injection valves 16 are provided for the respective cylinders 3a, for injecting fuel into the intake passage 4 under the control of the ECU 2. In this case, the amount of fuel injected from each fuel injection valve 16 (hereinafter referred to as the "fuel injection amount"), that is, the valve-opening time period of the fuel injection valve 16 is controlled based on a fuel injection amount TOUTa calculated by the ECU 2.

The above-mentioned intake pressure sensor 25 is implemented e.g. by a semiconductor pressure sensor, and detects the intake pressure PBa as an absolute pressure, to deliver a signal indicative of the detected intake pressure PBa to the ECU 2. Further, the intake air temperature sensor 26 is implemented e.g. by a thermistor, and detects a temperature TA of air flowing through the intake passage 4 (hereinafter referred to as the "intake air temperature TA"), to deliver a signal indicative of the detected intake air temperature TA to the ECU 2. The ECU 2 calculates an intake air amount Gcyla of air actually drawn into the engine 3 based on the calculated engine speed NEa, the detected air flow rate Qina, the intake pressure PBa, and the intake air temperature TA. This calculation method is the same as disclosed by the present assignee in Japanese Laid-Open Patent Publication (Kokai) No. 2006-132429, and hence detailed description thereof is omitted.

Further, spark plugs 17 (see FIG. 3) are mounted through the respective cylinder heads 3c of the engine 3. Each spark plug 17 causes a spark discharge under the control of the ECU 2, thereby burning a mixture within the combustion chamber 3d.

Furthermore, the engine 3 is provided with an EGR device 18 that includes an EGR passage 18a and an EGR control valve 18b. The EGR passage 18a is connected to the downstream side of the throttle valve 15 in the intake passage 4, and an exhaust passage 6. Part of exhaust gases exhausted from the engine 3 is recirculated into the intake passage 4 as EGR gas via the EGR passage 18a, whereby combustion temperature in the combustion chamber 3d of the engine 3 is lowered, resulting in a reduced amount of NOx contained in the exhaust gases.

Further, the EGR control valve 18b is implemented by a linear solenoid valve, and the valve lift amount thereof is controlled by the ECU 2 to thereby open and close the EGR passage 18a, whereby the flow rate of EGR gas recirculated into the intake passage 4 (hereinafter referred to as the "EGR gas flow rate") is controlled. Furthermore, an EGR lift sensor 27 detects an actual valve lift amount EGRLIFT of the EGR control valve 18b (hereinafter referred to as the "EGR lift amount EGRLIFT") and delivers a signal indicative of the detected EGR lift amount EGRLIFT to the ECU 2.

Further, the exhaust passage 6 branches into four branch portions from the downstream side of an exhaust manifold thereof. The four branch portions are connected to the cylinder heads 3c, and communicate with the four cylinders 3a, respectively. Furthermore, an exhaust manifold pressure sensor 28 and an exhaust manifold temperature sensor 29 are provided at respective locations of the exhaust passage 6 in the vicinity of a collector of the branch portions. The exhaust manifold pressure sensor 28 detects a pressure Pema of exhaust gases flowing through the collector (hereinafter referred to as the "exhaust manifold pressure Pema"), and delivers a signal indicative of the detected exhaust manifold pressure Pema to the ECU 2. Further, the exhaust manifold temperature sensor 29 detects a temperature Tema of exhaust gases flowing through the connecting portion of the exhaust passage 6 (hereinafter referred to as the "exhaust manifold temperature Tema"), and delivers a signal indicative of the detected exhaust manifold temperature Tema to the ECU 2.

Further, an accelerator pedal opening sensor 30 detects an operation amount APa of an accelerator pedal (not shown) of the vehicle (hereinafter referred to as the "accelerator pedal opening APa"), and delivers a signal indicative of the detected accelerator pedal opening APa to the ECU 2.

The ECU 2 is implemented by a microcomputer comprising a CPU, a RAM, a ROM, and an I/O interface (none of which are specifically shown). The ECU 2 controls the engine 3 based on the detection signals from the above-mentioned various types of sensors 21 to 30, according to control programs stored in the ROM.

Figure 4:
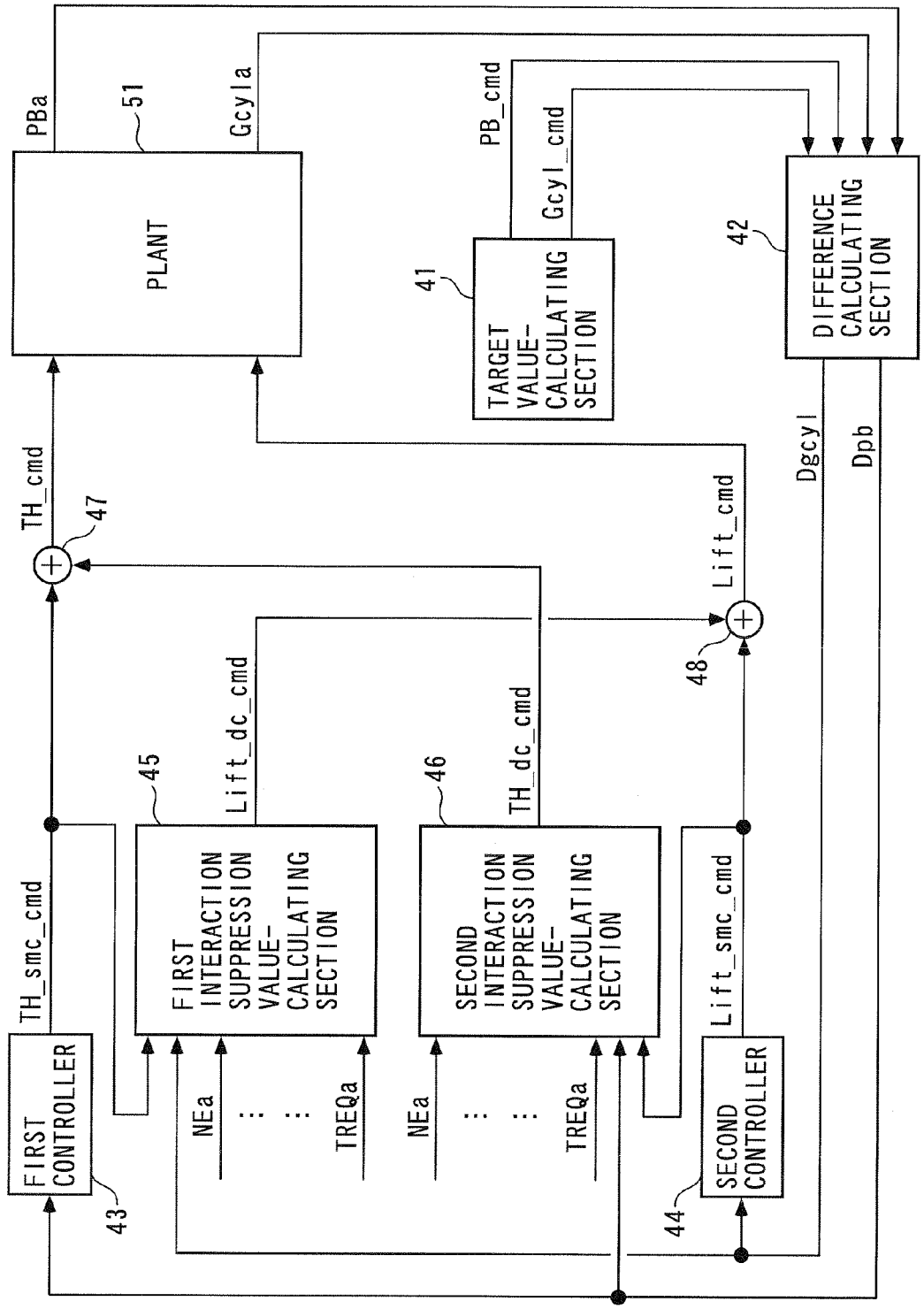
FIG. 4 is a block diagram of a plant control unit provided in the FIG. 3 ECU together with a plant.

Specifically, the ECU 2 includes a plant control unit, which, as shown in FIG. 4, comprises a target value-calculating section 41, a difference-calculating section 42, a first controller 43, a second controller 44, a first interaction suppression value-calculating section 45, a second interaction suppression value-calculating section 46, a first adder 47, and a second adder 48. The plant control unit controls a plant 51 including the engine 3.

Figure 5:
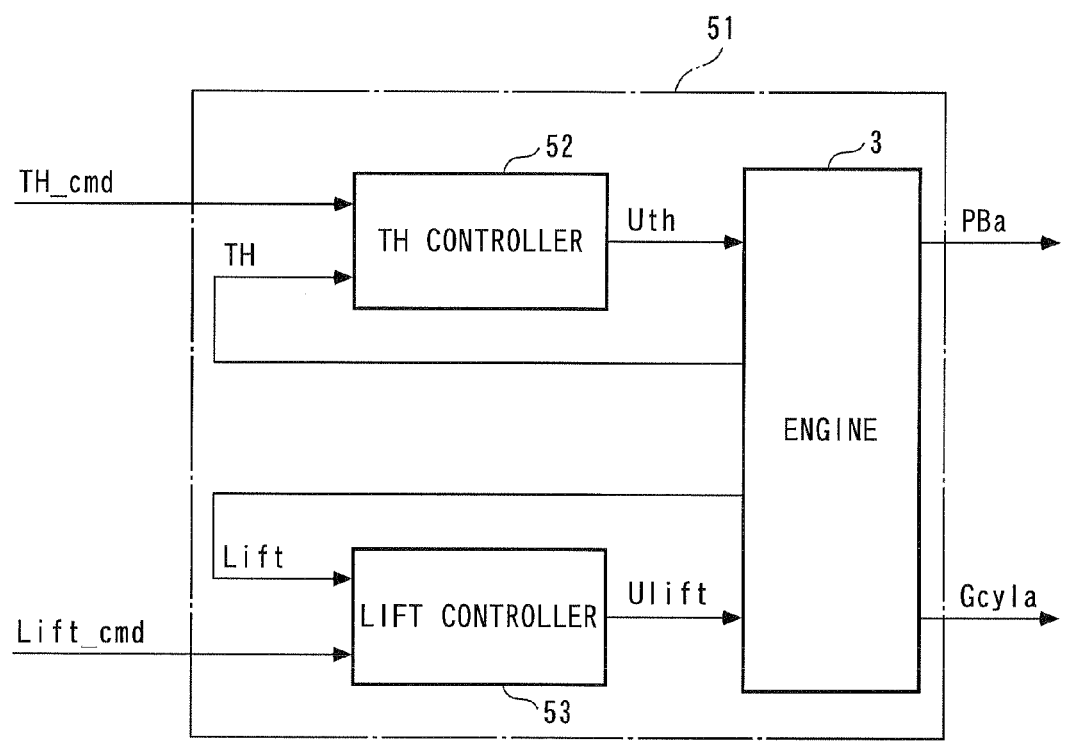
FIG. 5 is a block diagram of the plant appearing in FIG. 4.

As shown in FIG. 5, the plant 51 is defined as a system in which a target throttle valve opening TH_cmd and a target valve lift Lift_cmd are set as control inputs, and the intake pressure PBa and the intake air amount Gcyla are set as controlled variables. Specifically, the plant 51 is formed by a TH controller 52, a lift controller 53, the engine 3, and so forth. The TH controller 52 and the lift controller 53 are implemented by the ECU 2. The above-mentioned target throttle valve opening TH_cmd and target valve lift Lift_cmd are the target values of the throttle valve opening TH and the valve lift Lift, respectively, and are calculated as described hereinafter.

Further, the detected throttle valve opening TH and the target throttle valve opening TH_cmd are input to the TH controller 52. The TH controller 52 calculates the above-mentioned throttle control input Uth according to the input throttle valve opening TH and target throttle valve opening TH_cmd, with a predetermined feedback control algorithm, e.g. a target value filter-type two-degree-of-freedom response-specifying control algorithm, and delivers the throttle control input Uth to the TH actuator 15a. This controls the throttle valve opening TH such that it converges to the target throttle valve opening TH_cmd. The target value filter-type two-degree-of-freedom response-specifying control algorithm is the same as disclosed by the present assignee in Japanese Laid-Open Patent Publication (Kokai) No. 2006-132429, and hence detailed description thereof is omitted.

Further, the calculated valve lift Lift and the target valve lift Lift_cmd are input to the lift controller 53. The lift controller 53 calculates the above-mentioned lift control input Ulift according to the input valve lift Lift and target valve lift Lift_cmd, with a predetermined feedback control algorithm, e.g. the above-mentioned target value filter-type two-degree-of-freedom response-specifying control algorithm, and delivers the lift control input Ulift to the lift actuator 14b. This controls the valve lift Lift such that it converges to the target valve lift Lift_cmd.

In the plant 51 configured as above, as the throttle valve opening TH is controlled such that it converges to the target throttle valve opening TH_cmd, the intake pressure PBa changes, and the intake air amount Gcyla also changes. Further, as the input valve lift Lift is controlled such that it converges to the target valve lift Lift_cmd, the intake air amount Gcyla changes, and the intake pressure PBa also changes. As described above, the plant 51 forms an interacting system in which interaction occurs between the target throttle valve opening TH_cmd and the target valve lift Lift_cmd as control inputs and between the intake pressure PBa and the intake air amount Gcyla as controlled variables.

Therefore, the plant control unit shown in FIG. 4 calculates the target throttle valve opening TH_cmd and the target valve lift Lift_cmd as such control inputs that will make it possible to properly control the intake pressure PBa and the intake air amount Gcyla, respectively, while suppressing the above-mentioned interaction. Hereinafter, a detailed description will be given of the aforementioned target value-calculating section 41 and so forth forming the plant control unit.

The target value-calculating section 41 calculates a target intake pressure PB_cmd and a target intake air amount Gcyl_cmd by searching predetermined first and second maps (neither of which is shown) according to the calculated engine speed NEa and a demanded torque TREQa, respectively, and delivers the calculated target intake pressure PB_cmd and target intake air amount Gcyl_cmd to the difference-calculating section 42. The target intake pressure PB_cmd and the target intake air amount Gcyl_cmd are the respective target values of the intake pressure PBa and the intake air amount Gcyla. Further, the demanded torque TREQa is a torque demanded of the engine 3, and is calculated by searching a predetermined map (not shown) according to the engine speed NEa and the detected accelerator pedal opening APa.

To the difference-calculating section 42 are input not only the above-mentioned target intake pressure PB_cmd and target intake air amount Gcyl_cmd but also the intake pressure PBa and the calculated intake air amount Gcyla. The difference-calculating section 42 calculates the difference between the target intake pressure PB_cmd and the intake pressure PBa as an intake pressure difference Dpb, and calculates the difference between the target intake air amount Gcyl_cmd and the intake air amount Gcyla as an intake air amount difference Dgcyl. Further, the calculated intake pressure difference Dpb is output to the first controller 43 and the second interaction suppression value-calculating section 46, and the calculated intake air amount difference Dgcyl is output to the second controller 44 and the first interaction suppression value-calculating section 45.

The first controller 43 calculates a provisional value TH_smc_cmd of the target throttle valve opening according to the input intake pressure difference Dpb with a predetermined feedback control algorithm, e.g. a response-specifying control algorithm. As a consequence, the provisional value TH_smc_cmd is calculated as such a value that will cause the intake pressure PBa to converge to the target intake pressure PB_cmd. Further, the calculated provisional value TH_smc_cmd is output to the first interaction suppression value-calculating section 45 and the first adder 47. The response-specifying control algorithm is the same as disclosed by the present assignee in Japanese Laid-Open Patent Publication (Kokai) No. 2006-132429, and hence detailed description thereof is omitted.

The second controller 44 calculates a provisional value Lift_smc_cmd of the target valve lift according to the input intake air amount difference Dgcyl, with a predetermined feedback control algorithm, e.g. the above-mentioned response-specifying control algorithm. As a consequence, the provisional value Lift_smc_cmd is calculated as such a value that causes the intake air amount Gcyla to converge to the target intake air amount Gcyl_cmd. Further, the calculated provisional value Lift_smc_cmd is output to the second interaction suppression value-calculating section 46 and the second adder 48.

The first and second interaction suppression value-calculating sections 45 and 46 calculate a first interaction suppression value Lift_dc_cmd and a second interaction suppression value TH_dc_cmd, respectively, by using neural networks. The first interaction suppression value Lift_dc_cmd is a parameter for correcting the target valve lift Lift_cmd so as to suppress interaction of the target throttle valve opening TH_cmd with the intake air amount Gcyla. Further, the second interaction suppression value TH_dc_cmd is a parameter for correcting the target throttle valve opening TH_cmd so as to suppress interaction of the target valve lift Lift_cmd with the intake pressure PBa.

Figure 6:
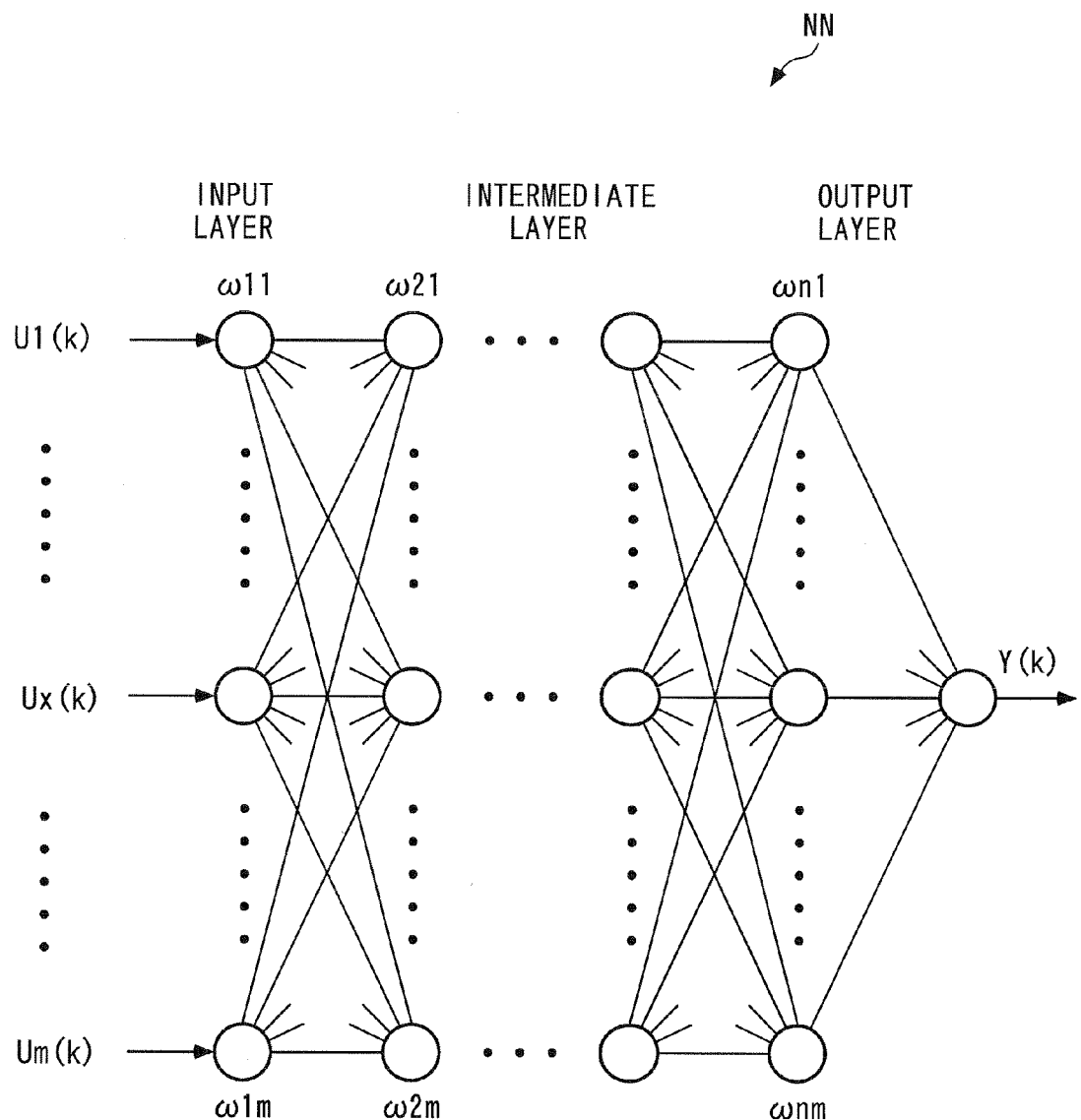
FIG. 6 is a schematic diagram of a hierarchical neural network used in a first interaction suppression value-calculating section and a second interaction suppression value-calculating section.

Each of the neural networks employed by the first and second interaction suppression value-calculating sections 45 and 46 is a three-layered hierarchical neural network NN shown in FIG. 6, and has an input layer comprising m (m is an integer not smaller than 2) neurons (only three of which are shown), an intermediate layer comprising m×(n−1) (n is an integer not smaller than 2) neurons (only six of which are shown), and an output layer comprising m+1 neurons.

In the neural network NN, an input U is defined as expressed by the following equation (1). Further, in the input layer, a value V1j is calculated based on the input U assuming that j=1 to m, by the following equations (2) to (4), and is output to the intermediate layer.

$$U(k) = [U1(k), U2(k), \ldots Um(k)]^T \quad (1)$$

$$Tlj(k) = Uj(k) \quad (2)$$

$$Vlj(k) = f(Tlj(k)) \quad (3)$$

$$f(x) = \frac{1}{1+e^{-\beta x}} + \varepsilon \quad (4)$$

In the above equation (3), f represents a sigmoid function, and is defined by the above equation (4). In the equation (4), $\beta$ represents a slope gain of the sigmoid function, and $\varepsilon$ represents an offset value of the sigmoid function. Further, in the above equations (1) to (3) and equations described hereinafter, data with a symbol (k) indicates that it is discrete data repeatedly sampled or calculated at a predetermined control period $\Delta T$ (e.g. 10 msec in the present embodiment). The symbol k (k is a positive integer) indicates a position in the sequence of sampling or calculating cycles of respective discrete data. In this case, discrete data with the symbol (k) is a current value of the discrete data, and discrete data with a symbol (k−1) is an immediately preceding value of the discrete data. Further, in the following description, the symbol (k) indicating that discrete data therewith is a current value of the discrete data is omitted as deemed appropriate.

Further, in the intermediate layer, a value Vij is calculated based on the input value V1j, assuming that i=2 to n, by the following equations (5) and (6), and is output to the output layer. In the equation (5), $\omega$ represents a weighting factor.

$$Tij(k) = \sum_{N=1}^{m} \omega i - 1N \cdot Vi - 1N(k) \quad (5)$$

$$Vij(k) = f(Tij(k)) \quad (6)$$

Further, in the output layer, an output Y is calculated based on the input value Vij by the following equations (7) to (9):

$$Tnj(k) = \sum_{N=1}^{m} \omega nN \cdot VnN(k) \quad (7)$$

$$Y(k) = g(Tnj(k)) \quad (8)$$

$$g(x) = \frac{\alpha}{1+e^{-\gamma x}} + \delta \quad (9)$$

In the above equation (8), g represents a sigmoid function, and is defined by the above equation (9). In the equation (9), $\alpha$ represents an output gain of the sigmoid function, $\gamma$ represents a slope gain of the sigmoid function, and $\delta$ represents an offset value of the sigmoid function.

Figure 7:
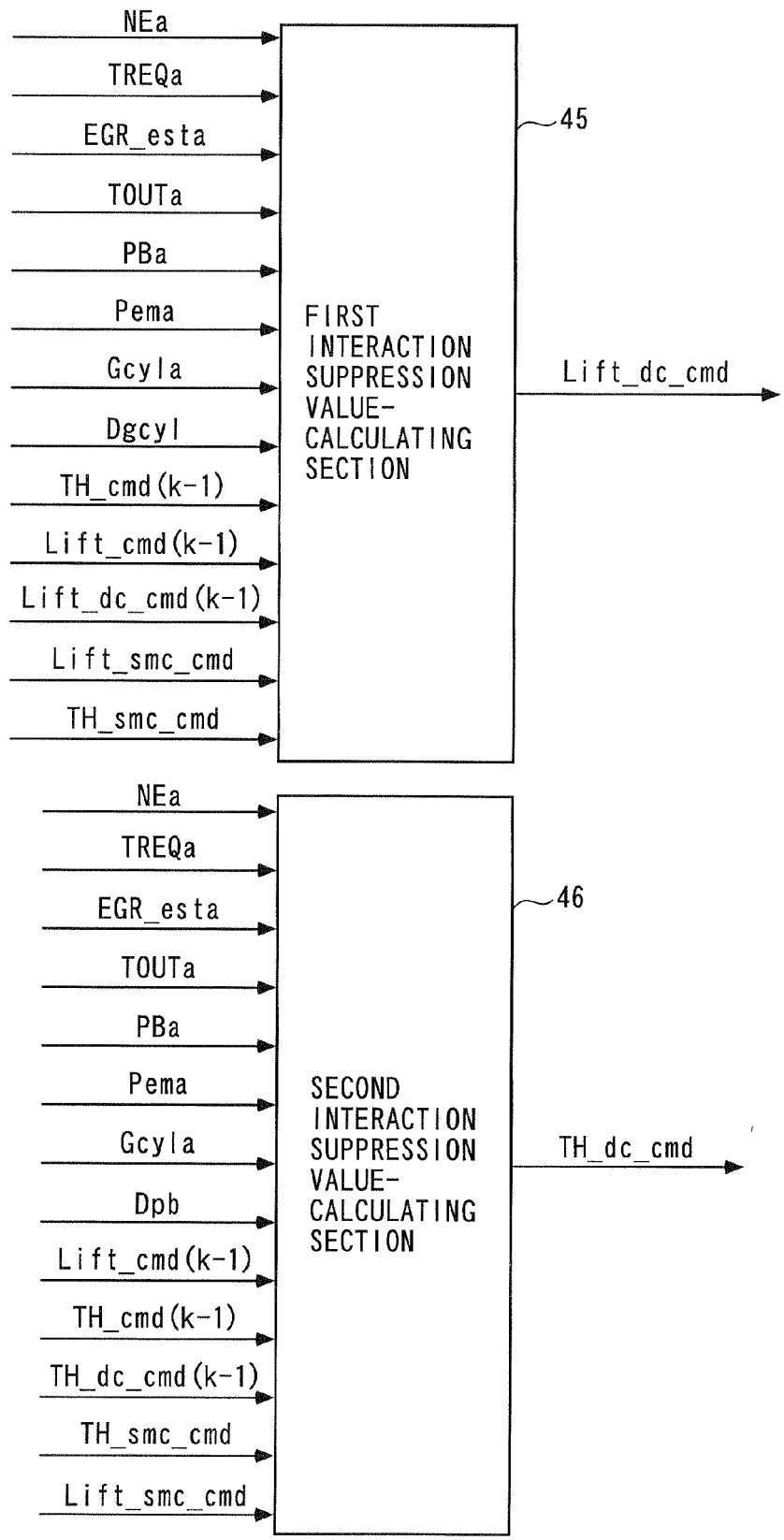
FIG. 7 is a block diagram of the first and second interaction suppression value-calculating sections appearing in FIG. 4.

More specifically, as shown in FIG. 7, not only the intake air amount difference Dgcyl and the provisional value TH_smc_cmd but also operating condition parameters indicative of the operating conditions of the engine 3, and so forth, are input to the first interaction suppression value-calculating section 45. The operating condition parameters include the engine speed NEa, the demanded torque TREQa, an estimated EGR ratio EGR_esta, the fuel injection amount TOUTa, the intake pressure PBa, the detected exhaust manifold pressure Pema, the intake air amount difference Dgcyl, and the like. Further, the immediately preceding value TH_cmd(k−1) of the target throttle valve opening, the immediately preceding value Lift_cmd(k−1) of the target valve lift, the immediately preceding value Lift_dc_cmd(k−1) of the first interaction suppression value, and the provisional value Lift_smc_cmd of the target valve lift are input to the first interaction suppression value-calculating section 45.

The above-mentioned estimated EGR ratio EGR_esta is an estimated value of a ratio of an amount of EGR gases to the intake air amount Gcyla (amount of fresh air+EGR gases) drawn into the engine 3. Specifically, the estimated EGR ratio EGR_esta is calculated as follows: The flow rate of EGR gases actually drawn into the engine 3 is calculated using a physical equation based on a nozzle equation in which the EGR control valve 18b is regarded as a nozzle, according to the intake pressure PBa, the detected exhaust manifold pressure Pema, the EGR lift amount EGRLIFT, and the exhaust manifold temperature Tema. Then, the estimated EGR ratio EGR_esta is calculated by dividing the calculated EGR gas flow rate by the intake air amount Gcyla. The physical equation is the same as disclosed by the present assignee in Japanese Laid-Open Patent Publication (Kokai) No. 2010-137132, and hence detailed description thereof is omitted.

The first interaction suppression value-calculating section 45 calculates the first interaction suppression value Lift_dc_cmd according to the above-mentioned input parameters, using the same three-layered hierarchical neural network as shown in FIG. 6, as follows: First, in the input layer, a value Va1j is calculated using the parameters, such as the engine speed NEa, as inputs Ua by the following equations (10) to (13), and is output to the intermediate layer.

$$Ua(k) = [Ua1(k), Ua2(k), \ldots Uam(k)]^T \quad (10)$$
$$= [NEa(k), TREQa(k), \ldots TH\_smc\_cmd(k)]^T$$

$$Talj(k) = Uaj(k) \quad (11)$$

$$Valj(k) = fa(Talj(k)) \quad (12)$$

$$fa(x) = \frac{1}{1 + e^{-\beta ax}} + \varepsilon a \quad (13)$$

In the above equation (12), fa represents a sigmoid function defined by the above equation (13). In the equation (13), βa represents a slope gain of the sigmoid function, and εa represents an offset value of the sigmoid function. The values βa and εa are set to predetermined values determined empirically e.g. by experiment.

In the intermediate layer, a value Vaij is calculated based on the input value Va1j, assuming that i=2 to n, by the following equations (14) and (15), and is output to the output layer. In the equation (14), ωa represents a weighting factor, and is learned and set by a learning section 61, referred to hereinafter.

$$Taij(k) = \sum_{N=1}^{m} \omega ai - 1N \cdot Vai - 1N(k) \quad (14)$$

$$Vaij(k) = fa(Taij(k)) \quad (15)$$

Further, in the output layer, an output Ya is calculated based on the input value Vaij by the following equations (16) to (18):

$$Tanj(k) = \sum_{N=1}^{m} \omega anN \cdot VanN(k) \quad (16)$$

$$Ya(k) = ga(Tanj(k)) \quad (17)$$

$$ga(x) = \frac{\alpha a}{1 + e^{-\gamma ax}} + \delta a \quad (18)$$

In the above equation (17), ga represents a sigmoid function defined by the above equation (18). In the equation (18), αa represents an output gain of the sigmoid function, γa represents a slope gain of the sigmoid function, and δa represents an offset value of the sigmoid function. The values αa, γa, and δa are set to predetermined values determined empirically e.g. by experiment.

Further, the calculated output Ya as the first interaction suppression value Lift_dc_cmd, and is output to the second adder 48.

Furthermore, as shown in FIG. 7, not only the above-mentioned intake pressure difference Dpb and provisional value Lift_smc_cmd but also operating condition parameters indicative of the operating conditions of the engine 3 and so forth are input to the second interaction suppression value-calculating section 46. Similarly to the first interaction suppression value-calculating section 45, these operating condition parameters include the engine speed NEa, the demanded torque TREQa, the estimated EGR ratio EGR_esta, the fuel injection amount TOUTa, the intake pressure PBa, the detected exhaust manifold pressure Pema, the intake air amount Gcyla, and the like. Further, the immediately preceding value Lift_cmd(k−1) of the target valve lift, the immediately preceding value TH_cmd(k−1) of the target throttle valve opening, the immediately preceding value TH_dc_cmd(k−1) of the second interaction suppression value, and the provisional value TH_smc_cmd of the target throttle valve opening are input to the second interaction suppression value-calculating section 46.

The second interaction suppression value-calculating section 46 calculates the second interaction suppression value TH_dc_cmd according to the above-mentioned input parameters, using the same three-layered hierarchical neural network as shown in FIG. 6, as follows: First, in the input layer, a value Vb1j is calculated using a plurality of parameters, such as the engine speed NEa, as inputs Ub, by the following equations (19) to (22), and is output to the intermediate layer.

$$Ub(k) = [Ub1(k), Ub2(k), \ldots Ubm(k)]^T \quad (19)$$
$$= [NEa(k), TREQa(k), \ldots Lift\_smc\_cmd(k)]^T$$

$$Tblj(k) = Ubj(k) \quad (20)$$

$$Vblj(k) = fb(Tblj(k)) \quad (21)$$

$$fb(x) = \frac{1}{1 + e^{-\beta bx}} + \varepsilon b \quad (22)$$

In the above equation (21), fb represents a sigmoid function defined by the above equation (22). In the equation (22), βb represents a slope gain of the sigmoid function, and εb represents an offset value of the sigmoid function. The values βb and εb are set to predetermined values determined empirically e.g. by experiment.

In the intermediate layer, a value Vbij is calculated based on the input value Vb1j, assuming that i=2 to n, by the following equations (23) and (24), and is output to the output layer. In the equation (23), ωb represents a weighting factor, and is learned and set by the learning section 61.

$$Tbij(k) = \sum_{N=1}^{m} \omega bi - 1N \cdot Vbi - 1N(k) \quad (23)$$

$$Vbij(k) = fb(Tbij(k)) \quad (24)$$

Further, in the output layer, an output Yb is calculated based on the input value Vbij by the following equations (25) to (27):

$$Tbnj(k) = \sum_{N=1}^{m} \omega bnN \cdot VbnN(k) \quad (25)$$

$$Yb(k) = gb(Tbnj(k)) \quad (26)$$

$$gb(x) = \frac{\alpha b}{1 + e^{-\gamma bx}} + \delta b \quad (27)$$

In the above equation (26), gb represents a sigmoid function defined by the above equation (27). In the equation (27), $\alpha b$ represents an output gain of the sigmoid function, $\gamma b$ represents a slope gain of the sigmoid function, and $\delta b$ represents an offset value of the sigmoid function. The values $\alpha b$, $\gamma b$, and $\delta b$ are set to predetermined values determined empirically e.g. by experiment.

Further, the calculated output Yb is set as the second interaction suppression value TH_dc_cmd, and is output to the first adder 47.

The first adder 47 calculates the target throttle valve opening TH_cmd by adding the second interaction suppression value TH_dc_cmd to the input provisional value TH_smc_cmd. This causes the target throttle valve opening TH_cmd to be corrected based on the second interaction suppression value TH_dc_cmd such that the above-mentioned interaction is suppressed. Further, the calculated target throttle valve opening TH_cmd is output to the above-mentioned TH controller 52.

The second adder 48 calculates the target valve lift Lift_cmd by adding the first interaction suppression value Lift_dc_cmd to the input provisional value Lift_smc_cmd. This causes the target valve lift Lift_cmd to be corrected based on the first interaction suppression value Lift_dc_cmd such that the above-mentioned interaction is suppressed. Further, the calculated target valve lift Lift_cmd is output to the above-mentioned lift controller 53.

Next, the learning of the above-mentioned weighting factors ωa and ωb performed by the learning section 61 will be described with reference to FIGS. 8 to 15. This learning is performed at a service station during inspection of the vehicle before or after shipment thereof, in a state where the engine 3 is being driven.

Figure 8:
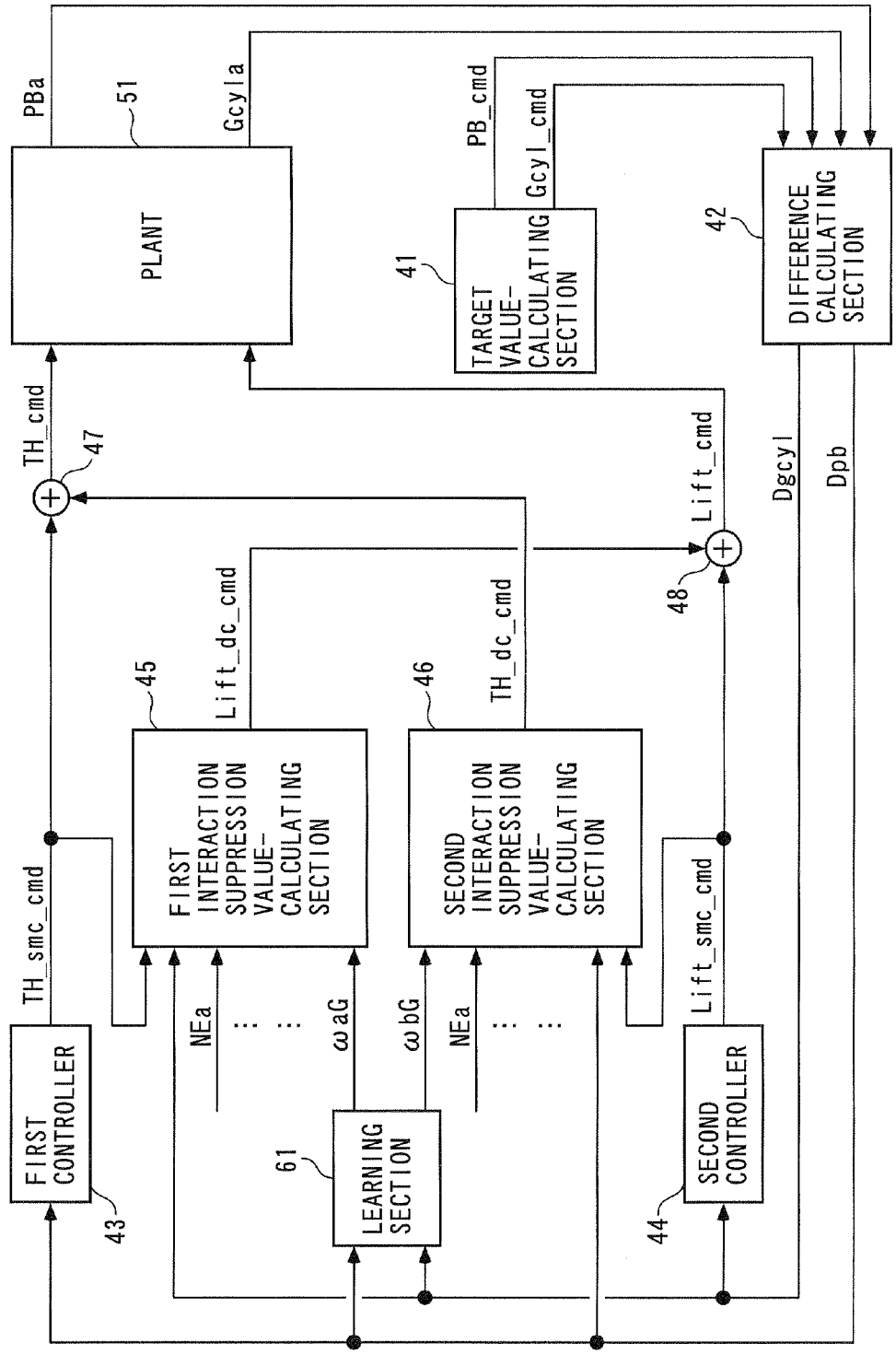
FIG. 8 is a block diagram showing the FIG. 4 plant control unit together with a learning section.
Figure 9:
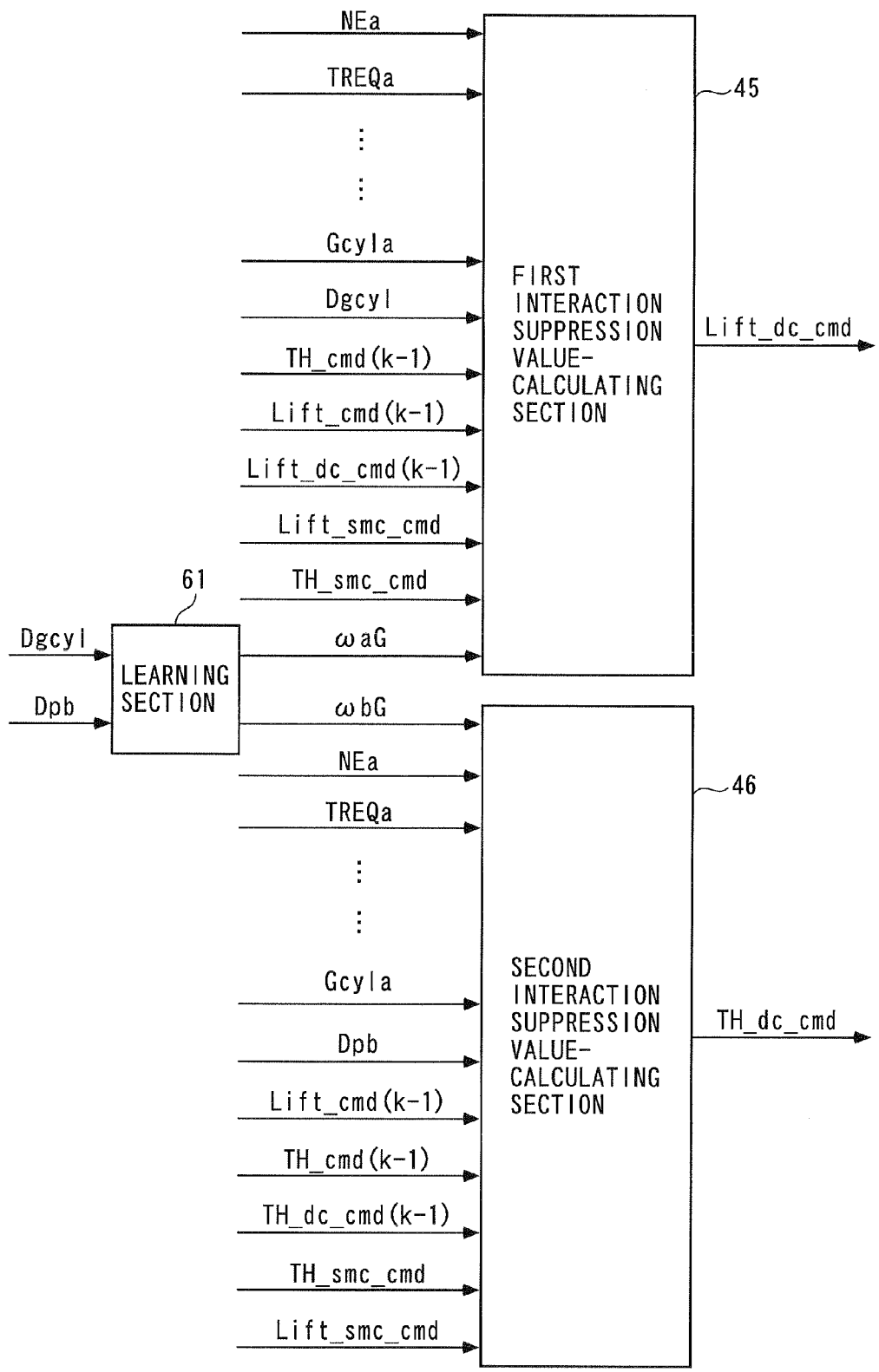
FIG. 9 is a block diagram showing the first and second interaction suppression value-calculating sections appearing in FIG. 4 together with the learning section.
Figure 10:
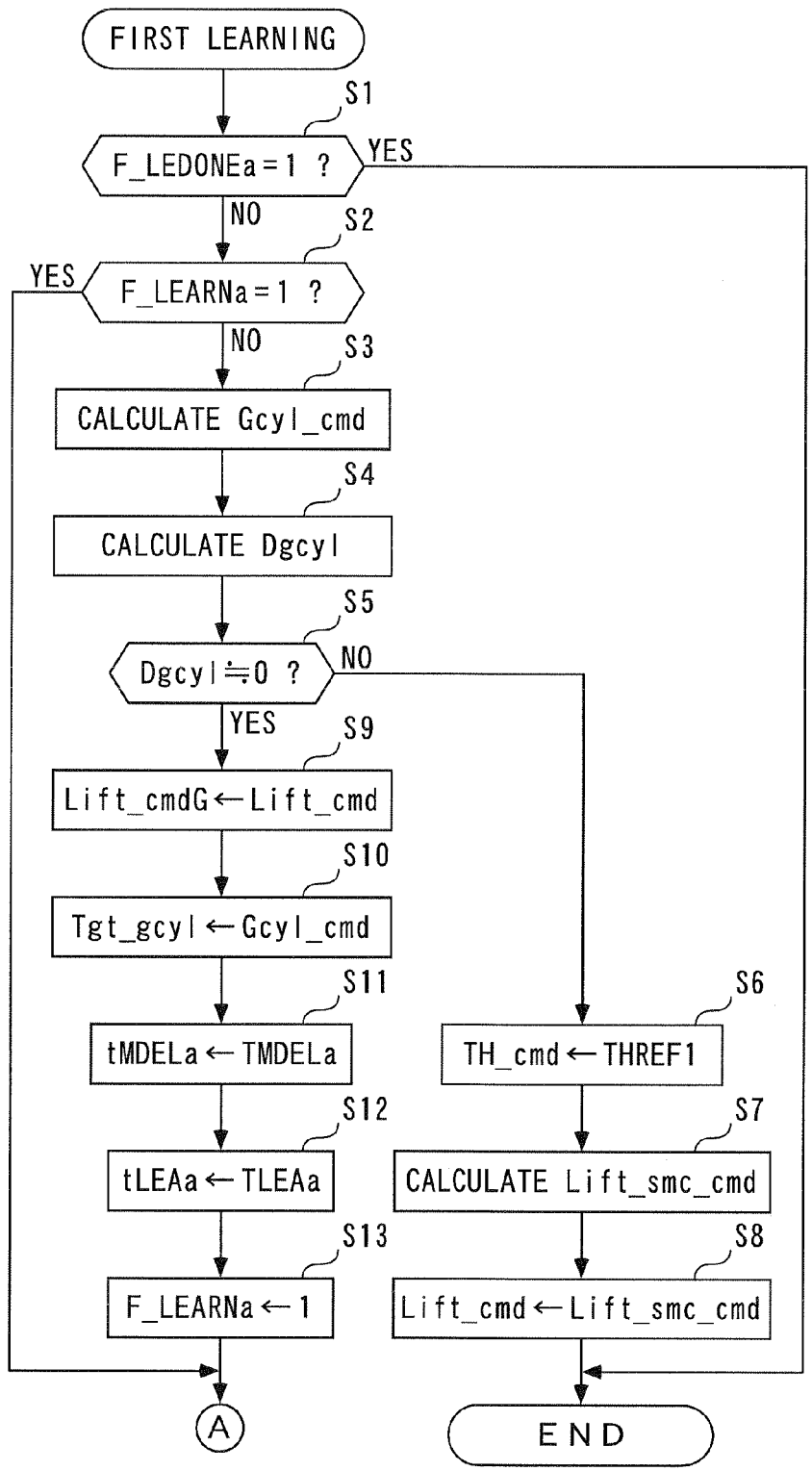
FIG. 10 is a flowchart of a first learning process executed by the FIG. 3 ECU.
Figure 11:
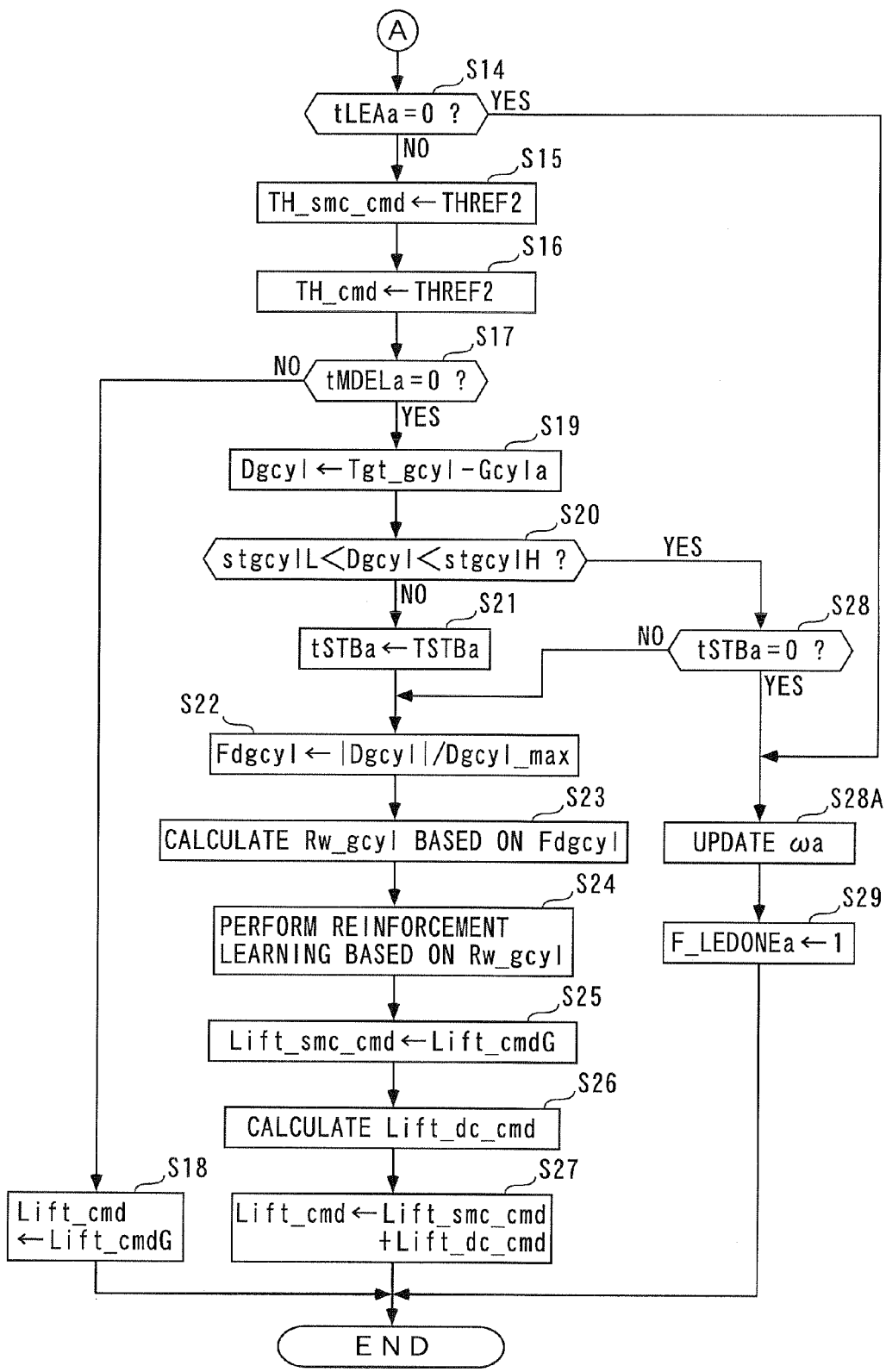
FIG. 11 is a flowchart of a continuation of FIG. 10.

Referring to FIGS. 8 and 9, the intake air amount difference Dgcyl and the intake pressure difference Dpb are input to the learning section 61. The learning section 61 performs the learning of the weighting factor ωa and the learning of the weighting factor ωb separately from each other by reinforcement learning according to the input intake air amount difference Dgcyl and intake pressure difference Dpb. Further, the learning section 61 outputs a learned value ωaG of the weighting factor calculated by the learning to the first interaction suppression value-calculating section 45, and a learned value ωbG of the weighting factor calculated by the learning to the second interaction suppression value-calculating section 46. This causes the weighting factors ωa and ωb to be learned and updated. FIGS. 10 and 11 show a first learning process for learning the weighting factor ωa. This process is repeatedly executed by the various elements shown in FIGS. 5 and 8 at the aforementioned control period ΔT.

Referring to FIG. 10, first, in a step 1 (shown as "S1" in FIG. 10; the following steps are also shown in the same way), it is determined whether or not a first learning completion flag F_LEDONEa is equal to 1. This first learning completion flag F_LEDONEa is set to 1 when the learning of the weighting factor ωa has been completed, and is reset to 0 at the start of inspection of the vehicle.

If the answer to the question of the step 1 is negative (NO), i.e. if the learning of the weighting factor ωa has not been completed, it is determined whether or not a first learning preparation operation completion flag F_LEARNa is equal to 1 (step 2). The first learning preparation operation completion flag F_LEARNa indicates completion of a preparation operation for learning the weighting factor ωa (hereinafter referred to as the "first learning preparation operation") by 1, and is reset to 0 at the start of inspection of the vehicle.

If the answer to this question is negative (NO), i.e. if the first learning preparation operation has not been completed, the target intake air amount Gcyl_cmd is calculated by searching a map according to the engine speed NEa and the demanded torque TREQa, as described hereinabove (step 3). Then, the intake air amount difference Dgcyl is calculated as the difference between the calculated target intake air amount Gcyl_cmd and the intake air amount Gcyla (step 4).

Next, it is determined whether or not the intake air amount difference Dgcyl calculated in the above-mentioned step 4 is approximately equal to 0 (step 5). If the answer to this question is negative (NO), the target throttle valve opening TH_cmd is set to a fixed first predetermined value THREF1 (step 6). Along with execution of the step 6, the throttle valve opening TH is controlled by the aforementioned TH controller 52 such that it converges to the target throttle valve opening TH_cmd. Further, the correction of the target throttle valve opening TH_cmd using the second interaction suppression value TH_dc_cmd is not executed. The correction is stopped.

In a step 7 following the step 6, the provisional value Lift_smc_cmd of the target valve lift is calculated with the above-mentioned response-specifying control algorithm according to the input intake air amount difference Dgcyl. Then, the calculated provisional value Lift_smc_cmd is set as the target valve lift Lift_cmd (step 8), followed by terminating the present process. Along with execution of the step 8, the valve lift Lift is controlled by the aforementioned lift controller 53 such that it converges to the target valve lift Lift_cmd. Further, the correction of the target valve lift Lift_cmd using the first interaction suppression value Lift_dc_cmd is not executed. The correction is stopped.

On the other hand, if the answer to the question of the step 5 is affirmative (YES), i.e. if the intake air amount difference Dgcyl calculated in the above-mentioned step 4 has become approximately equal to 0, the target valve lift Lift_cmd obtained at the time is set as a learning target lift Lift_cmdG (step 9). Then, the target intake air amount Gcyl_cmd is set as a learning target intake air amount Tgt_gcyl (step 10).

Next, in steps 11 and 12, a timer value tMDELa of a wait timer which is counted down to 0 and a timer value tLEAa of a learning timer which is counted down to 0 are set to a predetermined standby time period TMDELa and a learning time period TLEAa, respectively. The standby time period TMDELa is set to a dead time before a change in the throttle valve opening TH is reflected on the intake air amount Gcyla. For example, it is set to 0.2 sec. Further, the learning time period TLEAa is set to a time period that will make it possible to sufficiently learn the weighting factor ωa. For example, it is set to 1.0 sec.

In a step 13 following the step 12, it is determined that the first learning preparation operation has been completed, and to indicate the fact, the first learning preparation operation completion flag F_LEARNa is set to 1, followed by the process proceeding to a step 14 in FIG. 11. Further, after execution of the step 13, the answer to the question of the step 2 becomes affirmative (YES). In this case, the process skips over the above-mentioned steps 3 to 13 to the step 14.

As described above, when the present process is started, first, the first learning preparation operation is executed. During execution of the first learning preparation operation, the correction using the second interaction suppression value TH_dc_cmd is stopped, and the throttle valve opening TH is held at the fixed first predetermined value THREF1 (step 6). Further, the correction using the first interaction suppression value Lift_dc_cmd is stopped, and the target valve lift Lift_cmd is calculated based on the intake air amount difference Dgcyl with a response-specifying control algorithm, which is a feedback control algorithm (steps 7 and 8). This controls the valve lift Lift, whereby the intake air amount Gcyla is controlled such that it converges to the target intake air amount Gcyl_cmd.

Then, when the intake air amount Gcyla converges to the target intake air amount Gcyl_cmd to thereby make the intake air amount difference Dgcyl approximately equal to 0 (YES to the step 5), the target valve lift Lift_cmd obtained at the time, that is, the target valve lift Lift_cmd calculated when the intake air amount difference Dgcyl has become approximately equal to 0 is set as the learning target lift Lift_cmdG (step 9). Further, the target intake air amount Gcyl_cmd obtained at the time is set as the learning target intake air amount Tgt_gcyl (step 10), and it is determined that the first learning preparation operation has been completed (step 13).

As is apparent from the above, the learning target intake air amount Tgt_gcyl is set to the target intake air amount Gcyl_cmd obtained when the intake air amount Gcyla has converged to the target intake air amount Gcyl_cmd in a state where the throttle valve opening TH is held at the fixed first predetermined value THREF1. Further, the learning target lift Lift_cmdG is set to a value that will cause the intake air amount Gcyla to converge to the target intake air amount Gcyl_cmd, i.e. the learning target intake air amount Tgt_gcyl in the state where the throttle valve opening TH is held at the fixed first predetermined value THREF1.

In the step 14 in FIG. 11, it is determined whether or not the timer value tLEAa of the learning timer set in the above-mentioned step 12 is equal to 0. If the answer to this question is negative (NO), in steps 15 and 16, the provisional value TH_smc_cmd of the target throttle valve opening and the target throttle valve opening TH_cmd are each set to a fixed second predetermined value THREF2. The fixed second predetermined value THREF2 is set to a value larger than the first predetermined value THREF1.

Along with execution of the step 16, the throttle valve opening TH is controlled by the TH controller 52 such that it converges to the target throttle valve opening TH_cmd. Further, the correction of the target throttle valve opening TH_cmd based on the second interaction suppression value TH_dc_cmd is not executed, that is, the correction is stopped.

In a step 17 following the step 16, it is determined whether or not the timer value tMDELa of the wait timer set in the step 11 is equal to 0. If the answer to this question is negative (NO), the target valve lift Lift_cmd is set to the learning target lift Lift_cmdG set in the step 9 (step 18), followed by terminating the present process. Along with execution of the step 18, the valve lift Lift is controlled by the lift controller 53 such that it converges to the target valve lift Lift_cmd, i.e. the learning target lift Lift_cmdG. Further, the correction of the target valve lift Lift_cmd based on the first interaction suppression value Lift_dc_cmd is not executed, that is, the correction is stopped.

On the other hand, if the answer to the question of the step 17 is affirmative (YES) (tMDELa=0), i.e. if the standby time period TMDELa has already elapsed after completion of the first learning preparation operation, the intake air amount difference Dgcyl is calculated as the difference between the learning target intake air amount Tgt_gcyl set in the step 10 and the intake air amount Gcyla (step 19). Then, it is determined whether or not the calculated intake air amount difference Dgcyl is within a predetermined range defined by a first predetermined value stgcylL and a second predetermined value stgcylH (step 20).

If the answer to this question is negative (NO), a timer value tSTBa of a stabilization timer which is counted down to 0 is set to a predetermined stabilization time period TSTBa (e.g. 2.0 sec) (step 21), and a normalized intake air amount difference Fdgcyl is calculated by dividing the absolute value |Dgcyl| of the intake air amount difference by a predetermined maximum difference Dgcyl_max (step 22). This maximum difference Dgcyl_max is set to the largest possible value of the absolute value |Dgcyl| of the intake air amount difference.

Figure 12:
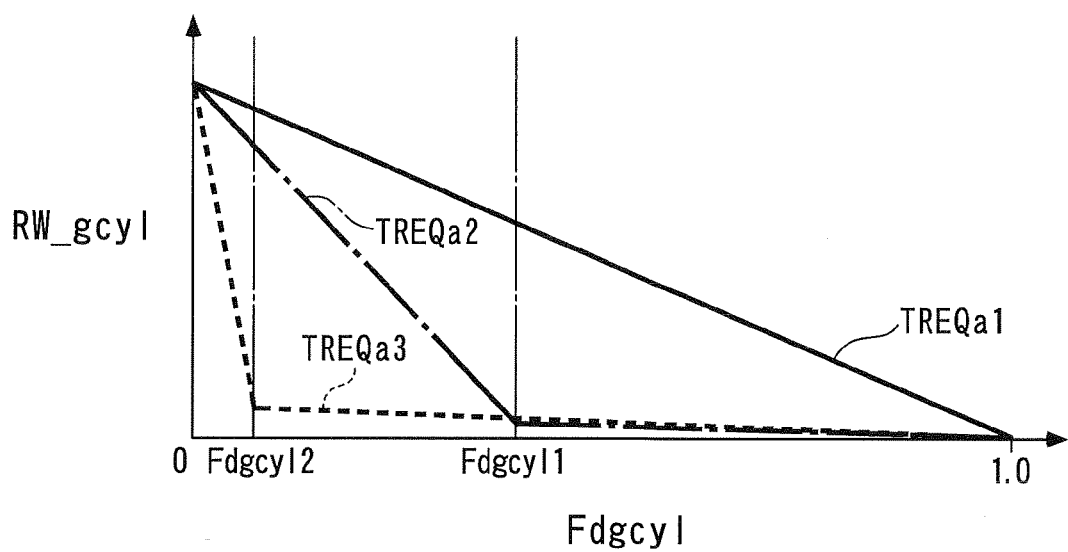
FIG. 12 is a diagram showing an example of a map for use in the first learning process shown in FIG. 11.

Next, a reward value Rw_gcyl is calculated by searching a predetermined map shown in FIG. 12 according to the calculated normalized intake air amount difference Fdgcyl and the demanded torque TREQa (step 23). In FIG. 12, TREQa1, TREQa2 and TREQa3 indicate the first predetermined value, second predetermined value, and third predetermined value of the demanded torque TREQa (TREQa1<TREQa2<TREQa3), respectively. When the demanded torque TREQa takes a value other than the first to third predetermined values TREQa1 to TREQa3, the reward value Rw_gcyl is calculated by interpolation.

In the above-mentioned map, basically, the reward value Rw_gcyl is linearly set to a larger value as the normalized intake air amount difference Fdgcyl is smaller. Further, the reward value Rw_gcyl is set to a maximum value when the normalized intake air amount difference Fdgcyl is equal to 0. The reward value Rw_gcyl is set according to the demanded torque TREQa as follows: When the demanded torque TREQa takes the first predetermined value TREQa1, which is the smallest value of the first to third predetermined values, the reward value Rw_gcyl is linearly set to a larger value as the value of Fdgcyl becomes smaller, in the whole range of the normalized intake air amount difference Fdgcyl (0≤Fdgcyl≤1.0).

Further, when the demanded torque TREQa takes the second predetermined value TREQa2 (>TREQa1), which is the intermediate value, the slope of the reward value Rw_gcyl with respect to the normalized intake air amount difference Fdgcyl is set to a larger vale in a range of 0≤Fdgcyl≤a first predetermined value Fdgcyl1, whereas in a range of Fdgcyl>Fdgcyl1, it is set to a smaller value. Further, when the demanded torque TREQa takes the third predetermined value TREQa3 (>TREQa2), which is the largest value, the slope of the reward value Rw_gcyl with respect to the normalized intake air amount difference Fdgcyl is set to a larger vale in a range of 0≤Fdgcyl≤a second predetermined value Fdgcyl2, whereas in a range of Fdgcyl>Fdgcyl2, it is set to a smaller value. Furthermore, the first and second predetermined values Fdgcyl1 and Fdgcyl2 are set to values which satisfy the relationship of 0<Fdgcyl2<Fdgcyl1<1.0.

As is apparent from the above description, in the FIG. 12 map, as the demanded torque TREQa is smaller, a range where the slope of the reward value Rw_gcyl with respect to the normalized intake air amount difference Fdgcyl is relatively large is set to be larger. This is because as the demanded torque TREQa is smaller, i.e. as load on the engine 3 is lower, the sensitivity of the intake air amount Gcyla to the target valve lift Lift_cmd is higher, and hence the above-mentioned range is set to be larger in order to set the reward value Rw_gcyl in a fine-grained manner in a larger range of the normalized intake air amount difference Fdgcyl.

In a step 24 following the step 23, the weighting factor ω is learned by reinforcement learning based on the reward value Rw_gcyl calculated in the step 23. This learning is performed as follows: First, the weighting factor ωa having been set at each current time (the immediately preceding value thereof) is stored sequentially in each of a plurality of buffers as the learned value ωaG of the weighting factor in association with the calculated reward value Rw_gcyl. Then, the weighting factor ωa (the current value thereof) is set at random to one of a plurality of predetermined values different from each other which are empirically set in advance by experiment. Note that if this time is a first loop after the start of the learning, as is apparent from the step 18, the weighting factor ωa has not yet been set, and hence the learned value ωaG is set to 0, and is stored in association with the reward value Rw_gcyl.

In a step 25 following the step 24, the provisional value Lift_smc_cmd of the target valve lift is set to the learning target lift Lift_cmdG set in the step 9. Then, in a step 26, the first interaction suppression value Lift_dc_cmd is calculated, as described in the description of the first interaction suppression value-calculating section 45. More specifically, the first interaction suppression value Lift_dc_cmd is calculated by a neural network using, as inputs, the operating condition parameters including the engine speed NEa, the intake air amount difference Dgcyl calculated in the step 19, the provisional value TH_smc_cmd of the target throttle valve opening set in the step 15, and so forth.

Next, the target valve lift Lift_cmd is calculated by adding the first interaction suppression value Lift_dc_cmd calculated in the step 26 to the provisional value Lift_smc_cmd set in the step 25 (step 27), followed by terminating the present process. Along with execution of the step 27, the valve lift Lift is controlled by the lift controller 53 such that it converges to the target valve lift Lift_cmd.

As described above, when the first learning preparation operation is completed (YES to the step 2), the correction by the second interaction suppression value TH_dc_cmd is stopped in the same manner as during the execution of the first learning preparation operation, and the throttle valve opening TH is controlled such that it is changed in a stepped manner from the fixed first predetermined value THREF1 to the fixed second predetermined value THREF2, and is then held at the second predetermined value THREF2 (step 16). Further, the target valve lift Lift_cmd is held at the learning target lift Lift_cmdG (step 18). As described hereinabove, the learning target lift Lift_cmdG is set to such a value that will cause the intake air amount Gcyla to converge to the learning target intake air amount Tgt_gcyl in a state where the throttle valve opening TH is held at the first predetermined value THREF1. As is apparent from the above, the intake air amount Gcyla is changed by execution of the steps 16 and 18 such that it deviates from the learning target intake air amount Tgt_gcyl. Further, in this case, the amount of deviation of the intake air amount Gcyla from the learning target intake air amount Tgt_gcyl excellently represents the amount of change of the intake air amount Gcyla caused by interaction of the target throttle valve opening TH_cmd.

When the standby time period TMDELa has elapsed after completion of the first learning preparation operation (YES to the step 17), the learning of the weighting factor ωa is started (the step 19 and the steps 22 to 24). The reason for starting the learning of the weighting factor ωa after waiting for the standby time period TMDELa to elapse after completion of the first learning preparation operation, as described above, is to perform the learning in a state where the intake air amount Gcyla is positively deviated from the learning target intake air amount Tgt_gcyl by the execution of the steps 16 and 18, that is, in a state where influence of the interaction of the target throttle valve opening TH_cmd is positively reflected on the intake air amount Gcyla.

Further, during the above learning, the reward value Rw_gcyl is calculated to be a larger value as the normalized intake air amount difference Fdgcyl proportional to the absolute value |Dgcyl| of the intake air amount difference is smaller (step 23). Furthermore, the weighting factor ωa having been obtained at each current time, i.e. the immediately preceding value of the weighting factor ωa is stored sequentially in each of the buffers as the learned value ωaG of the weighting factor in association with the current reward value Rw_gcyl, and the current value of the weighting factor ωa is set at random to one of the plurality of predetermined values (step 24).

Then, the first interaction suppression value Lift_dc_cmd is calculated using a neural network to which the weighting factor ωa set as described above is applied (step 26). Further, the target valve lift Lift_cmd is calculated by adding the calculated first interaction suppression value Lift_dc_cmd to the provisional value Lift_smc_cmd set to the learning target lift Lift_cmdG (step 27). That is, the target valve lift Lift_cmd is corrected based on the first interaction suppression value Lift_dc_cmd.

On the other hand, if the answer to the question of the step 20 is affirmative (YES), i.e. if the intake air amount difference Dgcyl is within the above-mentioned predetermined range defined by the first and second predetermined values stgcylL and stgcylH, it is determined whether or not the timer value tSTBa of the stabilization timer set in the step 21 is equal to 0 (step 28). If the answer to this question is negative (NO), the above-mentioned step 22 et seq. are executed.

On the other hand, if the answer to the question of the step 28 has become affirmative (YES) (tSTBa=0), i.e. if the state where the intake air amount difference Dgcyl is within the predetermined range defined by the first and second predetermined values stgcylL and stgcylH has continued for the stabilization time period TSTBa, it is determined that the intake air amount Gcyla is stable in a state substantially converged to the learning target intake air amount Tgt_gcyl, and it is determined that the learning of the weighting factor ωa has been completed. Then, one of the learned values ωaG stored in the step 24, which is associated with the largest one of the reward values Rw_gcyl, is read out and set as the weighting factor ωa, to thereby update the weighting factor ωa (step 28A), and in order to indicate the completion of the learning, the first learning completion flag F_LEDONEa is set to 1 (step 29), followed by terminating the present process. Further, after execution of the step 29, the answer to the question of the step 1 in FIG. 10 becomes affirmative (YES), and in this case, the present process is immediately terminated.

On the other hand, if the answer to the question of the step 14 has become affirmative (YES) (tLEAa=0), i.e. if the learning time period TLEAa has elapsed after completion of the first learning preparation operation, the learning of the weighting factor ωa in the step 24 and the like has been sufficiently performed, and hence it is determined that the learning has completed. Then, by executing the step 28A, the one of the stored learned values ωaG, associated with the largest one of the reward values Rw_gcyl, is set as the weighting factor ωa to update the weighting factor ωa, whereafter in order to indicate completion of the learning, the step 29 is executed, followed by terminating the present process.

As described above, if one of the condition that the state where the intake air amount difference Dgcyl is within the predetermined range has continued for the stabilization time period TSTBa, and the condition that the learning time period TLEAa has elapsed after completion of the first learning preparation operation is satisfied, it is determined at the time point that the learning has completed.

Next, a second learning process for learning the weighting factor ωb used by the aforementioned second interaction suppression value-calculating section 46 will be described with reference to FIGS. 13 and 14. Similarly to the above-mentioned first learning process, the present process as well is repeatedly carried out by the various elements shown in FIGS. 5 and 8 at the control period ΔT. Further, in the second learning process, the learning of the weighting factor ωb is performed in the same manner as in the first learning process.

Figure 13:
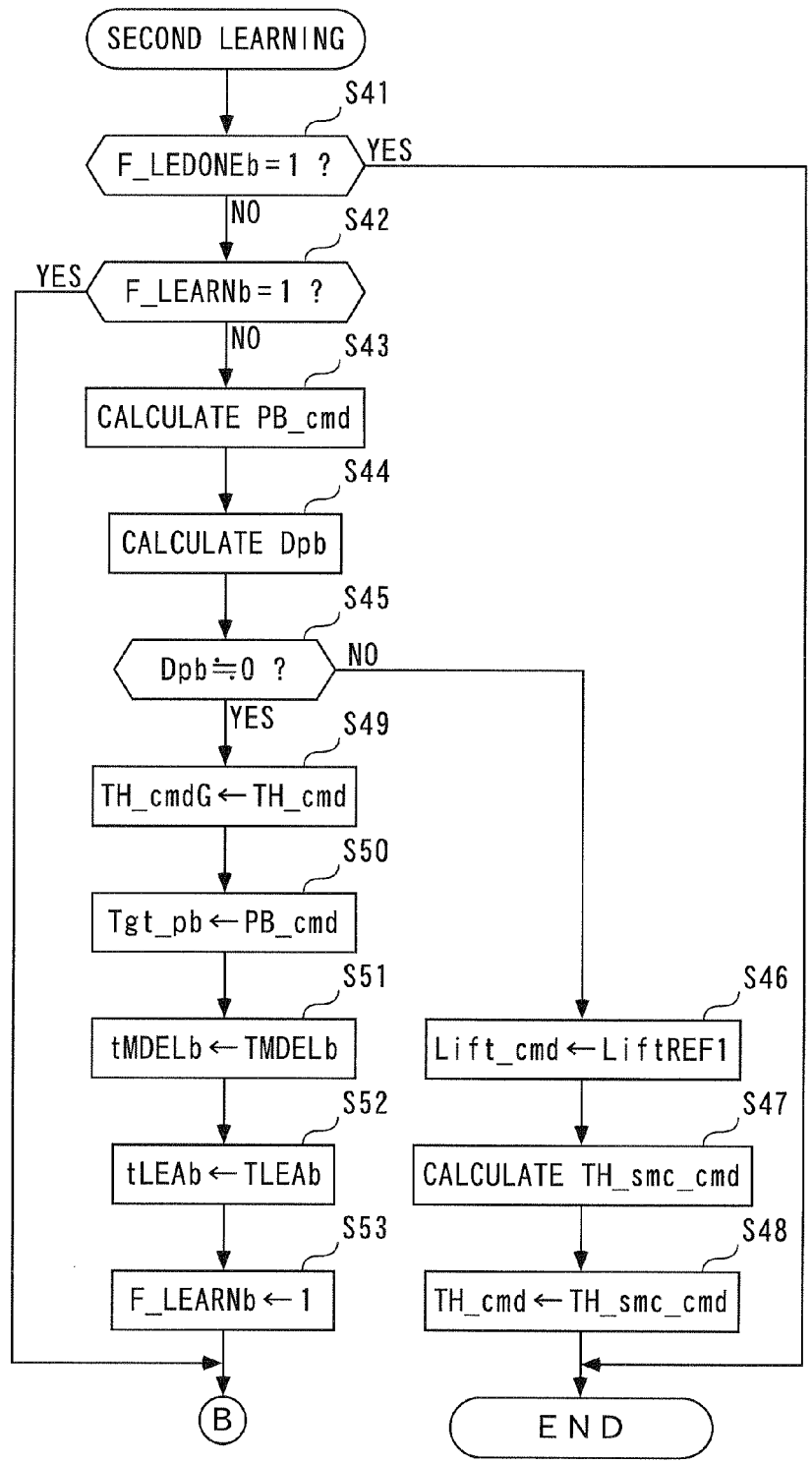
FIG. 13 is a flowchart of a second learning process executed by the ECU appearing in FIG. 3.

First, in a step 41 in FIG. 13, it is determined whether or not a second learning completion flag F_LEDONEb is equal to 1. The second learning completion flag F_LEDONEb is set to 1 when the learning of the weighting factor ωb has been completed, and is reset to 0 at the start of inspection of the vehicle.

If the answer to the question of the step 41 is negative (NO), i.e. if the learning of the weighting factor ωb has not been completed, it is determined whether or not a second learning preparation operation completion flag F_LEARNb is equal to 1 (step 42). The second learning preparation operation completion flag F_LEARNb indicates completion of a preparation operation for learning the weighting factor ωb (hereinafter referred to as the "second learning preparation operation") by 1, and is reset to 0 at the start of inspection of the vehicle.

If the answer to this question is negative (NO), i.e. if the second learning preparation operation has not been completed, the target intake pressure PB_cmd is calculated, as described hereinabove, by searching the aforementioned first map according to the engine speed NEa and the demanded torque TREQa (step 43). Then, the intake pressure difference Dpb is calculated as the difference between the calculated target intake pressure PB_cmd and the intake pressure PBa (step 44).

Next, it is determined whether or not the intake pressure difference Dpb calculated in the step 44 is approximately equal to 0 (step 45). If the answer to this question is negative (NO), the target valve lift Lift_cmd is set to a fixed first predetermined value LiftREF1 (step 46). Along with execution of the step 46, the valve lift Lift is controlled by the lift controller 53 such that it converges to the target valve lift Lift_cmd. Further, the correction of the target valve lift Lift_cmd based on the first interaction suppression value Lift_dc_cmd is not executed, that is, the correction is stopped.

In a step 47 following the step 46, the provisional value TH_smc_cmd of the target throttle valve opening is calculated according to the intake pressure difference Dpb with the above-mentioned response-specifying control algorithm. Then, the calculated provisional value TH_smc_cmd is set as the target throttle valve opening TH_cmd (step 48), followed by terminating the present process. Along with execution of the step 48, the throttle valve opening TH is controlled by the TH controller 52 such that it converges to the target throttle valve opening TH_cmd. Further, the correction of the target throttle valve opening TH_cmd based on the second interaction suppression value TH_dc_cmd is not executed, that is, the correction is stopped.

On the other hand, if the answer to the question of the step 45 is affirmative (YES), i.e. if the intake pressure difference Dpb has become approximately equal to 0, the target throttle valve opening TH_cmd obtained at the time is set as a learning target opening TH_cmdG (step 49). Then, the target intake pressure PB_cmd is set as a learning target intake pressure Tgt_pb (step 50).

Next, in steps 51 and 52, a timer value tMDELb of a wait timer which is counted down to 0 and a timer value tLEAb of a learning timer which is counted down to 0 are set to a predetermined standby time period TMDELb and a predetermined learning time period TLEAb, respectively. The standby time period TMDELb is set to a dead time before a change in the valve lift Lift is reflected on the intake pressure PBa. For example, it is set to 0.1 sec. Further, the learning time period TLEAb is set to such a time period that will make it possible to sufficiently learn the weighting factor ωb. For example, it is set to 0.5 sec.

Figure 14:
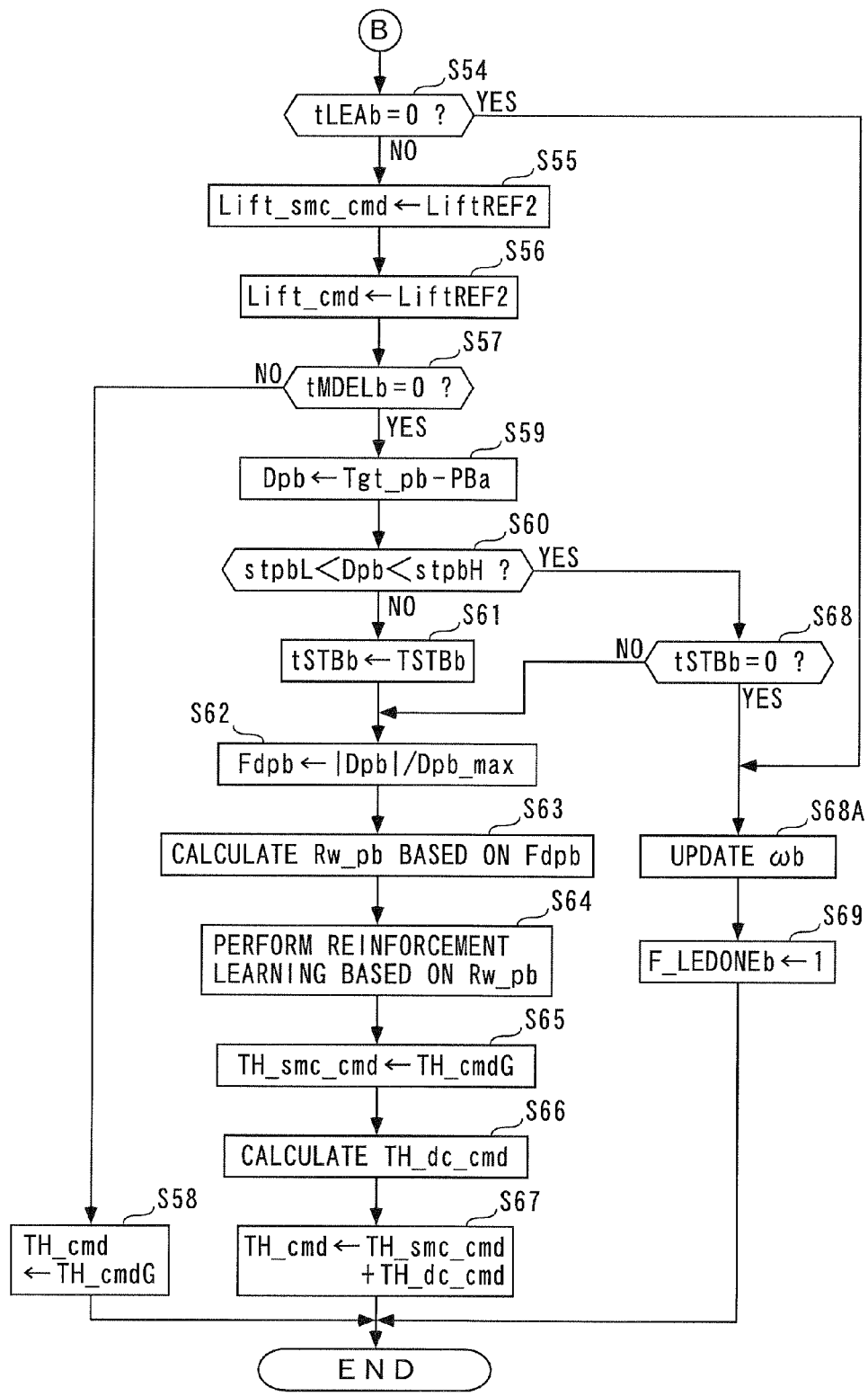
FIG. 14 is a flowchart of a continuation of FIG. 13.

In a step 53 following the step 52, it is determined that the second learning preparation operation has been completed, and to indicate the fact, the second learning preparation operation completion flag F_LEARNb is set to 1, followed by the process proceeding to a step 54 in FIG. 14. Further, after execution of the step 53, the answer to the question of the step 42 becomes affirmative (YES), and in this case, the process skips over the above-mentioned steps 43 to 53 to the step 54.

As described above, when the present process is started, first, the second learning preparation operation is executed. During execution of the second learning preparation operation, the correction using the first interaction suppression value Lift_dc_cmd is stopped, and the valve lift Lift is held at the fixed first predetermined value LiftREF1 (step 46). Further, the correction using the second interaction suppression value TH_dc_cmd is stopped, and the target throttle valve opening TH_cmd is calculated based on the intake pressure difference Dpb with a response-specifying control algorithm, which is a feedback control algorithm (steps 47 and 48). This controls the throttle valve opening TH, whereby the intake pressure PBa is controlled such that it converges to the target intake pressure PB_cmd.

Then, when the intake pressure PBa converges to the target intake pressure PB_cmd to thereby make the intake pressure difference Dpb approximately equal to 0 (YES to the step 45), the target throttle valve opening TH_cmd obtained at the time, that is, the target throttle valve opening TH_cmd calculated when the intake pressure difference Dpb has become approximately equal to 0 is set as the learning target opening TH_cmdG (step 49). Further, the target intake pressure PB_cmd obtained at the time is set as the learning target intake pressure Tgt_pb (step 50), and it is determined that the second learning preparation operation has been completed (step 53).

As is apparent from the above, the learning target intake pressure Tgt_pb is set to the target intake pressure PB_cmd obtained when the intake pressure PBa has converged to the target intake pressure PB_cmd in a state where the valve lift Lift is held at the fixed first predetermined value LiftREF1. Further, the learning target opening TH_cmdG is set to such a value that will cause the intake pressure PBa to converge to the target intake pressure PB_cmd, i.e. the learning target intake pressure Tgt_pb in the state where the valve lift Lift is held at the fixed first predetermined value LiftREF1.

In the step 54 in FIG. 14, it is determined whether or not the timer value tLEAb of the learning timer set in the step 52 is equal to 0. If the answer to this question is negative (NO), in steps 55 and 56, the provisional value Lift_smc_cmd of the target valve lift and the target valve lift Lift_cmd are each set to a fixed second predetermined value LiftREF2. The fixed second predetermined value LiftREF2 is set to a value larger than the first predetermined value LiftREF1.

Along with execution of the step 56, the valve lift Lift is controlled by the lift controller 53 such that it converges to the target valve lift Lift_cmd. Further, the correction of the target valve lift Lift_cmd based on the first interaction suppression value Lift_dc_cmd is not executed, that is, the correction is stopped.

In a step 57 following the step 56, it is determined whether or not the timer value tMDELb of the wait timer set in the step 51 is equal to 0. If the answer to this question is negative (NO), the target throttle valve opening TH_cmd is set to the learning target opening TH_cmdG set in the step 49 (step 58), followed by terminating the present process. Along with execution of the step 58, the throttle valve opening TH is controlled by the TH controller 52 such that it converges to the target throttle valve opening TH_cmd, i.e. the learning target opening TH_cmdG. Further, the correction of the target throttle valve opening TH_cmd based on the second interaction suppression value TH_dc_cmd is not executed, that is, the correction is stopped.

On the other hand, if the answer to the question of the step 57 is affirmative (YES) (tMDELb=0), i.e. if the standby time period TMDELb has already elapsed after completion of the second learning preparation operation, the intake pressure difference Dpb is calculated as the difference between the learning target intake pressure Tgt_pb set in the step 50 and the intake pressure PBa (step 59). Then, it is determined whether or not the calculated intake pressure difference Dpb is within a predetermined range defined by a first predetermined value stpbL and a second predetermined value stpbH (step 60).

If the answer to this question is negative (NO), a timer value tSTBb of a stabilization timer which is counted down to 0 is set to a predetermined stabilization time period TSTBb (e.g. 1.0 sec) (step 61), and a normalized intake pressure difference Fdpb is calculated by dividing the absolute value |Dpb| of the intake pressure difference by a predetermined maximum difference Dpb_max (step 62). This maximum difference Dpb_max is set to the largest possible value of the absolute value |Dpb| of the intake pressure difference.

Next, a reward value Rw_pb is calculated by searching a predetermined map shown in FIG. 15 according to the calculated normalized intake pressure difference Fdpb and the demanded torque TREQa (step 63). In this case, when the demanded torque TREQa takes a value other than the above-mentioned first to third predetermined values TREQa1 to TREQa3, the reward value Rw_pb is calculated by interpolation.

In the above-mentioned map, basically, the reward value Rw_pb is linearly set to a larger value as the normalized intake pressure difference Fdpb is smaller. Further, the reward value Rw_pb is set to a maximum value when the normalized intake pressure difference Fdpb is equal to 0. The reward value Rw_pb is set according to the demanded torque TREQa as follows: When the demanded torque TREQa takes the first predetermined value TREQa1, which is the smallest value of the first to third predetermined values, the reward value Rw_pb is linearly set to a larger value as the value of Fdpb becomes smaller, in the whole range of the normalized intake pressure difference Fdpb ($0 \leq Fdpb \leq 1.0$).

Further, when the demanded torque TREQa takes the intermediate second predetermined value TREQa2, which is the intermediate value, the slope of the reward value Rw_pb with respect to the normalized intake pressure difference Fdpb is set to a larger vale in a range of $0 \leq Fdpb \leq$ a first predetermined value Fdpb1, whereas in a range of Fdpb>Fdpb1, it is set to a smaller value. Further, when the demanded torque TREQa takes the third predetermined value TREQa3, which is the largest value, the slope of the reward value Rw_pb with respect to the normalized intake pressure difference Fdpb is set to a larger vale in a range of $0 \leq Fdpb \leq$ a second predetermined value Fdpb2, whereas in a range of Fdpb>Fdpb2, it is set to a smaller value. Furthermore, the first and second predetermined values Fdpb1 and Fdpb2 are set to values which satisfy the relationship of $0 < Fdpb2 < Fdpb1 < 1.0$.

As is apparent from the above description, in the FIG. 15 map, as the demanded torque TREQa is smaller, a range where the slope of the reward value Rw_pb with respect to the normalized intake pressure difference Fdpb is relatively large is set to be larger. This is because as the demanded torque TREQa is smaller, i.e. as the load on the engine 3 is lower, the sensitivity of the intake pressure PBa to the target throttle valve opening TH_cmd is higher, and hence the above-mentioned range is set to be larger in order to set the reward value Rw_pb in a fine-grained manner in a larger range of the normalized intake pressure difference Fdpb.

In a step 64 following the step 63, the weighting factor ωb is learned by reinforcement learning based on the reward value Rw_pb calculated in the step 63. This learning is performed as follows: First, the weighting factor ωb having been set at each current time (the immediately preceding value thereof) is stored sequentially in each of the plurality of buffers as the learned value ωbG of the weighting factor in association with the calculated reward value Rw_pb. Then, the weighting factor ωb (the current value thereof) is set at random to one of a plurality of predetermined values different from each other which are set in advance by experiment. If this time is a first loop after the start of the learning, as is apparent from the step 58, the weighting factor ωb has not yet been set, so that the learned value ωbG is set to 0, and is stored in association with the reward value Rw_pb.

In a step 65 following the step 64, the provisional value TH_smc_cmd of the target throttle valve opening is set to the learning target opening TH_cmdG set in the step 49. Then, in a step 66, the second interaction suppression value TH_dc_cmd is calculated, as described in the description of the second interaction suppression value-calculating section 46. More specifically, the second interaction suppression value TH_dc_cmd is calculated by a neural network using, as inputs, the operating condition parameters including the engine speed NEa, the intake pressure difference Dpb calculated in the step 59, the provisional value Lift_smc_cmd of the target valve lift set in the step 55, and so forth.

Next, the target throttle valve opening TH_cmd is calculated by adding the second interaction suppression value TH_dc_cmd calculated in the step 66 to the provisional value TH_smc_cmd set in the step 65 (step 67), followed by terminating the present process. Along with execution of the step 67, the throttle valve opening TH is controlled by the TH controller 52 such that it converges to the target throttle valve opening TH_cmd.

As described above, when the second learning preparation operation is completed (YES to the step 42), the correction by the first interaction suppression value Lift_dc_cmd is stopped in the same manner as during the execution of the second learning preparation operation, and the valve lift Lift is controlled such that it is changed in a stepped manner from the first predetermined value LiftREF1 to the fixed second predetermined value LiftREF2, and is then held at the second predetermined value LiftREF2 (step 56). Further, the target throttle valve opening TH_cmd is held at the learning target opening TH_cmdG (step 58). As described hereinabove, the learning target opening TH_cmdG is set to such a value that will cause the intake pressure PBa to converge to the learning target intake pressure Tgt_pb in a state where the valve lift Lift is held at the first predetermined value LiftREF1. As is apparent from the above, the intake pressure PBa is changed by execution of the steps 56 and 58 such that it deviates from the learning target intake pressure Tgt_pb. Further, in this case, the amount of deviation of the intake pressure PBa from the learning target intake pressure Tgt_pb excellently represents the amount of change of the intake pressure PBa caused by interaction of the target valve lift Lift_cmd.

When the standby time period TMDELb has elapsed after completion of the second learning preparation operation (YES to the step 57), the learning of the weighting factor ωb is started (the step 59 and the steps 62 to 64). The reason for starting the learning of the weighting factor ωb after waiting for the standby time period TMDELb to elapse after completion of the second learning preparation operation is to perform the learning in a state where the intake pressure PBa is positively deviated from the learning target intake pressure Tgt_pb by the execution of the steps 56 and 58, that is, in a state where influence of the interaction of the target valve lift Lift_cmd is positively reflected on the intake pressure PBa.

Further, during the above learning, the reward value Rw_pb is calculated to be a larger value as the normalized intake pressure difference Fdpb proportional to the absolute value |Dpb| of the intake pressure difference is smaller (step 63). Furthermore, the weighting factor ωb having been obtained at each current time, i.e. the immediately preceding value of the weighting factor ωb is stored sequentially in each of the buffers as the learned value ωbG of the weighting factor in association with the current reward value Rw_pb, and the current value of the weighting factor ωb is set at random to one of the plurality of predetermined values (step 64).

Then, the second interaction suppression value TH_dc_cmd is calculated using a neural network to which the weighting factor ωb set as described above is applied (step 66). Further, the target throttle valve opening TH_cmd is calculated by adding the calculated second interaction suppression value TH_dc_cmd to the provisional value TH_smc_cmd set to the learning target opening TH_cmdG (step 67). That is, the target throttle valve opening TH_cmd is corrected based on the second interaction suppression value TH_dc_cmd.

On the other hand, if the answer to the question of the step 60 is affirmative (YES), i.e. if the intake pressure difference Dpb is within the above-mentioned predetermined range defined by the first and second predetermined values stpbL and stpbH, it is determined whether or not the timer value tSTBb of the stabilization timer set in the step 61 is equal to 0 (step 68). If the answer to this question is negative (NO), the above-mentioned step 62 et seq. are executed.

On the other hand, if the answer to the question of the step 68 has become affirmative (YES) (tSTBb=0), i.e. if the state where the intake pressure difference Dpb is within the predetermined range defined by the first and second predetermined values stpbL and stpbH has continued for the stabilization time period TSTBb, it is determined that the intake pressure PBa is stable in a state substantially converged to the learning target intake pressure Tgt_pb, and it is determined that the learning of the weighting factor ωb has been completed. Then, one of the weighting factors ωbG stored in the step 64, which is associated with the largest one of the reward values Rw_pb, is read out and set as the weighting factor ωb to thereby update the weighting factor ωb (step 68A), and in order to indicate the completion of the learning, the second learning completion flag F_LEDONEb is set to 1 (step 69), followed by terminating the present process. Further, after execution of the step 69, the answer to the question of the step 41 in FIG. 13 becomes affirmative (YES), and in this case, the present process is immediately terminated.

On the other hand, if the answer to the question of the step 54 has become affirmative (YES) (tLEAb=0), i.e. if the learning time period TLEAb has elapsed after completion of the second learning preparation operation, the learning of the weighting factor ωb in the step 64, etc., has been sufficiently performed, and hence it is determined that the learning has completed. Then, by executing the step 68A, the one of the stored weighting factors ωbG, which is associated with the largest one of the reward values Rw_pb, is set as the weighting factor ωb to thereby update the weighting factor ωb, whereafter to indicate completion of the learning, the step 69 is executed, followed by terminating the present process.

As described above, if one of the condition that the state where the intake pressure difference Dpb is within the predetermined range has continued for the stabilization time period TSTBb, and the condition that the learning time period TLEAb has elapsed after completion of the second learning preparation operation is satisfied, it is determined at the time point that the learning has completed.

The above-mentioned first embodiment corresponds to the invention as claimed in claims 1 to 4 (hereinafter generically referred to as the "first invention"). Correspondence between elements of the first embodiment and elements of the first invention are as follows: The ECU 2 and the first and second controllers 43 and 44 of the first embodiment correspond to control input-calculating means of the first invention; the ECU 2 and the first and second interaction suppression value-calculating sections 45 and 46 of the first embodiment correspond to interaction suppression parameter-calculating means of the first invention; and the ECU 2 and the first and second adders 47 and 48 of the first embodiment correspond to correction means of the first invention.

Further, the ECU 2 and the target value-calculating section 41 of the first embodiment correspond to target value-setting means of the first invention; the air flow sensor 24, the intake pressure sensor 25, the intake air temperature sensor 26, and the ECU 2 of the first embodiment correspond to controlled variable-detecting means of the first invention; and the ECU 2 and the learning section 61 of the first embodiment correspond to learning means of the first invention. Furthermore, the TH actuator 15a of the first embodiment corresponds to a throttle valve mechanism of the first invention.

Further, the target throttle valve opening TH_cmd and the target valve lift Lift_cmd of the first embodiment correspond to control inputs of the first invention, and the intake pressure PBa and the intake air amount Gcyla of the first embodiment correspond to controlled variables of the first invention. Furthermore, the first and second interaction suppression values Lift_dc_cmd and TH_dc_cmd of the first embodiment correspond to interaction suppression parameters of the first invention, and the target intake pressure PB_cmd and the target intake air amount Gcyl_cmd of the first embodiment correspond to target values of the first invention.

Further, the reward values Rw_gcyl and Rw_pb of the first embodiment correspond to rewards of the first invention, and the weighting factors ωa and ωb of the first embodiment correspond to neuron parameters of the first invention. Furthermore, the learning target lift Lift_cmd and the learning target opening TH_cmdG of the first embodiment correspond to values calculated immediately before the start of learning of the neuron parameters according to the first invention, and the learning target intake air amount Tgt_gcyl and the learning target intake pressure Tgt_pb of the first embodiment correspond to target values set immediately before the start of the learning of the neuron parameters according to the first invention. Further, the target throttle valve opening TH_cmd of the first embodiment corresponds to an opening control parameter of the first invention, and the target valve lift Lift_cmd of the first embodiment corresponds to a lift control parameter of the first invention.

As described above, according to the first embodiment, in the plant 51 including the engine 3, interaction occurs between the target throttle valve opening TH_cmd and the target valve lift Lift_cmd as the control inputs and between the intake pressure PBa and the intake air amount Gcyla as the controlled variables. Further, the first interaction suppression value Lift_dc_cmd is calculated using the neural network which is constructed by using the provisional value TH_smc_cmd of the target throttle valve opening as an input and the first interaction suppression value Lift_dc_cmd as an output. Furthermore, the target valve lift Lift_cmd is corrected based on the calculated first interaction suppression value Lift_dc_cmd. Further, the second interaction suppression value TH_dc_cmd is calculated using the neural network which is constructed by using the provisional value Lift_smc_cmd of the target valve lift as an input and the second interaction suppression value TH_dc_cmd as an output. Furthermore, the target throttle valve opening TH_cmd is corrected based on the calculated second interaction suppression value TH_dc_cmd.

As described above, it is possible to properly correct the target throttle valve opening TH_cmd and the target valve lift Lift_cmd such that the interaction therebetween is suppressed. In this case, although the plant 51 includes the engine 3, which is a nonlinear system, the neural network has a characteristic that it can properly and easily model the nonlinear system, so that it is possible to construct the neural networks for properly and easily calculating the first and second interaction suppression values Lift_dc_cmd and TH_dc_cmd. With the above, in the plant 51, which is the nonlinear system, it is possible to properly suppress the interaction occurring between the target throttle valve opening TH_cmd and the target valve lift Lift_cmd and between the intake pressure PBa and the intake air amount Gcyla, whereby it is possible to properly control the intake pressure PBa and the intake air amount Gcyla, and easily design the control system 1.

Further, the weighting factors $\omega a$ and $\omega b$ used in the neural network are learned separately from each other, i.e. on a neural network-by-neural network basis. Furthermore, before learning of the weighting factor $\omega a$, the target valve lift Lift_cmd is calculated with a response-specifying control algorithm, which is a feedback control algorithm, such that the detected intake air amount Gcyla becomes equal to the target intake air amount Gcyl_cmd. Further, the target throttle valve opening TH_cmd is held at the fixed first predetermined value THREF1, and the correction of the target valve lift Lift_cmd based on the first interaction suppression value Lift_dc_cmd and the correction of the target throttle valve opening TH_cmd based on the second interaction suppression value TH_dc_cmd are stopped. With the above, the intake air amount Gcyla is held in a state converged to the target intake air amount Gcyl_cmd.

Then, when the learning of the weighting factor $\omega a$ is started, the target throttle valve opening TH_cmd is held at the second predetermined value THREF2, and the correction of the target throttle valve opening TH_cmd based on the second interaction suppression value TH_dc_cmd is stopped. Further, the provisional value Lift_smc_cmd of the target valve lift is not calculated with the response-specifying control algorithm, but is set to the learning target lift Lift_cmdG calculated immediately before the start of the learning of the weighting factor $\omega a$, and is held thereat. With the above, at the start of the learning of the weighting factor $\omega a$, the intake air amount Gcyla, which has been held in a state converged to the learning target intake air amount Tgt_gcyl, which is the target intake air amount Gcyl_cmd set immediately before the start of the learning, deviates from the learning target intake air amount Tgt_gcyl. Further, during the learning of the weighting factor $\omega a$, the intake air amount difference Dgcyl is calculated as the difference between the learning target intake air amount Tgt_gcyl and the intake air amount Gcyla. As described above, at the start of the learning of the weighting factor $\omega a$, the intake air amount difference Dgcyl excellently represents the amount of change of the intake air amount Gcyla caused by interaction of the target throttle valve opening TH_cmd.

Further, during the learning of the weighting factor $\omega a$, the weighting factor $\omega a$ is set to one of the plurality of predetermined values, and the first interaction suppression value Lift_dc_cmd is calculated using the neural network to which the set weighting factor $\omega a$ is applied. Further, the intake air amount Gcyla is controlled using the target valve lift Lift_cmd corrected by the calculated first interaction suppression value Lift_dc_cmd. Further, as the calculated normalized intake air amount difference Fdgcyl obtained by the control of the intake air amount Gcyla is smaller, i.e. as the absolute value |Dgcyl| of the intake air amount difference is smaller, the reward value Rw_gcyl is calculated to be a larger value, and the weighting factor $\omega a$ having been obtained at each current time is sequentially stored as the learned value $\omega aG$ in association with the reward value Rw_gcyl. Furthermore, the weighting factor $\omega a$ is updated to one of the stored learned values $\omega aG$, which is associated with the largest one of the reward values Rw_gcyl, that is, the learned value $\omega aG$ at which the absolute value |Dgcyl| of the intake air amount difference, which is the difference between the learning target intake air amount Tgt_gcyl and the intake air amount Gcyla, is minimized, whereby the learning of the weighting factor $\omega a$ is completed.

As described above, reinforcement learning of the weighting factor $\omega a$ is performed using the reward value Rw_gcyl based on the intake air amount difference Dgcyl, such that the intake air amount Gcyla, which is controlled using the target valve lift Lift_cmd corrected by the first interaction suppression value Lift_dc_cmd, becomes equal to the learning target intake air amount Tgt_gcyl. This makes it possible to properly learn the weighting factor $\omega a$.

Further, the learning of the weighting factor $\omega b$ is performed similarly to the case of the weighting factor $\omega a$. That is, before learning of the weighting factor $\omega b$, the target throttle valve opening TH_cmd is calculated with a response-specifying control algorithm such that a detected intake pressure PBa becomes equal to the target intake pressure PB_cmd. Furthermore, the target valve lift Lift_cmd is held at the fixed first predetermined value LiftREF1, and the correction of the correction of the target throttle valve opening TH_cmd using the second interaction suppression value TH_dc_cmd and the correction of the target valve lift Lift_cmd using the first interaction suppression value Lift_dc_ cmd are stopped. With the above, the intake pressure PBa is held in a state converged to the target intake pressure PB_cmd.

Then, when the learning of the weighting factor $\omega b$ is started, the target valve lift Lift_cmd is held at the second predetermined value LiftREF2, and the correction of the target valve lift Lift_cmd based on the first interaction suppression value Lift_dc_cmd is stopped. Further, the provisional value TH_smc_cmd of the target throttle valve opening is not calculated with the response-specifying control algorithm, but is set to the learning target opening TH_cmdG calculated immediately before the start of the learning of the weighting factor $\omega b$ and is held thereat. With the above, at the start of the learning of the weighting factor $\omega b$, the intake pressure PBa, which has been held in a state converged to the learning target intake pressure Tgt_pb, which is the target intake pressure PB_cmd set immediately before the start of the learning of the weighting factor $\omega b$, deviates from the learning target intake pressure Tgt_pb. Further, during the learning of the weighting factor $\omega b$, the intake pressure difference Dpb is calculated as the difference between the learning target intake pressure Tgt_pb and the intake pressure PBa. As described above, at the start of the learning of the weighting factor $\omega b$, the intake pressure difference Dpb excellently represents the amount of change of the intake pressure PBa caused by interaction of the target valve lift Lift_cmd.

Further, during the learning of the weighting factor $\omega b$, the weighting factor $\omega b$ is set to one of the plurality of predetermined values, and the second interaction suppression value TH_dc_cmd is calculated using the neural network to which the set weighting factor $\omega b$ is applied. Further, the intake pressure PBa is controlled using the target throttle valve opening TH_cmd corrected by the calculated second interaction suppression value TH_dc_cmd. Also, as the calculated normalized intake pressure difference Fdpb obtained by the control of the intake pressure PBa is smaller, i.e. as the absolute value |Dpb| of the intake pressure difference is smaller, the reward value Rw_pb is calculated to be a larger value, and the weighting factor $\omega b$ having been obtained at each current time is sequentially stored as the learned value $\omega bG$ in association with the reward value Rw_pb. Furthermore, the weighting factor $\omega b$ is updated to one of the stored learned values $\omega bG$, which is associated with the largest one of the reward values Rw_pb, that is, the learned value $\omega bG$ at which the absolute value |Dpb| of the intake pressure difference, which is the difference between the learning target intake pressure Tgt_pb and the intake pressure PBa, is minimized, whereby the learning of the weighting factor $\omega b$ is completed.

As described above, reinforcement learning of the weighting factor $\omega b$ is performed using the reward value Rw_pb based on the intake pressure difference Dpb such that the intake pressure PBa, which is controlled using the target throttle valve opening TH_cmd corrected by the second interaction suppression value TH_dc_cmd, becomes equal to the learning target intake pressure Tgt_pb. This makes it possible to properly learn the weighting factor $\omega b$.

According to the first embodiment, the target valve lift Lift_cmd and target throttle valve opening TH_cmd are corrected based on the first and second interaction suppression values Lift_dc_cmd and TH_dc_cmd calculated using the neural networks that perform learning as described above, so that it is possible to more properly suppress the interaction occurring between the target valve lift Lift_cmd and the target throttle valve opening TH_cmd.

Further, the reinforcement learning is used as a method for learning the weighting factors $\omega a$ and $\omega b$. The reinforcement learning has a characteristic that it automatically learns the weighting factors $\omega a$ and $\omega b$ such that they take optimum values if they are given rewards in advance, and hence there is no need to set a teacher signal, differently from an error back-propagation method. This makes it possible to design the control system 1 more easily. For the same reason, even when neural networks for a plurality of control inputs and a plurality of controlled variables, different from each other e.g. in the manner of interaction, are constructed on a control input-by-control input and controlled variable-by-controlled variable basis, there is no need, differently from the above-described conventional case, to set model equations from the beginning, which makes it possible to construct the neural networks with ease. Therefore, in this case as well, the control system can be easily designed.

Further, since the first and second interaction suppression values Lift_dc_cmd and TH_dc_cmd are calculated according to the above-mentioned operating condition parameters (the engine speed NEa, the demanded torque TREQa, etc.), it is possible to properly calculate Lift_dc_cmd and TH_dc_cmd while reflecting the operating conditions of the engine 3 thereon.

Although in the first embodiment, the response-specifying control algorithms are used as feedback control algorithms for calculating the provisional value TH_smc_cmd of the target throttle valve opening and the provisional value Lift_smc_cmd of the target valve lift as control inputs, this is not limitative, but there may be used other suitable feedback control algorithms, such as PID control algorithms.

Further, although in the first embodiment, the respective provisional values TH_smc_cmd and Lift_smc_cmd are calculated with the feedback control algorithms such that the intake pressure PBa and the intake air amount Gcyla as detected controlled variables become equal to the target intake pressure PB_cmd and the target intake air amount Gcyl_cmd, respectively, the provisional values TH_smc_cmd and Lift_smc_cmd may be calculated by searching maps according to the target intake pressure PB_cmd and the target intake air amount Gcyl_cmd, respectively. In this case, for calculations of the intake air amount difference Dgcyl and the intake pressure difference Dpb during learning of the weighting factors $\omega a$ and $\omega b$, the target intake air amount Gcyl_cmd and the target intake pressure PB_cmd calculated at each corresponding time are used in place of the learning target intake air amount Tgt_gcyl and the learning target intake pressure Tgt_pb, respectively.

Furthermore, although in the first embodiment, the intake air amount Gcyla is calculated by computation, it may be directly calculated using a sensor. Further, although in the first embodiment, the intake pressure PBa is detected using the intake pressure sensor 25, it may be calculated by computation. Further, although in the first embodiment, the reward values Rw_gcyl and Rw_pb are linearly set based on the normalized intake air amount difference Fdgcyl and the normalized intake pressure difference Fdpb, respectively, they may be nonlinearly set.

Further, although in the first embodiment, the normalized intake air amount difference Fdgcyl is used as a parameter for calculating the reward value Rw_gcyl, the intake air amount difference Dgcyl or the absolute value |Dgcyl| thereof may be used. Alternatively, as a parameter for calculating the reward value Rw_gcyl, there may be used another suitable parameter indicative of a result of comparison between the learning target intake air amount Tgt_gcyl and the intake air amount Gcyla, for example, a ratio of one of the learning target intake air amount Tgt_gcyl and the intake air amount Gcyla to the other thereof.

This also applies to the reward value Rw_pb. More specifically, the intake pressure difference Dpb or the absolute value |Dpb| thereof may be used as a parameter for calculating the reward value Rw_pb. Alternatively, there may be used another suitable parameter indicative of a result of comparison between the learning target intake pressure Tgt_pb and the intake pressure PBa, for example, a ratio of one of the learning target intake pressure Tgt_pb and the intake pressure PBa to the other thereof.

Furthermore, as a parameter input to the neural network so as to calculate the first interaction suppression value Lift_dc_cmd, there may be used, in addition to the aforementioned various parameters, a time period which has elapsed after a time point when the throttle valve opening TH started to change from its fixed state. Since the intake air amount Gcyla changes with a response delay with respect to the change of the throttle valve opening TH, it is possible to properly calculate the first interaction suppression value Lift_dc_cmd while favorably reflecting such a response delay thereon. Similarly, as a parameter input to the neural network so as to calculate the second interaction suppression value TH_dc_cmd, there may be used a time period which has elapsed after a time point when the valve lift Lift started to change from a fixed state. Since the intake pressure PBa changes with a response delay with respect to the change of the valve lift Lift, it is possible to properly calculate the second interaction suppression value TH_dc_cmd while favorably reflecting such a response delay thereon.

Further, in the first embodiment, when one of the condition that the state where the intake air amount difference Dgcyl is within the predetermined range has continued for the stabilization time period TSTBa and the condition that the learning time period TLEAa has elapsed after completion of the first learning preparation operation is satisfied, the weighting factor ωa is updated to one of the plurality of learned values ωaG stored up to the time, which is associated with the largest one of the reward values Rw_gcyl, whereby the weighting factor ωa is learned, but it may be learned as follows: Also when one of the above-mentioned two conditions is satisfied, the reward value Rw_gcyl is calculated and the weighting factor ωa having been set at the time is stored as the learned value ωaG in association with the calculated reward value Rw_gcyl. Then, the weighting factor ωa is updated to one of the learned values ωaG including the stored current learned value ωaG, which is associated with the largest one of the reward values Rw_gcyl, whereby the learning of the weighting factor ωa may be performed.

This also applies to the weighting factor ωb. More specifically, also when one of the condition that the state where the intake pressure difference Dpb is within the predetermined range has continued for the stabilization time period TSTBb, and the condition that the learning time period TLEAb has elapsed after completion of the second learning preparation operation is satisfied, the reward value Rw_pb is calculated, and the weighting factor ωb having been set at the time is stored as the learned value ωbG in association with the calculated reward value Rw_pb. Then, the weighting factor ωb is updated to one of a plurality of learned values ωbG including the stored current learned value ωbG, which is associated with the largest one of the reward values Rw_pb, whereby the learning of the weighting factor ωb may be performed.

Furthermore, although in the first embodiment, whenever the reward value Rw_gcyl is calculated, the learned value ωaG is stored, and the weighting factor ωa is updated to one of the stored learned values ωaG, which is associated with the largest one of the calculated reward values Rw_gcyl, only when the currently calculated reward value Rw_gcyl is larger than the reward values Rw_gcyl calculated up to the time, the weighting factor ωa set at the time may be stored as the learned values ωaG to thereby update the learned values ωaG as occasion arises, and the weighting factor ωa may be updated to the stored learned value ωaG. This makes it possible to obtain the same advantageous effects as described above.

This also applies to the learned value ωbG. More specifically, only when the currently calculated reward value Rw_pb is larger than the reward values Rw_pb calculated up to the time, the weighting factor ωb set at the time may be stored as the learned values ωbG, to thereby update the learned values ωbG as occasion arises, and the weighting factor ωb may be updated to the stored learned value ωbG.

Further, although in the first embodiment, the setting of the weighting factor ωa for learning and the storage of the learned value ωaG (step 24) are performed whenever the first learning process is executed (at the control period ΔT), since the intake air amount Gcyla changes with a response delay with respect to the change of the valve lift Lift, the setting of the weighting factor ωa and the storage of the learned value ωaG may be performed whenever a predetermined time period dependent on the response delay elapses. Similarly, although the setting of the weighting factor ωb for learning and the storage of the learned value ωbG (step 64) are performed whenever the second learning process is executed (at the control period ΔT), since the intake pressure PBa changes with a response delay with respect to the change of the throttle valve opening TH, the setting of the weighting factor ωb and the storage of the learned value ωbG may be performed whenever a predetermined time period dependent on the response delay elapses.

Figure 16:
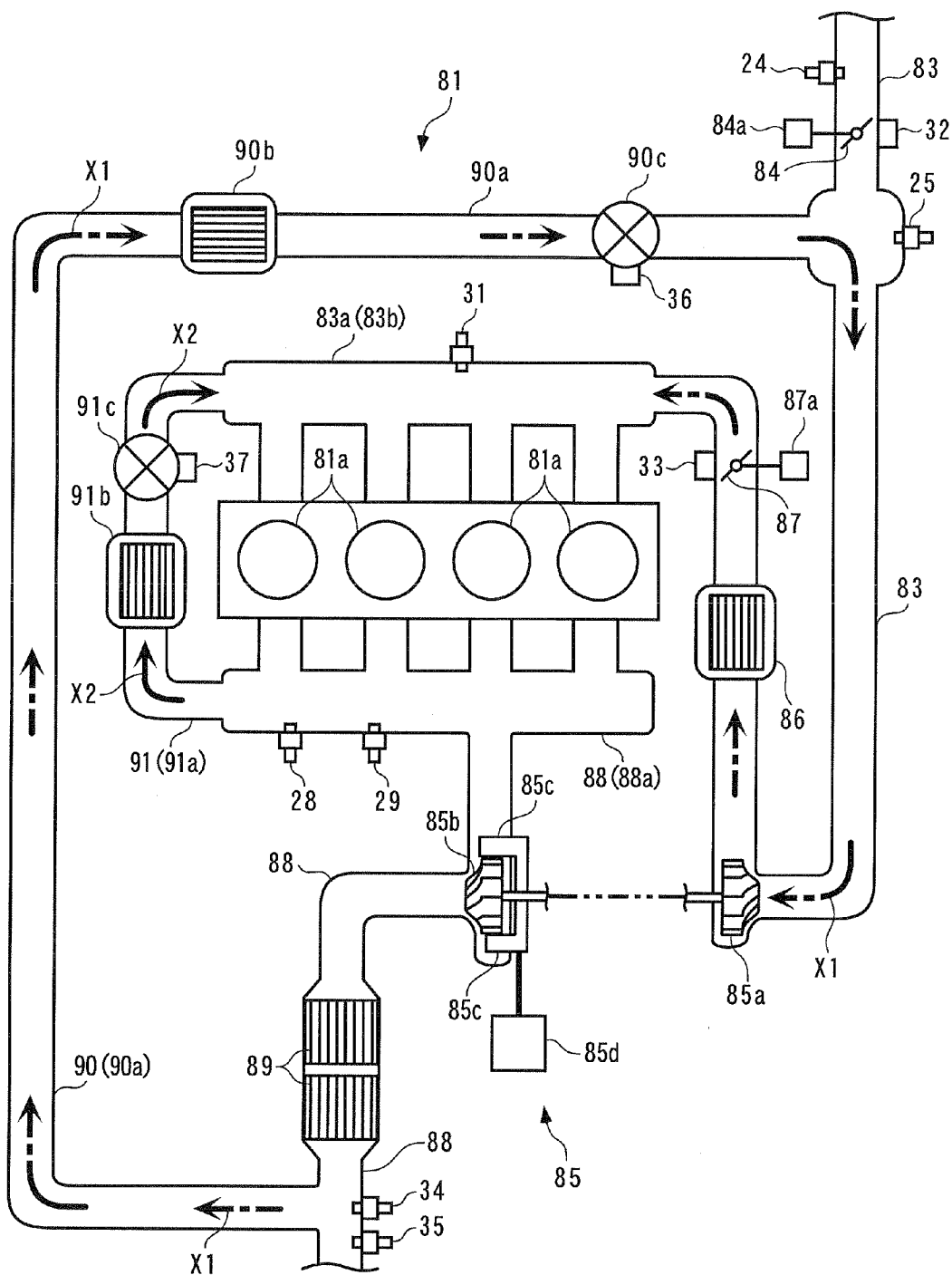
FIG. 16 is a schematic diagram of an internal combustion engine to which is applied a control system according to a second embodiment of the present invention.
Figure 17:
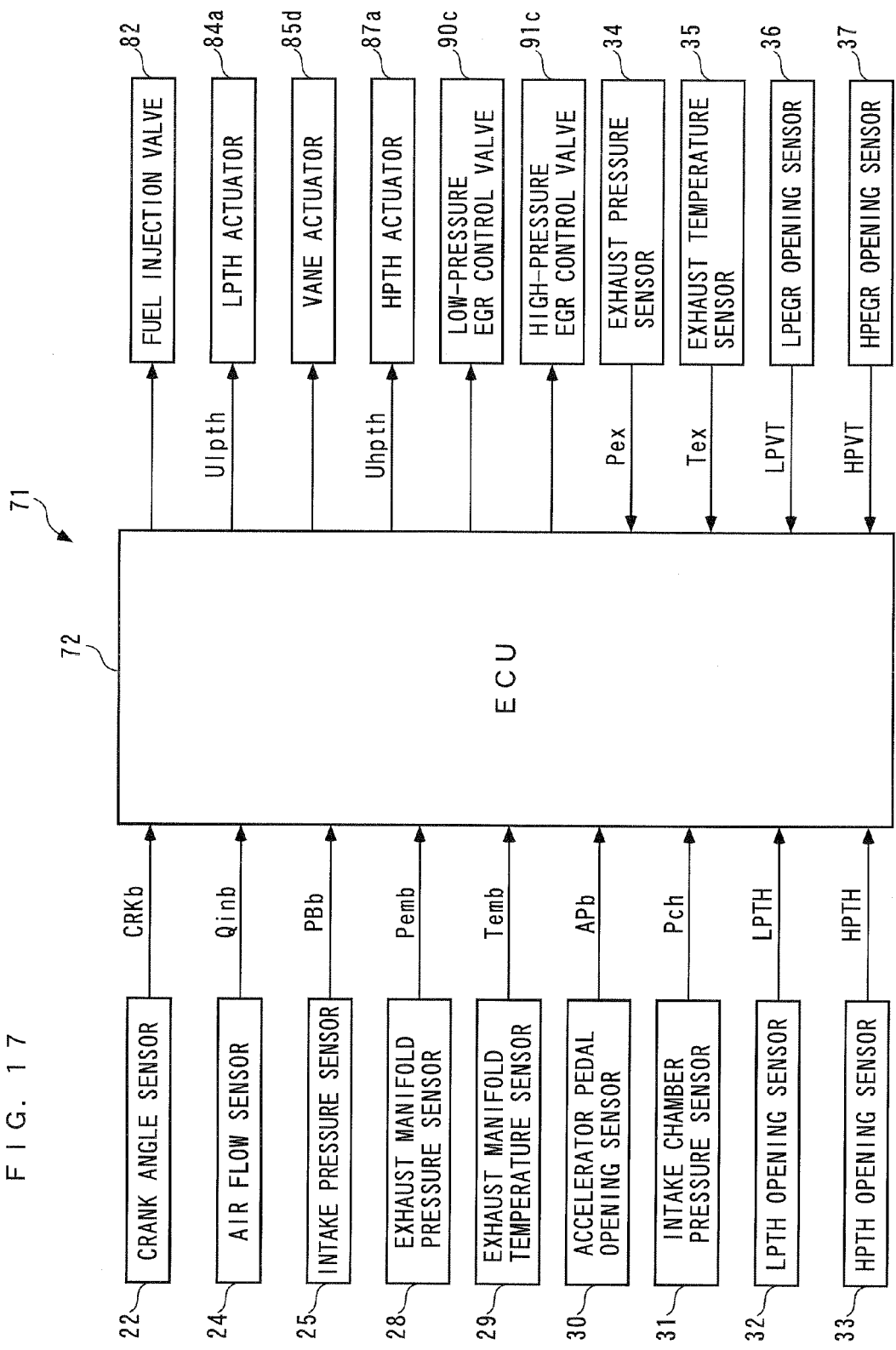
FIG. 17 is a block diagram of an ECU and the like of the control system according to the second embodiment.

Next, a control system 71 according to a second embodiment of the present invention will be described. FIG. 16 is a schematic diagram of an internal combustion engine 81 to which is applied the control system 71, and FIG. 17 shows an ECU 72 and the like of the control system 71. In FIGS. 16 and 17, and other figures, referred to hereinafter, the same component elements as those of the first embodiment are denoted by the same reference numerals. The following description is mainly given of different points from the first embodiment.

Differently from the first embodiment, the internal combustion engine (hereinafter simply referred to as the "engine") 81 is not a gasoline engine but a diesel engine that is installed on a vehicle, not shown, as a motive power source. Further, the engine 81 is equipped with four cylinders 81a and fuel injection valves 82 (only one of which is shown in FIG. 17) provided for the respective cylinders 81a. Similarly to the first embodiment, the valve-opening time period of each fuel injection valve 82, i.e. the fuel injection amount of fuel to be injected by the fuel injection valve 82 is controlled based on a fuel injection amount TOUTb calculated by the ECU 72.

The engine 81 is provided with the crank angle sensor 22, described in the first embodiment. The crank angle sensor 22 delivers a CRKb signal, which is a pulse signal, to the ECU 72 along with rotation of the crankshaft of the engine 81. The ECU 72 calculates a rotational speed NEb of the engine 81 (hereinafter referred to as the "engine speed NEb") based on the CRKb signal from the crank angle sensor 22.

Further, an intake passage 83 communicates with the four cylinders 81a via an intake manifold 83a, and an exhaust passage 88 communicates with the four cylinders 81a via an exhaust manifold 88a. The air flow sensor 24 mentioned in the first embodiment, a low-pressure throttle valve 84, the intake pressure sensor 25 mentioned in the first embodiment, a turbo-supercharger 85, an intercooler 86, a high-pressure throttle valve 87, and an intake chamber pressure sensor 31 are provided at respective locations of the intake passage 83 from upstream to downstream in the mentioned order.

The low-pressure throttle valve 84 is implemented by a butterfly valve, and forms a low-pressure EGR device 90 together with a low-pressure EGR passage 90a, described hereinafter, and so forth. A low-pressure TH (LPTH) actuator 84a formed by an electric motor is connected to the low-pressure throttle valve 84. A degree of opening of the low-pressure throttle valve 84 (hereinafter referred to as the "low-pressure throttle valve opening") is changed by inputting a low-pressure TH control input Ulpth, referred to hereinafter, from the ECU 72 to the low-pressure TH actuator 84a. This controls a pressure within the intake passage 83 (hereinafter referred to as the "intake pressure") on the downstream side of the low-pressure throttle valve 84. Further, a low-pressure TH (LPTH) opening sensor 32 detects the low-pressure throttle valve opening, denoted by LPTH, and delivers a signal indicative of the detected low-pressure throttle valve opening LPTH to the ECU 72.

The air flow sensor 24 detects a flow rate Qinb of air passing through the low-pressure throttle valve 84 (hereinafter referred to as the "air flow rate Qinb"), and delivers a signal indicative of the detected air flow rate Qinb to the ECU 72. The intake pressure sensor 25 detects the intake pressure, denoted by PBb, as an absolute pressure, and delivers a signal indicative of the detected intake pressure PBb to the ECU 72. The ECU 72 calculates an intake air amount Gcylb of air actually drawn into the engine 81 by searching a predetermined map (not shown) according to the calculated engine speed Neb and the detected intake pressure PBb.

The turbo-supercharger 85 comprises a compressor blade 85a disposed in the intake passage 83 at a location downstream of the intake pressure sensor 25, a turbine blade 85b disposed in the exhaust passage 88, for rotation in unison with the compressor blade 85a, a plurality of variable vanes 85c (only two of which are shown), and a vane actuator 85d for actuating the variable vanes 85c.

In the turbo-supercharger 85, as the turbine blade 85b is driven for rotation by exhaust gases flowing through the exhaust passage 88, the compressor blade 85a integrally formed with the turbine blade 85b simultaneously rotates, whereby air within the intake passage 83 is pressurized. That is, a supercharging operation is executed.

Further, the variable vanes 85c vary boost pressure generated by the turbo-supercharger 85, and are pivotally mounted on a housing that accommodates the turbine blade 85b. The variable vanes 85c are connected to the vane actuator 85d connected to the ECU 72. The ECU 72 changes the degree of opening of the variable vanes 85c via the vane actuator 85d to change the amount of exhaust gases blown to the turbine blade 85b, whereby the rotational speed of the turbine blade 85b, that is, the rotational speed of the compressor blade 85a, is changed to thereby control the boost pressure.

The intercooler 86 is of a water cooling type. When intake air passes through the intercooler 86, the intercooler 86 cools the intake air the temperature of which has been raised by the supercharging operation by the turbo-supercharger 85.

Further, the high-pressure throttle valve 87 is implemented by a butterfly valve, similarly to the above-mentioned low-pressure throttle valve 84, and forms a high-pressure EGR device 91 together with a high-pressure EGR passage 91a, referred to hereinafter, etc. A high-pressure TH (LPTH) actuator 87a formed by an electric motor is connected to the high-pressure throttle valve 87. A degree of opening of the high-pressure throttle valve 87 (hereinafter referred to as the "high-pressure throttle valve opening") is changed by inputting a high-pressure TH control input Uhpth, referred to hereinafter, from the ECU 72 to the high-pressure TH actuator 87a. This controls a pressure within an intake chamber 83b of the intake manifold 83a (hereinafter referred to as the "intake chamber pressure"). Further, a high-pressure TH (HPTH) opening sensor 33 detects the high-pressure throttle valve opening, denoted by HPTH, and delivers a signal indicative of the detected high-pressure throttle valve opening HPTH to the ECU 72.

The above-mentioned intake chamber pressure sensor 31 is implemented e.g. by a semiconductor pressure sensor, and detects the intake chamber pressure, denoted by Pch, as an absolute pressure, to deliver a signal indicative of the detected intake chamber pressure Pch to the ECU 72.

Further, in the exhaust passage 88, there are disposed the exhaust manifold pressure sensor 28 and the exhaust manifold temperature sensor 29, described in the first embodiment, the above-mentioned turbine blade 85b, a catalytic device 89, an exhaust pressure sensor 34, and an exhaust temperature sensor 35, at respective locations from upstream to downstream in the mentioned order.

The exhaust manifold pressure sensor 28 detects a pressure Pemb within the exhaust manifold 88a (hereinafter referred to as the "exhaust manifold pressure Pemb") as an absolute pressure, and delivers a signal indicative of the detected exhaust manifold pressure Pemb to the ECU 72.

The catalytic device 89 is for purifying exhaust gases flowing through the exhaust passage 88, and is formed by combining an oxidation catalyst and a filter. Further, the exhaust pressure sensor 34 detects a pressure Pex of exhaust gases having passed through the catalytic device 89 (hereinafter referred to as the "exhaust pressure Pex"), and delivers a signal indicative of the detected exhaust pressure Pex to the ECU 72. The exhaust temperature sensor 35 detects a temperature Tex of exhaust gases having passed through the catalytic device 89 (hereinafter referred to as the "exhaust temperature Tex"), and delivers a signal indicative of the detected exhaust temperature Tex to the ECU 72.

Furthermore, the engine 81 is provided with the low-pressure EGR device 90 and the high-pressure EGR device 91. The low-pressure EGR device 90 is for recirculating part of exhaust gases from the exhaust passage 88 into the intake passage 83, and comprises the low-pressure EGR passage 90a connected to the intake passage 83 and the exhaust passage 88, a low-pressure EGR cooler 90b for cooling recirculated gases flowing through the low-pressure EGR passage 90a (hereinafter referred to as the "low-pressure EGR gas"), and a low-pressure EGR control valve 90c for opening and closing the low-pressure EGR passage 90a. One end of the low-pressure EGR passage 90a is connected to a portion of the exhaust passage 88 at a location downstream of the catalytic device 89, and the other end thereof is connected between the low-pressure throttle valve 84 and the compressor blade 85a in the intake passage 83.

The low-pressure EGR control valve 90c is implemented by a linear solenoid valve the degree of opening of which is linearly varied between a maximum value and a minimum value thereof. A degree of opening of the low-pressure EGR control valve 90c (hereinafter referred to as the "low-pressure EGR control valve opening") is changed by the ECU 72. An amount of the recirculated low-pressure EGR gas (hereinafter referred to as the "low-pressure EGR gas flow rate") is controlled by cooperation of the control of the differential pressure between pressures upstream and downstream of the low-pressure EGR control valve 90c through the control of the intake pressure by changing the above-mentioned low-pressure throttle valve opening LPTH, and the change of the low-pressure EGR control valve opening, denoted by LPVT.

Further, a low-pressure EGR (LPEGR) opening sensor 36 detects the low-pressure EGR control valve opening LPVT, and delivers a signal indicative of the detected low-pressure EGR control valve opening LPVT to the ECU 72. The ECU 72 calculates a target low-pressure EGR gas flow rate LPEGR_cmd, which is a target value of the low-pressure EGR gas flow rate, as described hereinafter. Then, the ECU 72 calculates a target value of the low-pressure EGR control valve opening LPVT by searching a predetermined map (not shown) according to the calculated target low-pressure EGR gas flow rate LPEGR_cmd, and controls the low-pressure EGR control valve opening LPVT such that it becomes equal to the calculated target value.

With the arrangement described above, in the low-pressure EGR device 90, the low-pressure EGR gas flows into the low-pressure EGR passage 90a from the portion of the exhaust passage 88 at the location downstream of the catalytic device 89, flows in a direction indicated by an arrow X1 in FIG. 16, passes through the low-pressure EGR cooler 90b and the low-pressure EGR control valve 90c, and then flows into the intake passage 83. Subsequently, after passing through the compressor blade 85a and the intercooler 86 together with fresh air, the low-pressure EGR gas flows into the cylinders 81a via the intake manifold 83a.

Further, similarly to the low-pressure EGR device 90, the high-pressure EGR device 91 as well is for recirculating part of exhaust gases from the exhaust passage 88 into the intake passage 83, and comprises the high-pressure EGR passage 91a connected to the intake passage 83 and the exhaust passage 88, a high-pressure EGR cooler 91b for cooling recirculated gases flowing through the high-pressure EGR passage 91a (hereinafter referred to as the "high-pressure EGR gas"), and a high-pressure EGR control valve 91c for opening and closing the high-pressure EGR passage 91a. One end of the high-pressure EGR passage 91a is connected to the exhaust manifold 88a of the exhaust passage 88, and the other end thereof is connected to the intake manifold 83a of the intake passage 83.

The high-pressure EGR control valve 91c is implemented by a linear solenoid valve the degree of opening of which is linearly varied between a maximum value and a minimum value thereof. A degree of opening of the high-pressure EGR control valve 91c (hereinafter referred to as the "high-pressure EGR control valve opening") is changed by the ECU 72. An amount of the recirculated high-pressure EGR gas (hereinafter referred to as the "high-pressure EGR gas flow rate") is controlled by cooperation of the control of the differential pressure between pressures upstream and downstream of the high-pressure EGR control valve 91c through the control of the intake chamber pressure Pch by changing the above-mentioned high-pressure throttle valve opening HPTH, and the change of the high-pressure EGR control valve opening HPVT.

Further, a high-pressure EGR (HPEGR) opening sensor 37 detects the high-pressure EGR control valve opening, denoted by HPVT, and delivers a signal indicative of the detected high-pressure EGR control valve opening HPVT to the ECU 72. The ECU 72 calculates a target high-pressure EGR gas flow rate HPEGR_cmd, which is a target value of the high-pressure EGR gas flow rate, denoted by HPEGR, as described hereinafter, and calculates a target value of the high-pressure EGR control valve opening HPVT by searching a predetermined map (not shown) according to the calculated target high-pressure EGR gas flow rate HPEGR_cmd, thereby controlling the high-pressure EGR control valve opening HPVT such that it becomes equal to the calculated target value.

With the arrangement described above, in the high-pressure EGR device 91, the high-pressure EGR gas flows into the high-pressure EGR passage 91a from the exhaust manifold 88a, flows in a direction indicated by an arrow X2 in FIG. 16, passes through the high-pressure EGR cooler 91b and the high-pressure EGR control valve 91c, and then flows into the intake manifold 83a. Subsequently, the high-pressure EGR gas flows into the cylinders 81a via the intake manifold 83a together with low-pressure EGR gas and fresh air.

The above-mentioned accelerator pedal opening sensor 30 detects an accelerator pedal opening APb, and delivers a signal indicative of the detected accelerator pedal opening APb to the ECU 72.

Further, similarly to the first embodiment, the ECU 72 is implemented by a microcomputer comprising a CPU, a RAM, a ROM, and an I/O interface (none of which are specifically shown). Furthermore, the ECU 72 controls the engine 81 based on the detection signals from the above-mentioned various types of sensors 22, 24, 25 and 28 to 37, according to control programs stored in the ROM.

Figure 18:
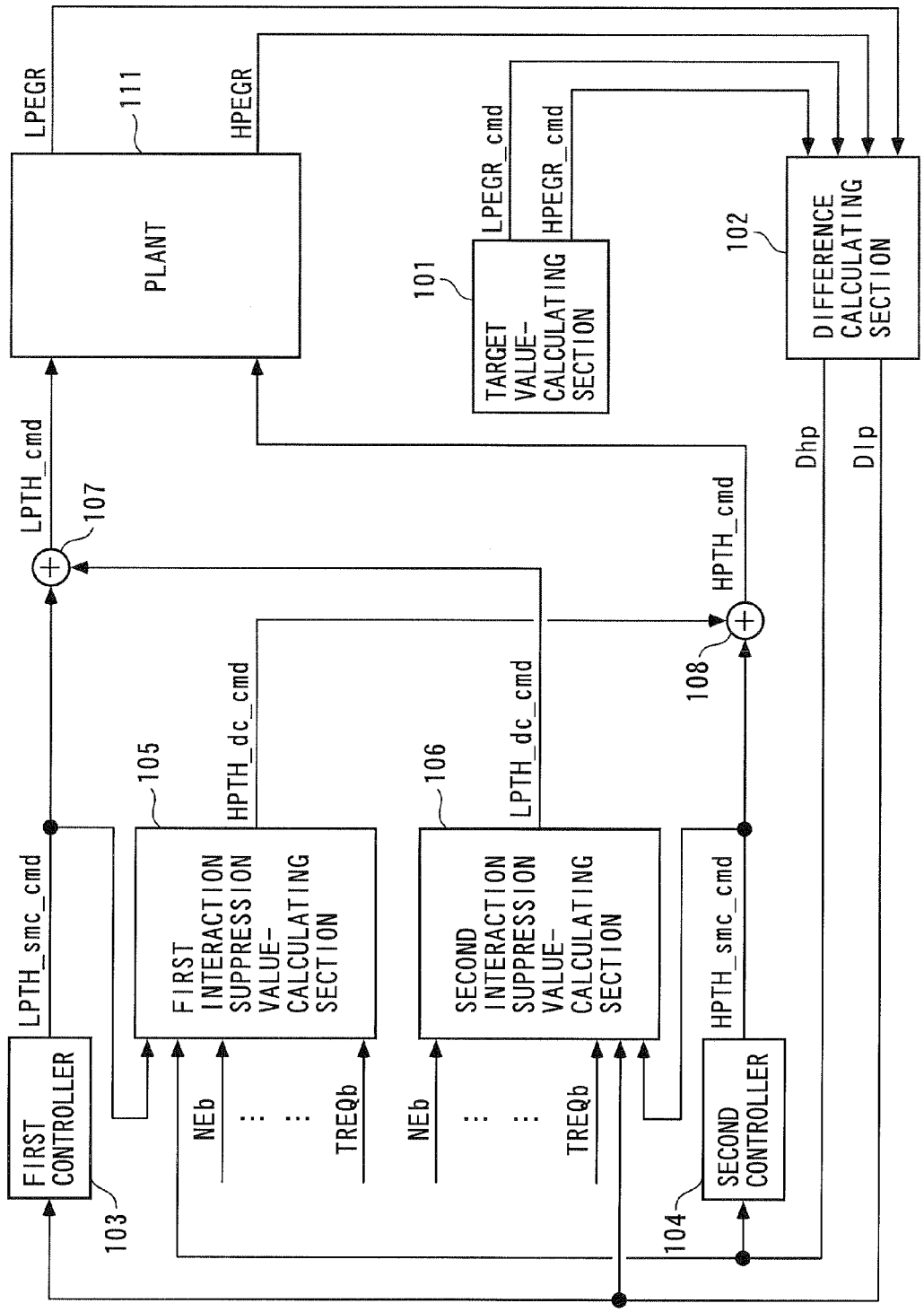
FIG. 18 is a block diagram of a plant control unit provided in the ECU appearing in FIG. 17 together with a plant.

Specifically, the ECU 72 includes a plant control unit, as shown in FIG. 18, which comprises a target value-calculating section 101, a difference calculating section 102, a first controller 103, a second controller 104, a first interaction suppression value-calculating section 105, a second interaction suppression value-calculating section 106, a first adder 107, and a second adder 108. The plant control unit controls a plant 111 including the engine 81.

Figure 19:
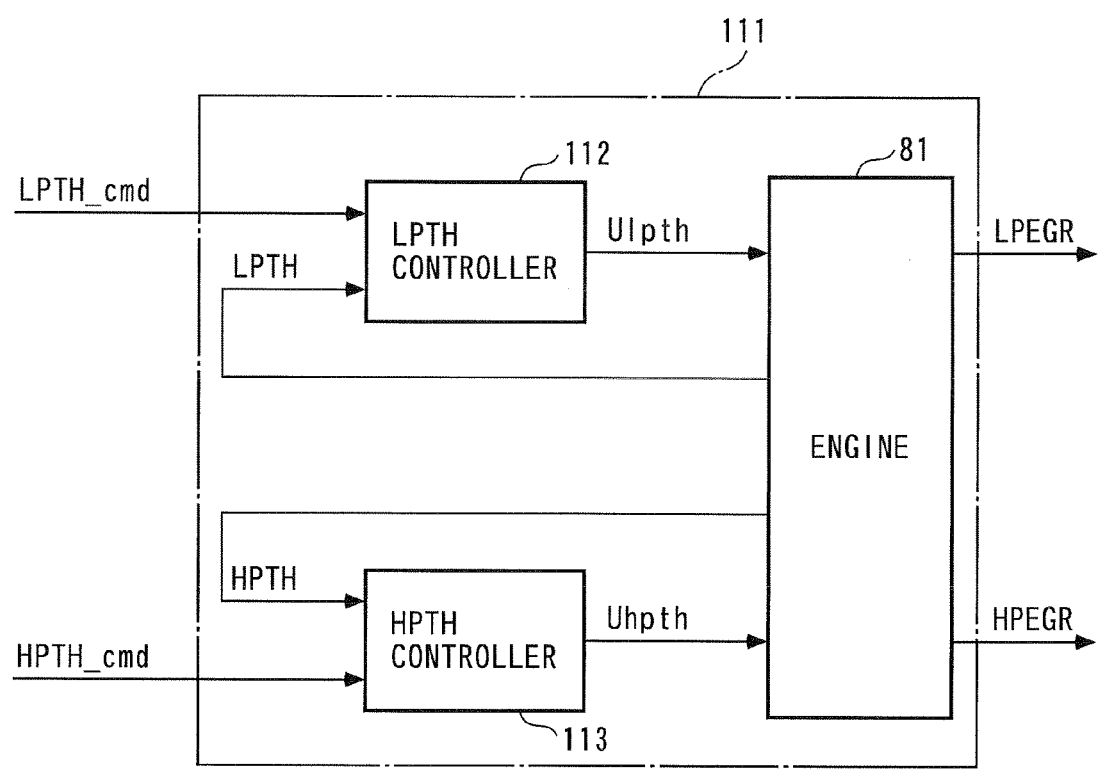
FIG. 19 is a block diagram of the plant appearing in FIG. 18.

As shown in FIG. 19, the plant 111 is defined as a system in which a target low-pressure throttle valve opening LPTH_cmd and a target high-pressure throttle valve opening HPTH_cmd are set as control inputs, and the low-pressure EGR gas flow rate LPEGR and the high-pressure EGR gas flow rate HPEGR are set as controlled variables. Specifically, the plant 111 is formed by a low-pressure TH (LPTH) controller 112, a high-pressure TH (HPTH) controller 113, the engine 81, and so forth. The low-pressure and high-pressure TH controllers 112 and 113 are implemented by the ECU 72. The above-mentioned target low-pressure throttle valve opening LPTH_cmd and target high-pressure throttle valve opening HPTH_cmd are the target values of the low-pressure throttle valve opening LPTH and the high-pressure throttle valve opening HPTH, respectively, and are calculated as described hereinafter.

Further, the low-pressure EGR gas flow rate LPEGR and the high-pressure EGR gas flow rate HPEGR are calculated by the ECU 72 as follows: The low-pressure EGR gas flow rate LPEGR is calculated using a physical equation based on a nozzle equation in which the low-pressure EGR control valve 90c is regarded as a nozzle, according to the intake pressure PBa, the detected exhaust pressure Pex, the low-pressure EGR control valve opening LPVT, and the exhaust temperature Tex. Further, the high-pressure EGR gas flow rate HPEGR is calculated using a physical equation based on a nozzle equation in which the high-pressure EGR control valve 91c is regarded as a nozzle, according to the intake chamber pressure Pch, the detected exhaust manifold pressure Pemb, the high-pressure EGR control valve opening HPVT, and an exhaust manifold temperature Temb. The above physical equations are the same as disclosed by the present assignee in Japanese Laid-Open Patent Publication (Kokai) No. 2010-137132, and hence detailed description thereof is omitted.

The low-pressure and high-pressure EGR gas flow rates LPEGR and HPEGR may be calculated using respective neural networks in place of the above-mentioned physical equations. Further, the intake pressure PBb, the exhaust pressure Pex, the intake chamber pressure Pch, and the exhaust manifold pressure Pemb may be calculated by computation without being detected by the associated sensors. In this case, the above pressures PBb, Pex, Pch and Pemb are calculated using physical equations or neural networks.

Further, the detected low-pressure throttle valve opening LPTH and the target low-pressure throttle valve opening LPTH_cmd are input to the low-pressure TH controller 112. The low-pressure TH controller 112 calculates the above-mentioned low-pressure TH control input Ulpth according to the input low-pressure throttle valve opening LPTH and target low-pressure throttle valve opening LPTH_cmd, with a predetermined feedback control algorithm, e.g. the above-mentioned target value filter-type two-degree-of-freedom response-specifying control algorithm, and outputs the low-pressure TH control input Ulpth to the low-pressure TH actuator 84a. This controls the low-pressure throttle valve opening LPTH such that it converges to the target low-pressure throttle valve opening LPTH_cmd.

Further, the detected high-pressure throttle valve opening HPTH and the target high-pressure throttle valve opening HPTH_cmd are input to the high-pressure TH controller 113. The high-pressure TH controller 113 calculates the above-mentioned high-pressure TH control input Uhpth according to the input high-pressure throttle valve opening HPTH and target high-pressure throttle valve opening HPTH_cmd, with a predetermined feedback control algorithm, e.g. the target value filter-type two-degree-of-freedom response-specifying control algorithm, and outputs the high-pressure TH control input Uhpth to the high-pressure TH actuator 87a. This controls the high-pressure throttle valve opening HPTH such that it converges to the target high-pressure throttle valve opening HPTH_cmd.

In the plant 111 configured as above, as the low-pressure throttle valve opening LPTH is controlled such that it converges to the target low-pressure throttle valve opening LPTH_cmd, the differential pressure between pressures upstream and downstream of the low-pressure EGR control valve 90c is changed to change the low-pressure EGR gas flow rate LPEGR, and the differential pressure between pressures upstream and downstream of the high-pressure EGR control valve 91c is changed to change the high-pressure EGR gas flow rate HPEGR as well. Further, as the high-pressure throttle valve opening HPTH is controlled such that it converges to the target high-pressure throttle valve opening HPTH_cmd, the differential pressure between pressures upstream and downstream of the high-pressure EGR control valve 91c is changed to change the high-pressure EGR gas flow rate HPEGR, and the differential pressure between pressures upstream and downstream of the low-pressure EGR control valve 90c is changed to change the low-pressure EGR gas flow rate LPEGR as well.

As described above, the plant 111 is configured as an interacting system in which interaction occurs between the target low-pressure throttle valve opening LPTH_cmd and the target high-pressure throttle valve opening HPTH_cmd as control inputs, and the low-pressure EGR gas flow rate LPEGR and the high-pressure EGR gas flow rate HPEGR as controlled variables.

Therefore, the plant control unit shown in FIG. 18 calculates the target low-pressure throttle valve opening LPTH_cmd and target high-pressure throttle valve opening HPTH_cmd as such control inputs that will make it possible to properly control the low-pressure EGR gas flow rate LPEGR and the high-pressure EGR gas flow rate HPEGR, while suppressing the interaction. Hereinafter, a detailed description will be given of the aforementioned target value-calculating section 101 etc. forming the plant control unit.

The target value-calculating section 101 calculates the target low-pressure EGR gas flow rate LPEGR_cmd and the target high-pressure EGR gas flow rate HPEGR_cmd by searching predetermined first and second maps (neither of which is shown) according to the calculated engine speed NEb and a demanded torque TREQb, respectively, and sends the calculated target low-pressure EGR gas flow rate LPEGR_cmd and target high-pressure EGR gas flow rate HPEGR_cmd to the difference calculating section 102. As described hereinabove, the target low-pressure EGR gas flow rate LPEGR_cmd and the target high-pressure EGR gas flow rate HPEGR cm are the target values of the low-pressure EGR gas flow rate LPEGR and the high-pressure EGR gas flow rate HPEGR, respectively. Further, the demanded torque TREQb is a torque demanded of the engine 81, and is calculated by searching a predetermined map (not shown) according to the engine speed NEb and the accelerator pedal opening APb.

To the difference calculating section 102 are input not only the above-mentioned target low-pressure EGR gas flow rate LPEGR_cmd and the target high-pressure EGR gas flow rate HPEGR_cmd but also the calculated low-pressure EGR gas flow rate LPEGR and high-pressure EGR gas flow rate HPEGR. The difference calculating section 102 calculates the difference between the target low-pressure EGR gas flow rate LPEGR_cmd and the low-pressure EGR gas flow rate LPEGR as a low-pressure EGR gas flow rate difference Dlp, and calculates the difference between the target high-pressure EGR gas flow rate HPEGR_cmd and the high-pressure EGR gas flow rate HPEGR as a high-pressure EGR gas flow rate difference Dhp. Further, the calculated low-pressure EGR gas flow rate difference Dlp is output to the first controller 103 and the second interaction suppression value-calculating section 106, and the calculated high-pressure EGR gas flow rate difference Dhp is output to the second controller 104 and the first interaction suppression value-calculating section 105.

The first controller 103 calculates a provisional value LPTH_smc_cmd of the target low-pressure throttle valve opening according to the input low-pressure EGR gas flow rate difference Dlp with a predetermined feedback control algorithm, e.g. the above-mentioned response-specifying control algorithm. As a consequence, the provisional value LPTH_smc_cmd is calculated to be such a value that will cause the low-pressure EGR gas flow rate LPEGR to converge to the target low-pressure EGR gas flow rate LPEGR_cmd. Further, the calculated provisional value LPTH_smc_cmd is output to the first interaction suppression value-calculating section 105 and the first adder 107.

The second controller 104 calculates a provisional value HPTH_smc_cmd of the target high-pressure throttle valve opening according to the input high-pressure EGR gas flow rate difference Dhb with a predetermined feedback control algorithm, e.g. the response-specifying control algorithm. As a consequence, the provisional value HPTH_smc_cmd is calculated to be such a value that will cause the high-pressure EGR gas flow rate HPEGR to converge to the target high-pressure EGR gas flow rate HPEGR_cmd. Further, the calculated provisional value HPTH_smc_cmd is output to the second interaction suppression value-calculating section 106 and the second adder 108.

The first and second interaction suppression value-calculating sections 105 and 106 calculate a first interaction suppression value HPTH_dc_cmd and a second interaction suppression value LPTH_dc_cmd using neural networks, respectively. Similarly to the first embodiment, each of the neural networks employed by the first and second interaction suppression value-calculating sections 105 and 106 is the three-layered hierarchical neural network NN shown in FIG. 6. Further, the first interaction suppression value HPTH_dc_cmd is a parameter for correcting the target high-pressure throttle valve opening HPTH_cmd so as to suppress interaction of the target low-pressure throttle valve opening LPTH_cmd with the high-pressure EGR gas flow rate HPEGR. Further, the second interaction suppression value LPTH_dc_cmd is a parameter for correcting the target low-pressure throttle valve opening LPTH_cmd so as to suppress interaction of the target high-pressure throttle valve opening HPTH_cmd with the low-pressure EGR gas flow rate LPEGR.

Figure 20:
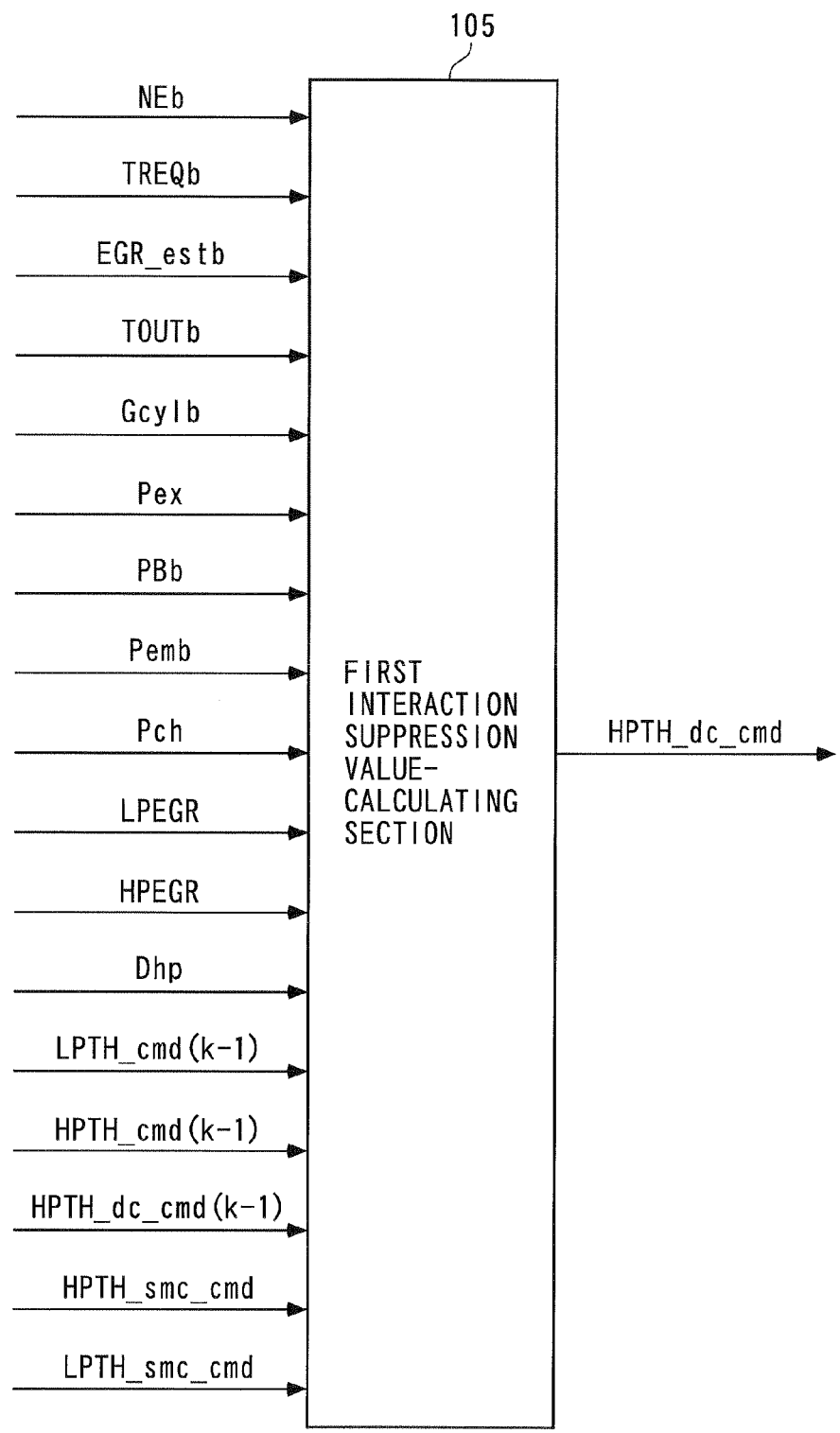
FIG. 20 is a block diagram of the first interaction suppression value-calculating section appearing in FIG. 18.

More specifically, as shown in FIG. 20, not only the above-mentioned high-pressure EGR gas flow rate difference Dhp and the provisional value LPTH_smc_cmd but also operating condition parameters indicative of the operating conditions of the engine 81, and so forth are input to the first interaction suppression value-calculating section 105. The operating condition parameters include the engine speed NEb, the demanded torque TREQb, an estimated EGR ratio EGR_estb, the fuel injection amount TOUTb, the intake air amount Gcylb, the exhaust pressure Pex, the intake pressure PBb, the exhaust manifold pressure Pemb, the intake chamber pressure Pch, the low-pressure EGR gas flow rate LPEGR, and the high-pressure EGR gas flow rate HPEGR. To the first interaction suppression value-calculating section 105 are further input the immediately preceding value LPTH_cmd(k−1) of the target low-pressure throttle valve opening, the immediately preceding value HPTH_cmd(k−1) of the target high-pressure throttle valve opening, the immediately preceding value HPTH_dc_cmd(k−1) of the first interaction suppression value, and the provisional value HPTH_smc_cmd of the target high-pressure throttle valve opening.

Further, the above-mentioned estimated EGR ratio EGR_estb is a ratio of the sum of the low-pressure and high-pressure EGR gas flow rates LPEGR and HPEGR to the intake air amount Gcylb of fresh air and EGR gases drawn into the engine 81.

The first interaction suppression value-calculating section 105 calculates the first interaction suppression value HPTH_dc_cmd according to the above-mentioned input parameters, using the three-layered hierarchical neural network, as follows: First, in the input layer, a value Vc1j is calculated using the above-mentioned parameters, such as the engine speed NEb, as inputs Uc by the following equations (28) to (31), and is output to the intermediate layer.

$$Uc(k) = [Uc1(k), Uc2(k), \ldots Ucm(k)]^T \quad (28)$$
$$= [NEb(k), TREQb(k), \ldots LPTH\_smc\_cmd(k)]^T$$

$$Tc1j(k) = Ucj(k) \quad (29)$$

$$Vc1j(k) = fc(Tc1j(k)) \quad (30)$$

$$fc(x) = \frac{1}{1 + e^{-\beta cx}} + \varepsilon c \quad (31)$$

In the above equation (30), fc represents a sigmoid function defined by the above equation (31). In the equation (31), $\beta c$ represents a slope gain of the sigmoid function, and $\varepsilon c$ represents an offset value of the sigmoid function. The values $\beta c$ and $\varepsilon c$ are set to predetermined values determined empirically e.g. by experiment.

In the intermediate layer, a value Vcij is calculated based on the input value Vc1j, assuming that i=2 to n, by the following equations (32) and (33), and is output to the output layer. In the equation (32), $\omega c$ represents a weighting factor, and is learned and set by a learning section 121, described hereinafter.

$$Tcij(k) = \sum_{N=1}^{m} \omega ci - 1N \cdot Vci - 1N(k) \quad (32)$$

$$Vcij(k) = fc(Tcij(k)) \quad (33)$$

Further, in the output layer, an output Yc is calculated based on the input value Vcij by the following equations (34) to (36):

$$Tcnj(k) = \sum_{N=1}^{m} \omega cnN \cdot VcnN(k) \quad (34)$$

$$Yc(k) = gc(Tcnj(k)) \quad (35)$$

$$gc(x) = \frac{\alpha c}{1 + e^{-\gamma cx}} + \delta c \quad (36)$$

In the above equation (35), gc represents a sigmoid function defined by the above equation (36). In the equation (36), $\alpha c$ represents an output gain of the sigmoid function, $\gamma c$ represents a slope gain of the sigmoid function, and $\delta c$ represents an offset value of the sigmoid function. The values $\alpha c$, $\gamma c$, and $\delta c$ are set to predetermined values determined empirically e.g. by experiment.

Further, the calculated output Yc is set as the first interaction suppression value HPTH_dc_cmd, and is output to the second adder 108.

Figure 21:
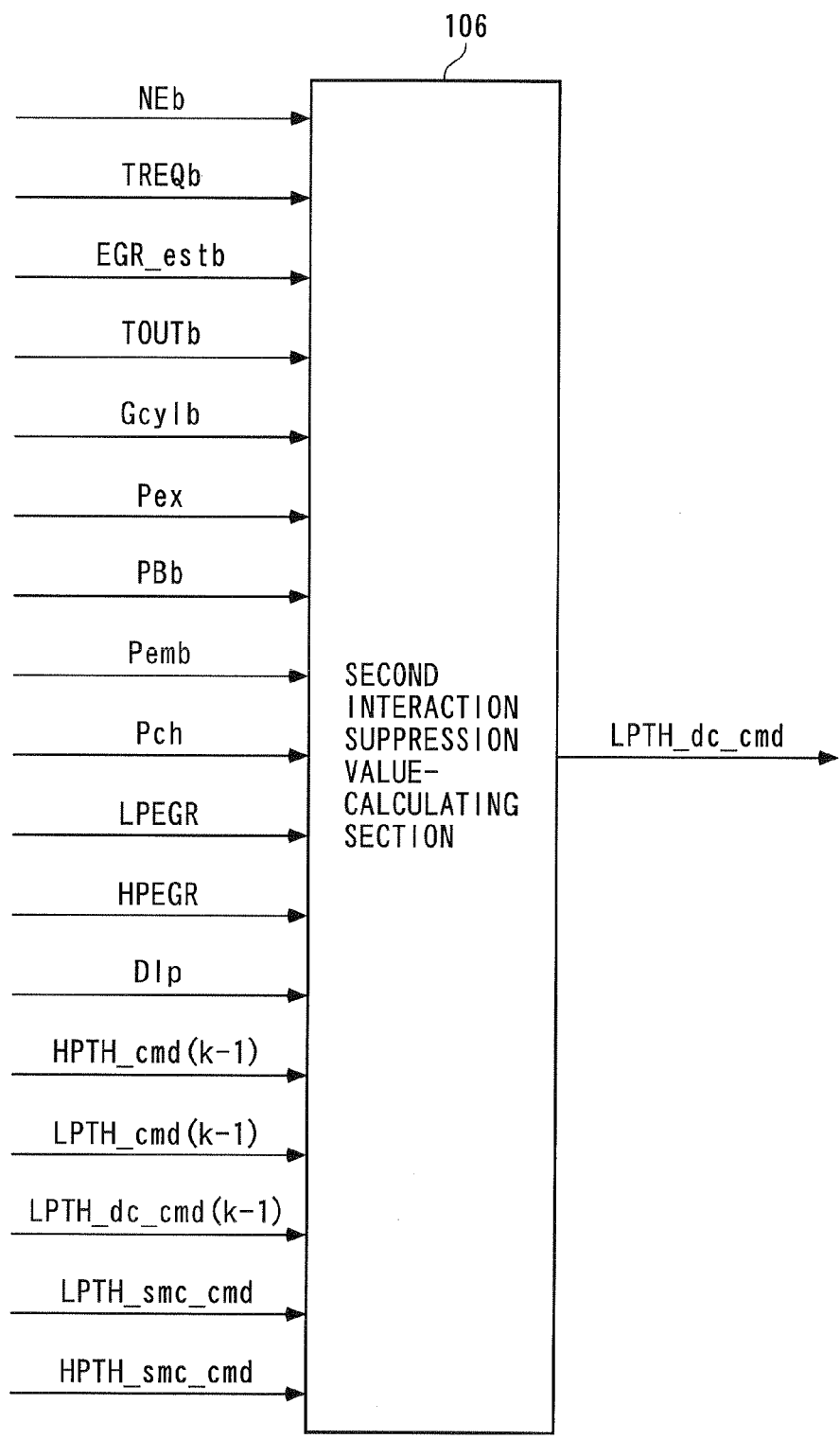
FIG. 21 is a block diagram of the second interaction suppression value-calculating section appearing in FIG. 18.

Furthermore, as shown in FIG. 21, not only the above-mentioned low-pressure EGR gas flow rate difference Dlp and the provisional value HPTH_smc_cmd but also the operating condition parameters indicative of the operating conditions of the engine 81 and so forth are input to the second interaction suppression value-calculating section 106. Similarly to the case of the first interaction suppression value-calculating section 105, these operating condition parameters include the engine speed NEb, the demanded torque TREQb, the estimated EGR ratio EGR_estb, the fuel injection amount TOUTb, the intake air amount Gcylb, the exhaust pressure Pex, the intake pressure PBb, the exhaust manifold pressure Pemb, the intake chamber pressure Pch, the low-pressure EGR gas flow rate LPEGR, and the high-pressure EGR gas flow rate HPEGR. To the second interaction suppression value-calculating section 106 are further input the immediately preceding value HPTH_cmd(k−1) of the target high-pressure throttle valve opening, the immediately preceding value LPTH_cmd(k−1) of the target low-pressure throttle valve opening, the immediately preceding value LPTH_dc_cmd(k−1) of the second interaction suppression value, and the provisional value LPTH_smc_cmd of the target low-pressure throttle valve opening.

The second interaction suppression value-calculating section 106 calculates the second interaction suppression value LPTH_dc_cmd according to the above-mentioned input parameters, using the three-layered hierarchical neural network, as follows: First, in the input layer, a value Vd1j is calculated using the parameters, such as the above-mentioned engine speed NEb, as inputs Ud, by the following equations (37) to (40), and is output to the intermediate layer.

$$Ud(k) = [Ud1(k), Ud2(k), \ldots Udm(k)]^T \quad (37)$$
$$= [NEb(k), TREQb(k), \ldots HPTH\_smc\_cmd(k)]^T$$

$$Tdlj(k) = Udj(k) \quad (38)$$

$$Vdlj(k) = fd(Tdlj(k)) \quad (39)$$

$$fd(x) = \frac{1}{1+e^{-\beta dx}} + \varepsilon d \quad (40)$$

In the above equation (39), fd represents a sigmoid function defined by the above equation (40). In the equation (40), βd represents a slope gain of the sigmoid function, and εd represents an offset value of the sigmoid function. The values βd and εd are set to predetermined values determined empirically e.g. by experiment.

In the intermediate layer, a value Vdij is calculated based on the input value Vd1j, assuming that i=2 to n, by the following equations (41) and (42), and is output to the output layer. In the equation (41), ωd represents a weighting factor, and is learned and set by the learning section 121.

$$Tdij(k) = \sum_{N=1}^{m} \omega di - 1N \cdot Vdi - 1N(k) \quad (41)$$

$$Vdij(k) = fd(Tdij(k)) \quad (42)$$

Further, in the output layer, the output Yb is calculated based on the input value Vdij by the following equations (43) to (45):

$$Tdnj(k) = \sum_{N=1}^{m} \omega dnN \cdot VdnN(k) \quad (43)$$

$$Yd(k) = gd(Tdnj(k)) \quad (44)$$

$$gd(x) = \frac{\alpha d}{1+e^{-\gamma dx}} + \delta d \quad (45)$$

In the above equation (44), gd represents a sigmoid function defined by the above equation (45). In the equation (45), αd represents an output gain of the sigmoid function, γd represents a slope gain of the sigmoid function, and δd represents an offset value of the sigmoid function. The values αd, γd, and δd are set to predetermined values determined empirically e.g. by experiment.

Further, the calculated output Yd is set as the second interaction suppression value LPTH_dc_cmd, and is output to the first adder 107.

The first adder 107 calculates the target low-pressure throttle valve opening LPTH_cmd by adding the second interaction suppression value LPTH_dc_cmd to the input provisional value LPTH_smc_cmd. This causes the target low-pressure throttle valve opening LPTH_cmd to be corrected based on the second interaction suppression value LPTH_dc_cmd such that the target low-pressure throttle valve opening LPTH_cmd suppresses the above-mentioned interaction. Further, the calculated target low-pressure throttle valve opening LPTH_cmd is output to the above-mentioned low-pressure TH controller 112.

The second adder 108 calculates the target high-pressure throttle valve opening HPTH_cmd by adding the first interaction suppression value HPTH_dc_cmd to the input provisional value HPTH_smc_cmd. This causes the target high-pressure throttle valve opening HPTH_cmd to be corrected based on the first interaction suppression value HPTH_dc_cmd such that the target high-pressure throttle valve opening HPTH_cmd suppresses the above-mentioned interaction. Further, the calculated target high-pressure throttle valve opening HPTH_cmd is output to the above-mentioned high-pressure TH controller 113.

Next, the learning of the above-mentioned weighting factors ωc and ωd performed by the learning section 121 will be described with reference to FIGS. 22 to 29. Similarly to the first embodiment, this learning is performed at a service station during inspection of the vehicle before or after shipment thereof, in a state where the engine 81 is being driven.

Figure 22:
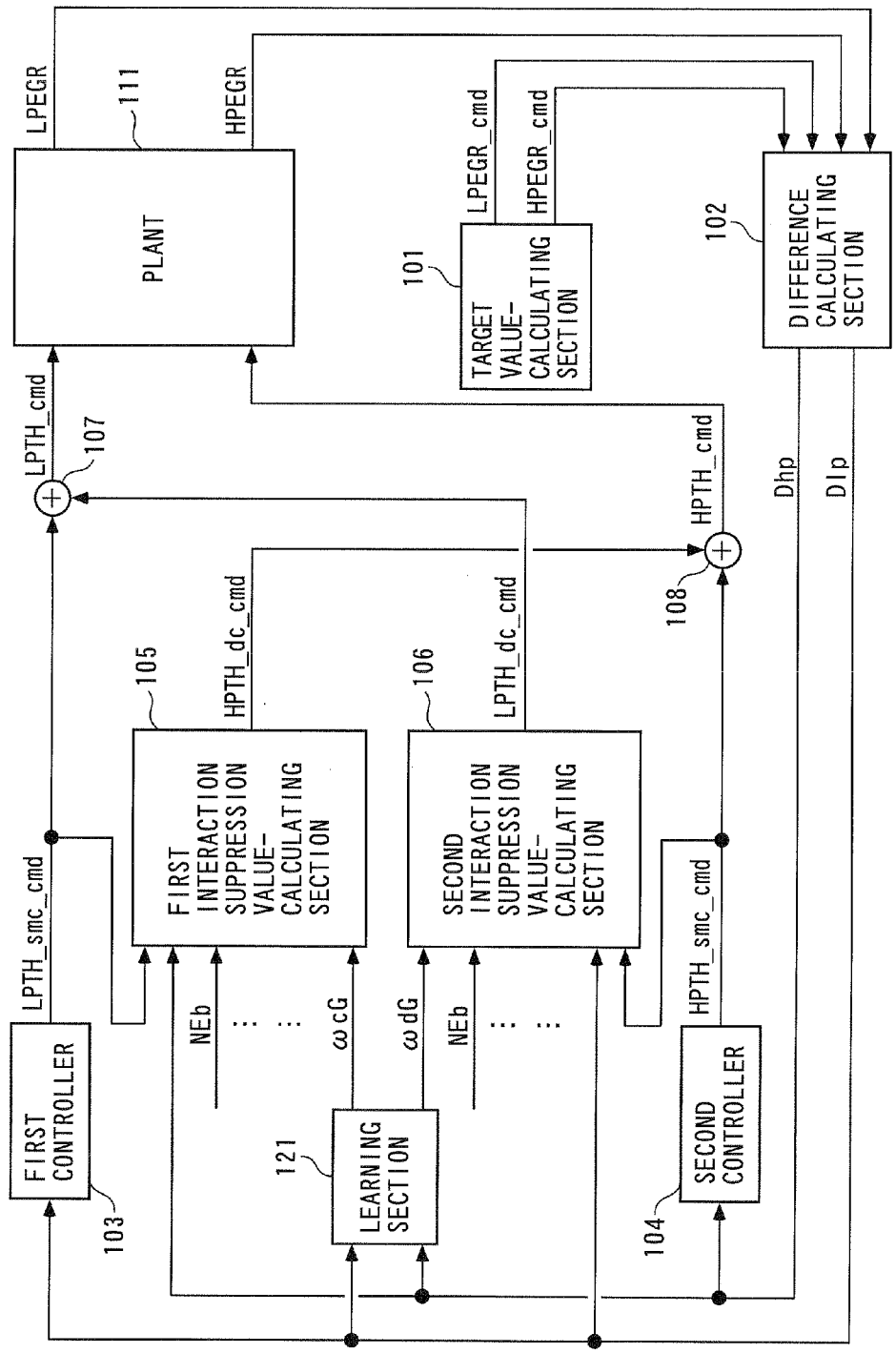
FIG. 22 is a block diagram showing the plant control unit together appearing in FIG. 18 with a learning section.
Figure 23:
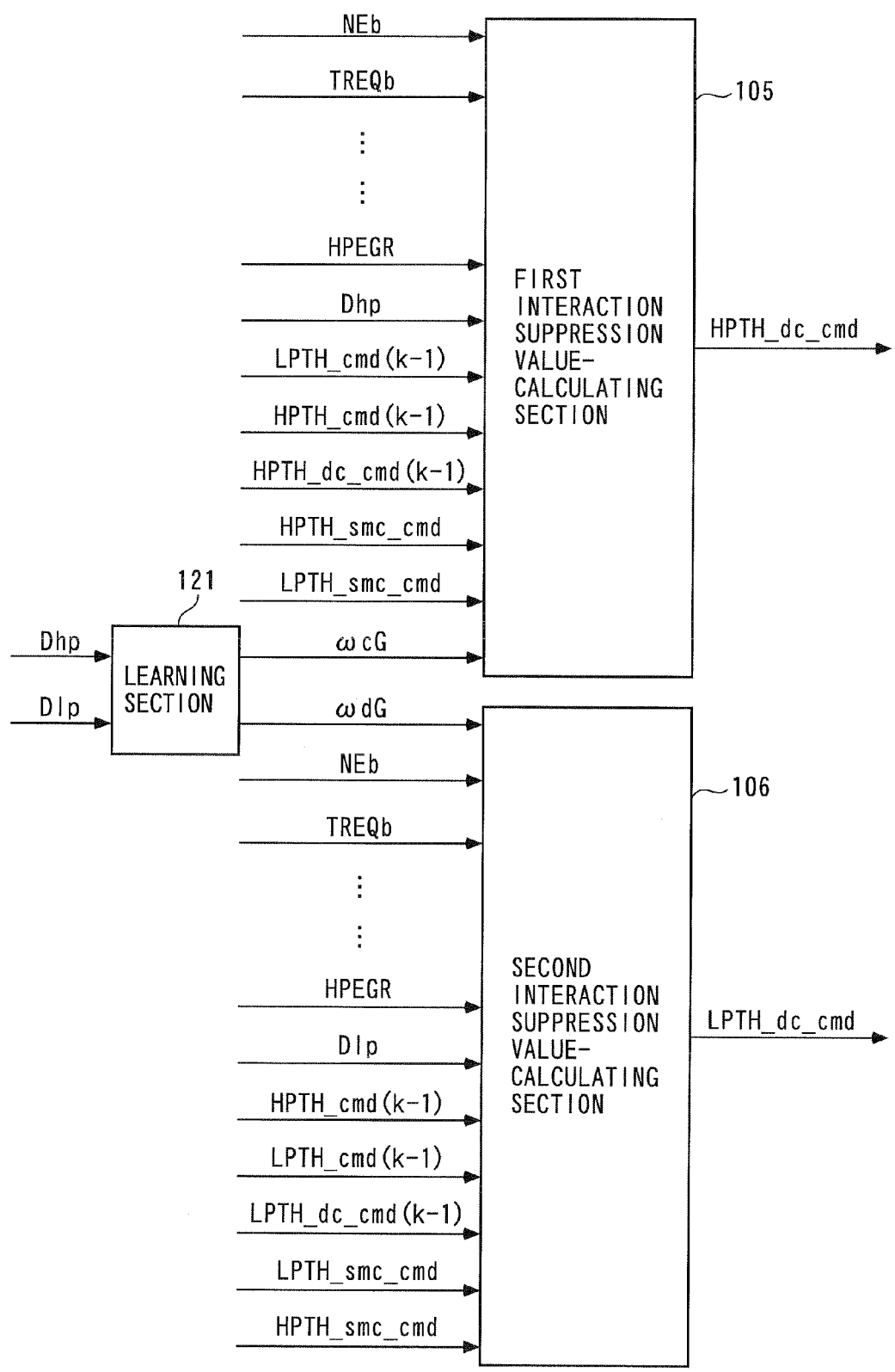
FIG. 23 is a block diagram showing the first and second interaction suppression value-calculating sections appearing in FIG. 18 together with the learning section.
Figure 24:
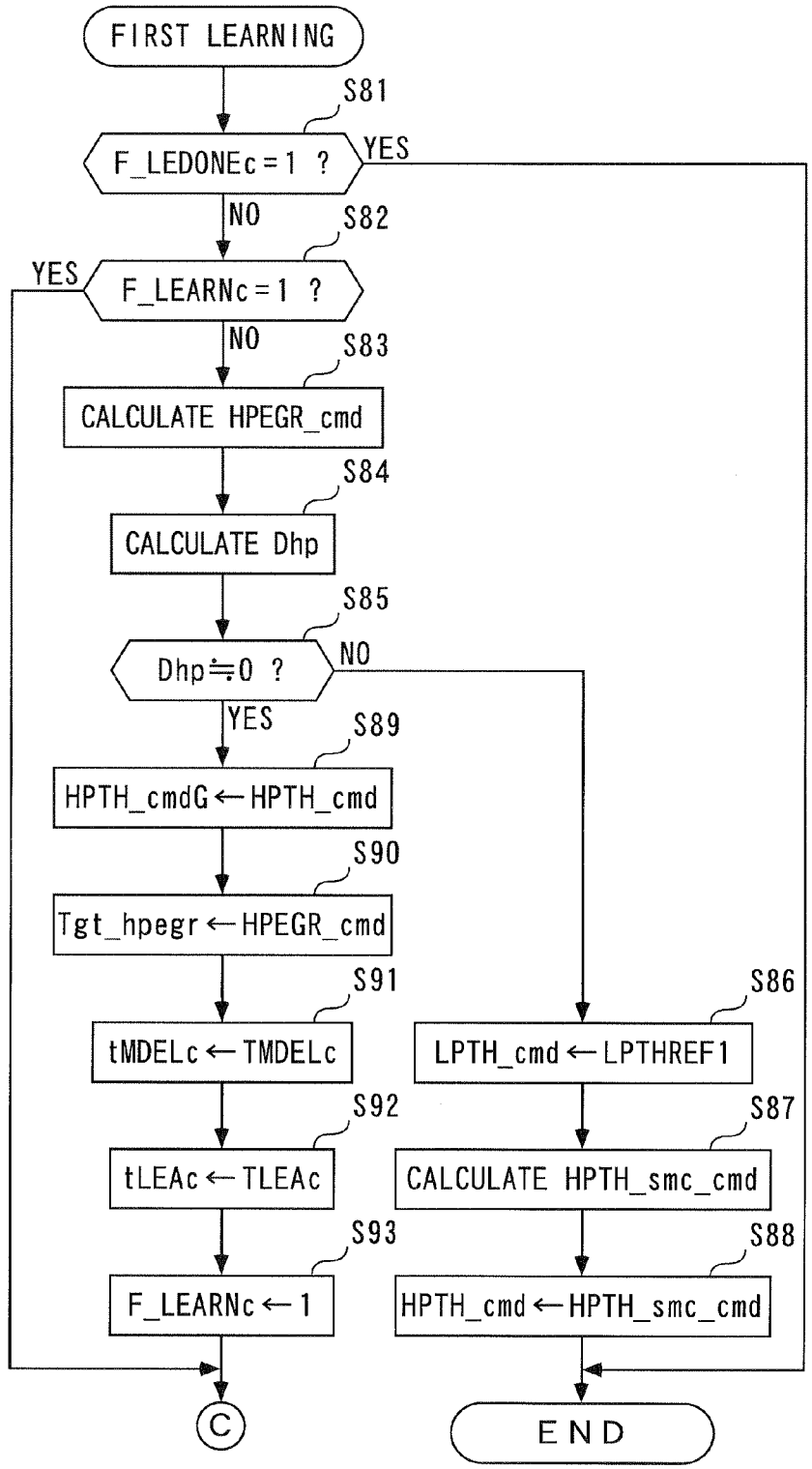
FIG. 24 is a flowchart of a first learning process executed by the ECU appearing in FIG. 17.
Figure 25:
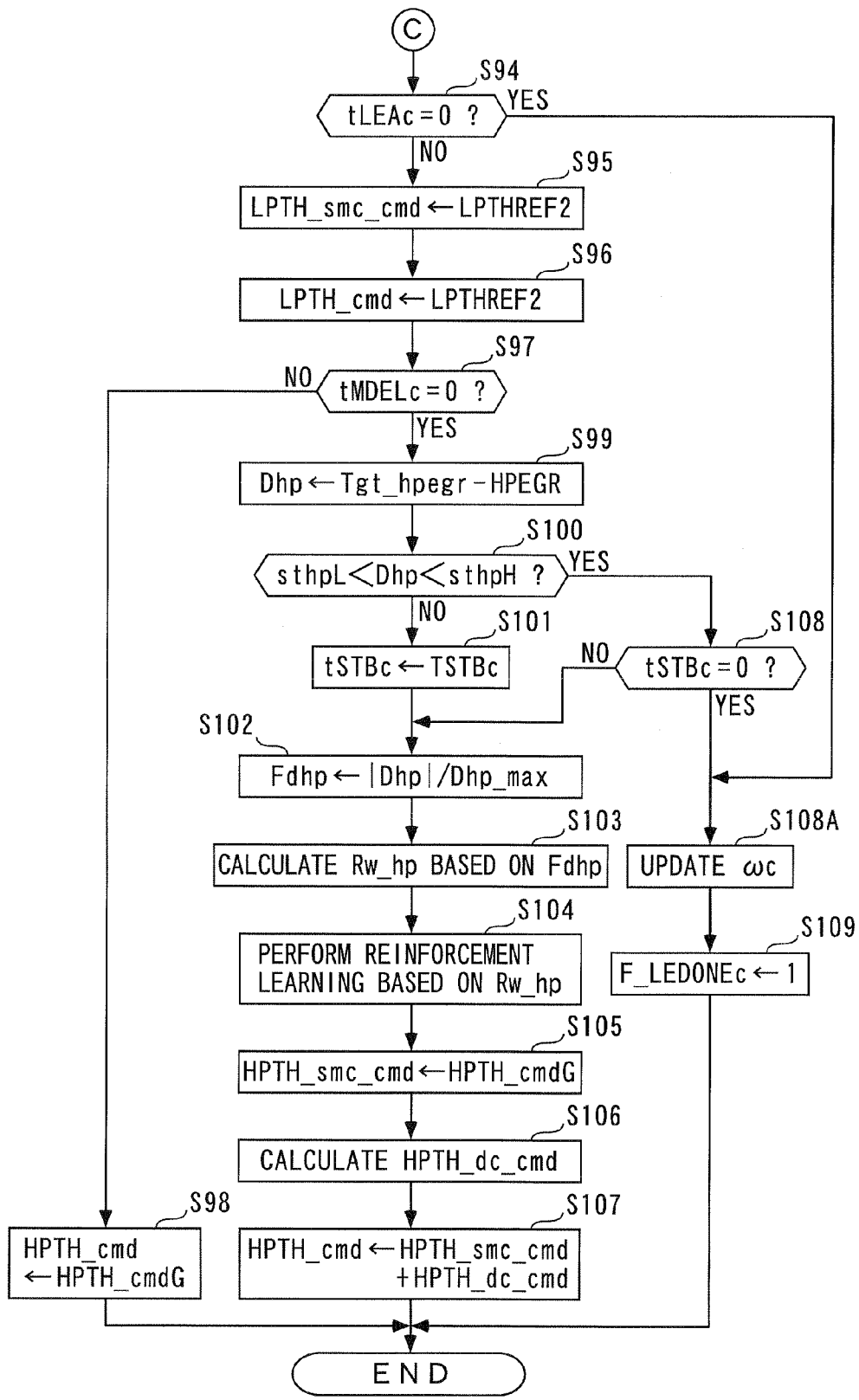
FIG. 25 is a flowchart of a continuation of FIG. 24.

Referring to FIGS. 22 and 23, the high-pressure EGR gas flow rate difference Dhp and the low-pressure EGR gas flow rate difference Dlp are input to the learning section 121. The learning section 121 performs the learning of the weighting factor ωc and the learning of the weighting factor ωd separately from each other by reinforcement learning according to the input high-pressure EGR gas flow rate difference Dhp and low-pressure EGR gas flow rate difference Dlp. Further, the learning section 121 outputs a learned value ωcG of the weighting factor calculated by the learning to the first interaction suppression value-calculating section 105, and a learned value ωdG of the weighting factor calculated by the learning to the second interaction suppression value-calculating section 106. This causes the weighting factors ωc and ωd to be learned and updated. FIGS. 24 and 25 show a first learning process for learning the weighting factor ωc. The present process is repeatedly executed by the elements shown in FIGS. 19 and 22 at the aforementioned control period ΔT.

First, in a step 81 in FIG. 24, it is determined whether or not a first learning completion flag F_LEDONEc is equal to 1. This first learning completion flag F_LEDONEc is set to 1 when the learning of the weighting factor ωc has been completed, and is reset to 0 at the start of inspection of the vehicle.

If the answer to the question of the step 81 is negative (NO), i.e. if the learning of the weighting factor ωc has not been completed, it is determined whether or not a first learning preparation operation completion flag F_LEARNc is equal to 1 (step 82). The first learning preparation operation completion flag F_LEARNc indicates completion of a preparation operation for learning the weighting factor ωc (hereinafter referred to as the "first learning preparation operation") by 1, and is reset to 0 at the start of inspection of the vehicle.

If the answer to this question is negative (NO), i.e. if the first learning preparation operation has not been completed, the target high-pressure EGR gas flow rate HPEGR_cmd is calculated by searching a map according to the engine speed NEb and the demanded torque TREQb, as described hereinabove (step 83). Then, the high-pressure EGR gas flow rate difference Dhp is calculated as the difference between the calculated target high-pressure EGR gas flow rate HPEGR_cmd and the high-pressure EGR gas flow rate HPEGR (step 84).

Next, it is determined whether or not the high-pressure EGR gas flow rate difference Dhp calculated in the above-mentioned step 84 is approximately equal to 0 (step 85). If the answer to this question is negative (NO), the target low-pressure throttle valve opening LPTH_cmd is set to a fixed first predetermined value LPTHREF1 (step 86). Along with execution of the step 86, the low-pressure throttle valve opening LPTH is controlled by the aforementioned low-pressure TH controller 112 such that it converges to the target low-pressure throttle valve opening LPTH_cmd. Further, the correction of the target low-pressure throttle valve opening LPTH_cmd based on the second interaction suppression value LPTH_dc_cmd is not executed, that is, the correction is stopped.

In a step 87 following the step 86, the provisional value HPTH_smc_cmd of the target high-pressure throttle valve opening is calculated according to the high-pressure EGR gas flow rate difference Dhp with the aforementioned response-specifying control algorithm. Then, the calculated provisional value HPTH_smc_cmd is set as the target high-pressure throttle valve opening HPTH_cmd (step 88), followed by terminating the present process. Along with execution of the step 88, the high-pressure throttle valve opening HPTH is controlled by the above-mentioned high-pressure TH controller 113 such that it converges to the target high-pressure throttle valve opening HPTH_cmd. Further, the correction of the target high-pressure throttle valve opening HPTH_cmd based on the first interaction suppression value HPTH_dc_cmd is not executed, that is, the correction is stopped.

On the other hand, if the answer to the question of the step 85 is affirmative (YES), i.e. if the high-pressure EGR gas flow rate difference Dhp has become approximately equal to 0, target high-pressure throttle valve opening HPTH_cmd obtained at the time is set as a learning target high-pressure TH opening HPTH_cmdG (step 89). Then, the target high-pressure EGR gas flow rate HPEGR_cmd is set as a learning target high-pressure EGR gas flow rate Tgt_hpegr (step 90).

Next, in steps 91 and 92, a timer value tMDELc of a wait timer which is counted down to 0 and a timer value tLEAc of a learning timer which is counted down to 0 are set to a predetermined standby time period TMDELc and a learning time period TLEAc, respectively. The standby time period TMDELc is set to a dead time before a change in the low-pressure throttle valve opening LPTH is reflected on the high-pressure EGR gas flow rate HPEGR. For example, it is set to 0.5 sec. Further, the learning time period TLEAc is set to such a time period that will make it possible to sufficiently learn the weighting factor ωc. For example, it is set to 1.0 sec.

In a step 93 following the step 92, it is determined that the first learning preparation operation has been completed, and to indicate the fact, the first learning preparation operation completion flag F_LEARNc is set to 1, followed by the process proceeding to a step 94 in FIG. 25. Further, after execution of the step 93, the answer to the question of the step 82 becomes affirmative (YES). In this case, the process skips over the above-mentioned steps 83 to 93 to the step 94.

As described above, when the present process is started, first, the first learning preparation operation is executed. During execution of the first learning preparation operation, the correction using the second interaction suppression value LPTH_dc_cmd is stopped, and the low-pressure throttle valve opening LPTH is held at the fixed first predetermined value LPTHREF1 (step 86). Further, the correction using the first interaction suppression value HPTH_dc_cmd is stopped, and the target high-pressure throttle valve opening HPTH_cmd is calculated based on the high-pressure EGR gas flow rate difference Dhp with the response-specifying control algorithm, which is a feedback control algorithm (steps 87 and 88). This controls the high-pressure throttle valve opening HPTH, whereby the high-pressure EGR gas flow rate HPEGR is controlled such that it converges to the target high-pressure EGR gas flow rate HPEGR_cmd.

Then, when the high-pressure EGR gas flow rate HPEGR converges to the target high-pressure EGR gas flow rate HPEGR_cmd to thereby make the high-pressure EGR gas flow rate difference Dhp approximately equal to 0 (YES to the step 85), the target high-pressure throttle valve opening HPTH_cmd obtained at the time, that is, the target high-pressure throttle valve opening HPTH_cmd calculated when the high-pressure EGR gas flow rate difference Dhp has become approximately equal to 0 is set as the learning target high-pressure TH opening HPTH_cmdG (step 89). Further, the target high-pressure EGR gas flow rate HPEGR_cmd obtained at the time is set as the learning target high-pressure EGR gas flow rate Tgt_hpegr (step 90), and it is determined that the first learning preparation operation has been completed (step 93).

As is apparent from the above, the learning target high-pressure EGR gas flow rate Tgt_hpegr is set to the target high-pressure EGR gas flow rate HPEGR_cmd obtained when the high-pressure EGR gas flow rate HPEGR has converged to the target high-pressure EGR gas flow rate HPEGR_cmd in the state where the low-pressure throttle valve opening LPTH is held at the fixed first predetermined value LPTHREF1. Further, the learning target high-pressure TH opening HPTH_cmdG is set to such a value that will cause the high-pressure EGR gas flow rate HPEGR to converge to the target high-pressure EGR gas flow rate HPEGR_cmd, i.e. the learning target high-pressure EGR gas flow rate Tgt_hpegr in the state where the low-pressure throttle valve opening LPTH is held at the fixed first predetermined value LPTHREF1.

In the step 94 in FIG. 25, it is determined whether or not the timer value tLEAc of the learning timer set in the above-mentioned step 92 is equal to 0. If the answer to this question is negative (NO), in respective steps 95 and 96, the provisional value LPTH_smc_cmd of the target low-pressure throttle valve opening and the target low-pressure throttle valve opening LPTH_cmd are each set to a fixed second predetermined value LPTHREF2. The second predetermined value LPTHREF2 is set to a value larger than the above-mentioned first predetermined value LPTHREF1.

Along with execution of the step 96, the low-pressure throttle valve opening LPTH is controlled by the low-pressure TH controller 112 such that it converges to the target low-pressure throttle valve opening LPTH_cmd. Further, the correction of the target low-pressure throttle valve opening LPTH_cmd based on the second interaction suppression value LPTH_dc_cmd is not executed, that is, the correction is stopped.

In a step 97 following the step 96, it is determined whether or not the timer value tMDELc of the wait timer set in the step 91 is equal to 0. If the answer to this question is negative (NO), the target high-pressure throttle valve opening HPTH_cmd is set to the learning target high-pressure TH opening HPTH_cmdG set in the step 89 (step 98), followed by terminating the present process.

Along with execution of the step 98, the high-pressure throttle valve opening HPTH is controlled by the high-pressure TH controller 113 such that it converges to the target high-pressure throttle valve opening HPTH_cmd, i.e. the learning target high-pressure TH opening HPTH_cmdG. Further, the correction of the target high-pressure throttle valve opening HPTH_cmd based on the first interaction suppression value HPTH_dc_cmd is not executed, that is, the correction is stopped. Furthermore, the high-pressure EGR control valve opening HPVT is held at a target value thereof calculated when the learning target high-pressure TH opening HPTH_cmdG has been set.

On the other hand, if the answer to the question of the step 97 is affirmative (YES) (tMDELc=0), i.e. if the standby time period TMDELc has already elapsed after completion of the first learning preparation operation, the high-pressure EGR gas flow rate difference Dhp is calculated by subtracting the high-pressure EGR gas flow rate HPEGR from the learning target high-pressure EGR gas flow rate Tgt_hpegr set in the step 90 (step 99). Then, it is determined whether or not the calculated high-pressure EGR gas flow rate difference Dhp is within a predetermined range defined by a first predetermined value sthpL and a second predetermined value sthpH (step 100).

If the answer to this question is negative (NO), a timer value tSTBc of a stabilization timer which is counted down to 0 is set to a predetermined stabilization time period TSTBc (e.g. 2.0 sec) (step 101), and a normalized high-pressure EGR difference Fdhp is calculated by dividing the absolute value |Dhp| of the high-pressure EGR gas flow rate difference by a predetermined maximum difference Dhp_max (step 102). The maximum difference Dhp_max is set to the largest possible value of the absolute value |Dhp| of the high-pressure EGR gas flow rate difference.

Figure 26:
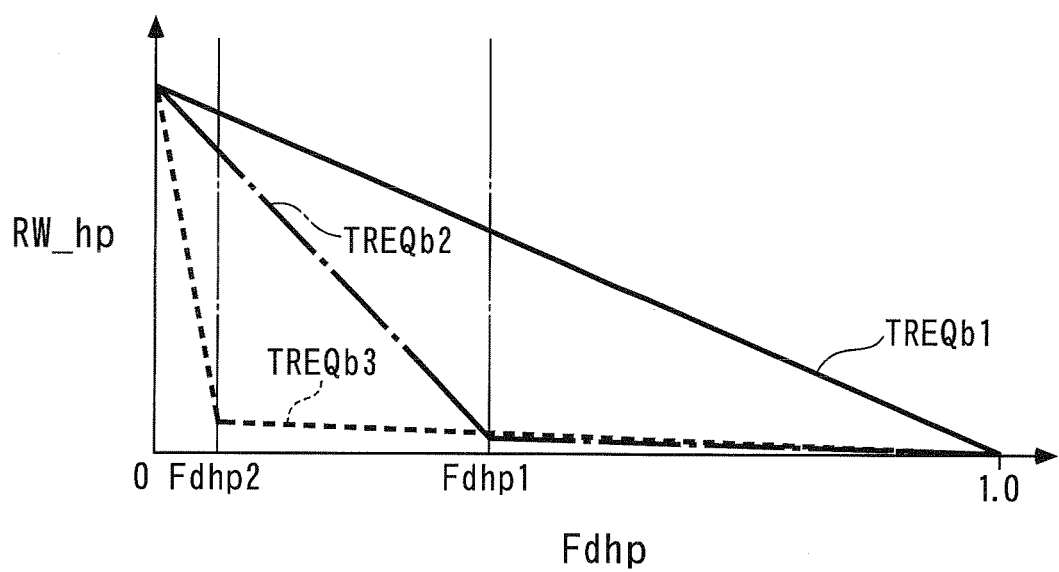
FIG. 26 is a diagram showing an example of a map for use in the first learning process shown in FIG. 25.

Next, a reward value Rw_hp is calculated by searching a predetermined map shown in FIG. 26 according to the calculated normalized high-pressure EGR difference Fdhp and the demanded torque TREQb (step 103). In FIG. 26, TREQb1, TREQb2 and TREQb3 indicate the first predetermined value, the second predetermined value and the third predetermined value of the demanded torque TREQb (TREQb1<TREQb2<TREQb3), respectively. When the demanded torque TREQb takes a value other than the first to third predetermined values TREQb1 to TREQb3, the reward value Rw_hp is calculated by interpolation.

In the above-mentioned map, basically, the reward value Rw_hp is linearly set to a larger value as the normalized high-pressure EGR difference Fdhp is smaller. Further, the reward value Rw_hp is set to a maximum value when the normalized high-pressure EGR difference Fdhp is equal to 0. The reward value Rw_hp is set according to the demanded torque TREQb as follows: When the demanded torque TREQb takes the first predetermined value TREQb1, which is the smallest value of the first to third predetermined values, the reward value Rw_hp is linearly set to a larger value as the value of Fdhp is smaller in the whole range of the normalized high-pressure EGR difference Fdhp ($0 \leq Fdhp \leq 1.0$).

Further, when the demanded torque TREQb takes the second predetermined value TREQb2, which is the intermediate value, the slope of the reward value Rw_hp with respect to the normalized high-pressure EGR difference Fdhp is set to a larger vale in a range of $0 \leq Fdhp \leq a$ first predetermined value Fdhp1, whereas in a range of Fdhp>the first predetermined value Fdhp1, it is set to a smaller value. Further, when the demanded torque TREQb takes the third predetermined value TREQb3, which is the largest value, the slope of the reward value Rw_hp with respect to the normalized high-pressure EGR difference Fdhp is set to a larger vale in a range of $0 \leq Fdhp \leq a$ second predetermined value Fdhp2, whereas in a range of Fdhp>Fdhp2, it is set to a smaller value. Furthermore, the first and second predetermined values Fdhp1 and Fdhp2 are set to values which satisfy the relationship of $0 < Fdhp2 < Fdhp1 < 1.0$.

As is apparent from the above description, in the FIG. 26 map, as the demanded torque TREQa is smaller, a range where the slope of the reward value Rw_hp with respect to the normalized high-pressure EGR difference Fdhp is relatively large is set to be larger. This is because as the demanded torque TREQb is smaller, i.e. as load on the engine 81 is lower, the sensitivity of the high-pressure EGR gas flow rate HPEGR to the target high-pressure throttle valve opening HPTH_cmd is higher, and hence the above-mentioned range is set to be larger in order to set the reward value Rw_hp in a fine-grained manner in a larger range of the normalized high-pressure EGR difference Fdhp.

In a step 104 following the step 103, the weighting factor ωc is learned by reinforcement learning based on the reward value Rw_hp calculated in the step 103. This learning is performed as follows: First, the weighting factor ωc having been set at each current time (the immediately preceding value thereof) is stored sequentially in each of a plurality of buffers as the learned value ωcG of the weighting factor in association with the calculated reward value Rw_hp. Then, the weighting factor ωc (the current value thereof) is set at random to one of a plurality of predetermined values different from each other which are set in advance empirically e.g. by experiment. If this time is a first loop after the start of the learning, as is apparent from the step 98, the weighting factor ωc has not yet been set, and hence the learned value ωcG is set to 0, and is stored in association with the reward value Rw_hp.

In a step 105 following the step 104, the provisional value HPTH_smc_cmd of the target high-pressure throttle valve opening is set to the learning target high-pressure TH opening HPTH_cmdG set in the step 89. Then, in a step 106, the first interaction suppression value HPTH_dc_cmd is calculated, as described in the description of the first interaction suppression value-calculating section 105. More specifically, the first interaction suppression value HPTH_dc_cmd is calculated by a neural network using, as inputs, the operating condition parameters, such as an engine speed NEc, the high-pressure EGR gas flow rate difference Dhp calculated in the step 99, the provisional value LPTH_smc_cmd of the target low-pressure throttle valve opening set in the step 95, and so forth.

Next, the target high-pressure throttle valve opening HPTH_cmd is calculated by adding the first interaction suppression value HPTH_dc_cmd calculated in the step 106 to the provisional value HPTH_smc_cmd set in the step 105 (step 107), followed by terminating the present process. Along with execution of the step 107, the high-pressure throttle valve opening HPTH is controlled by the high-pressure TH controller 113 such that it converges to the target high-pressure throttle valve opening HPTH_cmd. Further, the high-pressure EGR control valve opening HPVT is held at a target value thereof calculated when the learning target high-pressure TH opening HPTH_cmdG has been set.

As described above, when the first learning preparation operation is completed (YES to the step 82), the correction by the second interaction suppression value LPTH_dc_cmd is stopped in the same manner as during the execution of the first learning preparation operation, and the low-pressure throttle valve opening LPTH is controlled such that it is changed in a stepped manner from the first predetermined value LPTHREF1 to the fixed second predetermined value LPTHREF2, and is then held at the second predetermined value LPTHREF2 (step 96). Further, the target high-pressure throttle valve opening HPTH_cmd is held at the learning target high-pressure TH opening HPTH_cmdG (step 98). As described hereinabove, the learning target high-pressure TH opening HPTH_cmdG is set to such a value that will cause the high-pressure EGR gas flow rate HPEGR to converge to the learning target high-pressure EGR gas flow rate Tgt_hpegr in a state where the low-pressure throttle valve opening LPTH is held at the first predetermined value LPTHREF1. As is apparent from the above, the high-pressure EGR gas flow rate HPEGR is changed by execution of the steps 96 and 98 such that it deviates from the learning target high-pressure EGR gas flow rate Tgt_hpegr. Further, in this case, the amount of deviation of the high-pressure EGR gas flow rate HPEGR from the learning target high-pressure EGR gas flow rate Tgt_hpegr excellently represents the amount of change of the high-pressure EGR gas flow rate HPEGR caused by interaction of the target low-pressure throttle valve opening LPTH_cmd.

When the standby time period TMDELc has elapsed after completion of the first learning preparation operation (YES to the step 97), the learning of the weighting factor ωc is started (the step 99 and the steps 102 to 104). The reason for starting the learning of the weighting factor ωc after waiting for the standby time period TMDELc to elapse after completion of the first learning preparation operation, as described above, is to perform the learning in a state where the high-pressure EGR gas flow rate HPEGR is positively deviated from the learning target high-pressure EGR gas flow rate Tgt_hpegr by the execution of the steps 96 and 98, that is, in a state where influence of the interaction of the target low-pressure throttle valve opening LPTH_cmd is positively reflected on the high-pressure EGR gas flow rate HPEGR.

Further, during the above learning, the reward value Rw_hp is calculated to be a larger value as the normalized high-pressure EGR difference Fdhp proportional to the absolute value |Dhp| of the high-pressure EGR gas flow rate difference is smaller (step 103). Furthermore, the weighting factor ωc having been obtained at each current time, i.e. the immediately preceding value of the weighting factor ωc is stored sequentially in each of the buffers as the learned value ωcG of the weighting factor in association with the current reward value Rw_hp, and the current value of the weighting factor ωc is set at random to one of the plurality of predetermined values (step 104).

Then, the first interaction suppression value HPTH_dc_cmd is calculated using a neural network to which the weighting factor ωc set as described above is applied (step 106). Further, the target high-pressure throttle valve opening HPTH_cmd is calculated by adding the calculated first interaction suppression value HPTH_dc_cmd to the provisional value HPTH_smc_cmd set to the learning target high-pressure TH opening HPTH_cmdG (step 107). That is, the target high-pressure throttle valve opening HPTH_cmd is corrected based on the first interaction suppression value HPTH_dc_cmd.

On the other hand, if the answer to the question of the step 100 is affirmative (YES), i.e. if the high-pressure EGR gas flow rate difference Dhp is within the above-mentioned predetermined range defined by the first and second predetermined values sthpL and sthpH, it is determined whether or not the timer value tSTBc of the stabilization timer set in the step 101 is equal to 0 (step 108). If the answer to this question is negative (NO), the above-mentioned step 102 et seq. are executed.

On the other hand, if the answer to the question of the step 108 has become affirmative (YES) (tSTBc=0), i.e. if the state where the high-pressure EGR gas flow rate difference Dhp is within the predetermined range defined by the first and second predetermined values sthpL and sthpH has continued for the stabilization time period TSTBc, it is determined that the high-pressure EGR gas flow rate HPEGR is stable in a state substantially converged to the learning target high-pressure EGR gas flow rate Tgt_hpegr, and it is determined that the learning of the weighting factor ωc has been completed. Then, one of the learned values ωcG stored in the step 104, which is associated with the largest one of the reward values Rw_hp, is read out, and is set as the weighting factor ωc to thereby update the weighting factor ωc (step 108A) Subsequently, to indicate the completion of the learning, the first learning completion flag F_LEDONEc is set to 1 (step 109), followed by terminating the present process. Further, after execution of the step 109, the answer to the question of the step 81 in FIG. 24 becomes affirmative (YES). In this case, the present process is immediately terminated.

On the other hand, if the answer to the question of the step 94 has become affirmative (YES) (tLEAc=0), i.e. if the learning time period TLEAc has elapsed after completion of the first learning preparation operation, the learning of the weighting factor ωc in the step 104, etc., has been sufficiently performed, and hence it is determined that the learning has completed. Then, by executing the step 108A, the one of the stored learned values ωcG, which is associated with the largest one of the reward values Rw_hp, is set as the weighting factor ωc to thereby update the weighting factor ωc, whereafter to indicate completion of the learning, the step 109 is executed, followed by terminating the present process.

As described above, if one of the condition that the state where the high-pressure EGR gas flow rate difference Dhp is within the predetermined range has continued for the stabilization time period TSTBc, and the condition that the learning time period TLEAc has elapsed after completion of the first learning preparation operation is satisfied, it is determined at the time point that the learning has completed.

Next, a second learning process for learning the weighting factor ωd used by the aforementioned second interaction suppression value-calculating section 106 will be described with reference to FIGS. 27 and 28. Similarly to the above-mentioned first learning process, the present process as well is repeatedly carried out by the elements shown in FIGS. 19 and 22 at the control period ΔT. Further, in the second learning process, the learning of the weighting factor ωd is performed in the same manner as in the first learning process.

Figure 27:
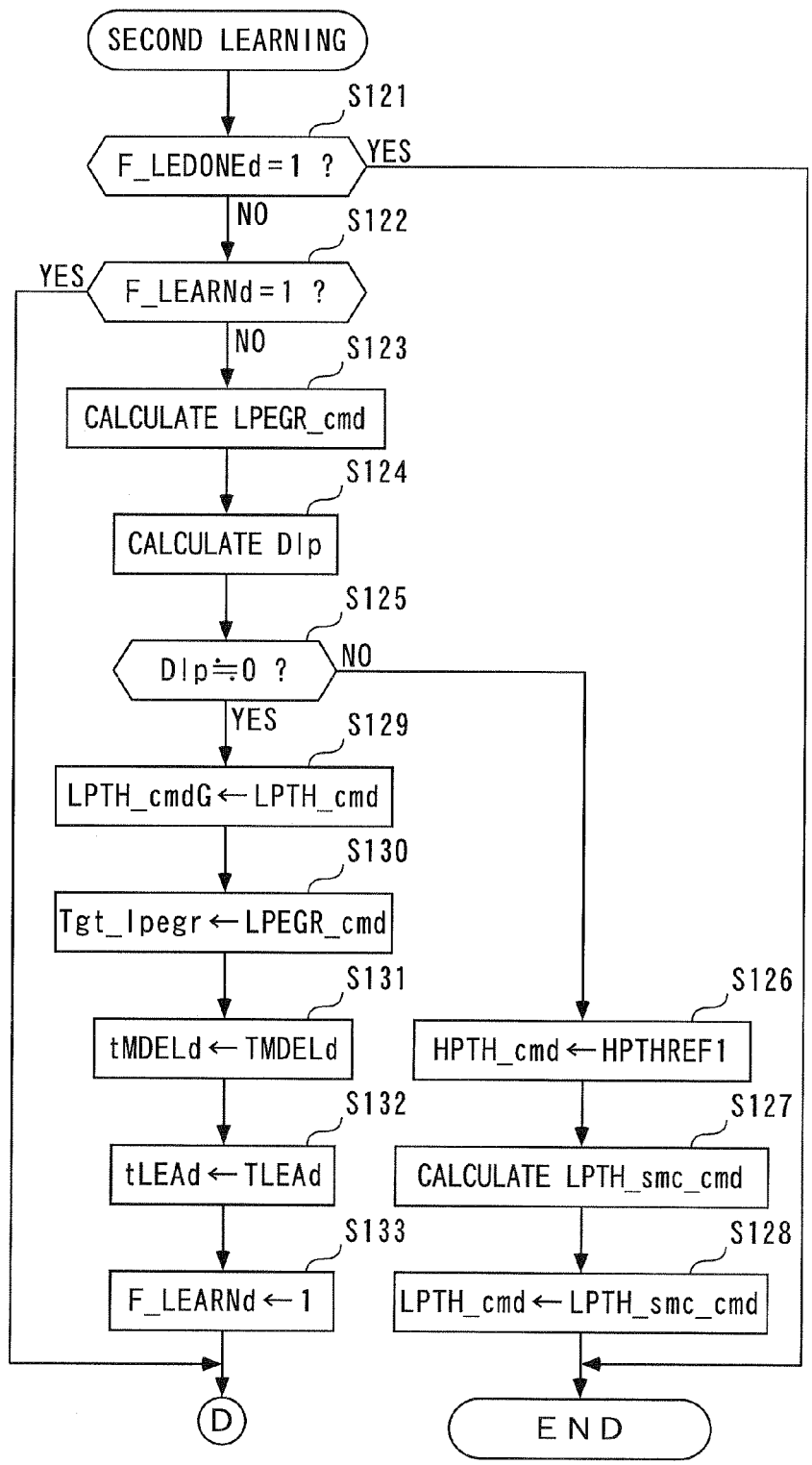
FIG. 27 is a flowchart of a second learning process executed by the ECU appearing in FIG. 17.

First, in a step 121 in FIG. 27, it is determined whether or not a second learning completion flag F_LEDONEd is equal to 1. The second learning completion flag F_LEDONEd is set to 1 when the learning of the weighting factor ωd has been completed, and is reset to 0 at the start of inspection of the vehicle.

If the answer to the question of the step 121 is negative (NO), i.e. if the learning of the weighting factor ωd has not been completed, it is determined whether or not a second learning preparation operation completion flag F_LEARNd is equal to 1 (step 122). The second learning preparation operation completion flag F_LEARNd indicates completion of a preparation operation for learning the weighting factor ωd (hereinafter referred to as the "second learning preparation operation") by 1, and is reset to 0 at the start of inspection of the vehicle.

If the answer to this question is negative (NO), i.e. if the second learning preparation operation has not been completed, the target low-pressure EGR gas flow rate LPEGR_cmd is calculated, as described hereinabove, by searching the map according to the engine speed NEb and the demanded torque TREQb (step 123). Then, the low-pressure EGR gas flow rate difference Dlp is calculated as the difference between the calculated target low-pressure EGR gas flow rate LPEGR_cmd and the low-pressure EGR gas flow rate LPEGR (step 124).

Next, it is determined whether or not the low-pressure EGR gas flow rate difference Dlp calculated in the step 124 is approximately equal to 0 (step 125). If the answer to this question is negative (NO), the target high-pressure throttle valve opening HPTH_cmd is set to a fixed first predetermined value HPTHREF1 (step 126). Along with execution of the step 126, the high-pressure throttle valve opening HPTH is controlled by the high-pressure TH controller 113 such that it converges to the target high-pressure throttle valve opening HPTH_cmd. Further, the correction of the target high-pressure throttle valve opening HPTH_cmd based on the first interaction suppression value HPTH_dc_cmd is not executed, that is, the correction is stopped.

In a step 127 following the step 126, the provisional value LPTH_smc_cmd of the target low-pressure throttle valve opening is calculated according to the low-pressure EGR gas flow rate difference Dlp with the above-mentioned response-specifying control algorithm. Then, the calculated provisional value LPTH_smc_cmd is set as the target low-pressure throttle valve opening LPTH_cmd (step 128), followed by terminating the present process. Along with execution of the step 128, the low-pressure throttle valve opening LPTH is controlled by the low-pressure TH controller 112 such that it converges to the target low-pressure throttle valve opening LPTH_cmd. Further, the correction of the target low-pressure throttle valve opening LPTH_cmd based on the second interaction suppression value LPTH_dc_cmd is not executed, that is, the correction is stopped.

On the other hand, if the answer to the question of the step 125 is affirmative (YES), i.e. if the low-pressure EGR gas flow rate difference Dlp has become approximately equal to 0, the target low-pressure throttle valve opening LPTH_cmd obtained at the time is set as a learning target low-pressure TH opening LPTH_cmdG (step 129). Then, the target low-pressure EGR gas flow rate LPEGR_cmd is set as a learning target low-pressure EGR gas flow rate Tgt_lpegr (step 130).

Next, in steps 131 and 132, a timer value tMDELd of a wait timer which is counted down to 0 and a timer value tLEAd of the learning timer which is counted down to 0 are set to a predetermined standby time period TMDELd and a learning time period TLEAd, respectively. The standby time period TMDELd is set to a dead time before a change in the high-pressure throttle valve opening HPTH is reflected on the low-pressure EGR gas flow rate LPEGR. For example, it is set to 0.5 sec. Further, the learning time period TLEAd is set to such a time period that will make it possible to sufficiently learn the weighting factor ωd. For example, it is set to 1.0 sec.

Figure 28:
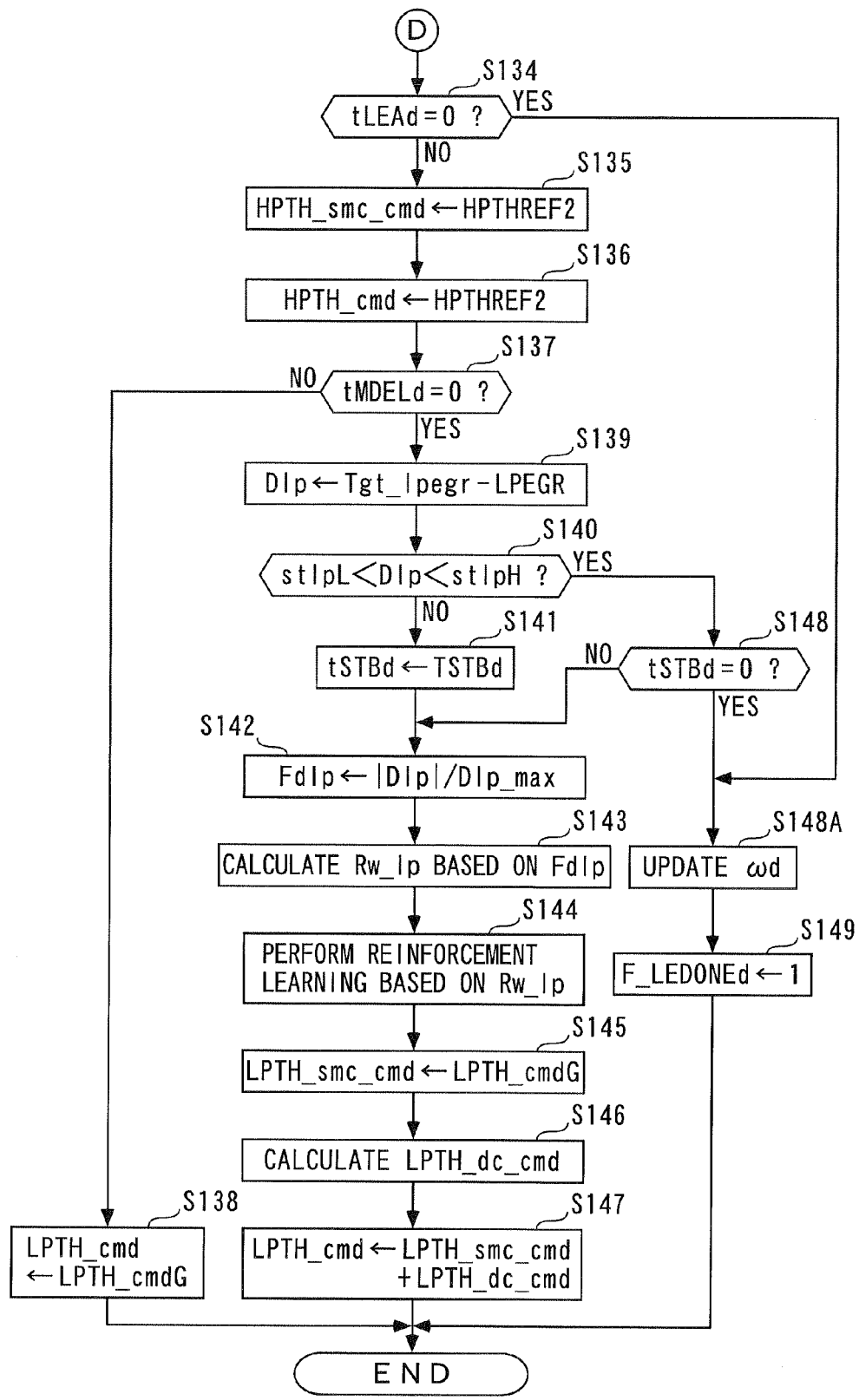
FIG. 28 is a flowchart of a continuation of FIG. 27.

In a step 133 following the step 132, it is determined that the second learning preparation operation has been completed, and to indicate the fact, the second learning preparation operation completion flag F_LEARNd is set to 1, followed by the process proceeding to a step 134 in FIG. 28. Further, after execution of the step 133, the answer to the question of the step 122 becomes affirmative (YES). In this case, the process skips over the above-mentioned steps 123 to 133 to the step 134.

As described above, when the present process is started, first, the second learning preparation operation is executed. During execution of the second learning preparation operation, the correction using the first interaction suppression value HPTH_dc_cmd is stopped, and the high-pressure throttle valve opening HPTH is held at the fixed first predetermined value HPTHREF1 (step 126). Further, the correction using the second interaction suppression value LPTH_dc_cmd is stopped, and the target low-pressure throttle valve opening LPTH_cmd is calculated based on the low-pressure EGR gas flow rate difference Dlp with a response-specifying control algorithm, which is a feedback control algorithm (steps 127 and 128). This controls the low-pressure throttle valve opening LPTH, whereby the low-pressure EGR gas flow rate LPEGR is controlled such that it converges to the target low-pressure EGR gas flow rate LPEGR_cmd.

Then, when the low-pressure EGR gas flow rate LPEGR converges to the target low-pressure EGR gas flow rate LPEGR_cmd to thereby make the low-pressure EGR gas flow rate difference Dlp approximately equal to 0 (YES to the step 125), the target low-pressure throttle valve opening LPTH_cmd having been obtained at the time, that is, the target low-pressure throttle valve opening LPTH_cmd calculated when the low-pressure EGR gas flow rate difference Dlp has become approximately equal to 0 is set as the learning target low-pressure TH opening LPTH_cmdG (step 129). Further, the target low-pressure EGR gas flow rate LPEGR_cmd at the time is set as the learning target low-pressure EGR gas flow rate Tgt_lpegr (step 130), and it is determined that the second learning preparation operation has been completed (step 133).

As is apparent from the above, the learning target low-pressure EGR gas flow rate Tgt_lpegr is set to the target low-pressure EGR gas flow rate LPEGR_cmd obtained when the low-pressure EGR gas flow rate LPEGR has converged to the target low-pressure EGR gas flow rate LPEGR_cmd in a state where the high-pressure throttle valve opening HPTH is held at the fixed first predetermined value HPTHREF1. Further, the learning target low-pressure TH opening LPTH_cmdG is set to such a value that will cause the low-pressure EGR gas flow rate LPEGR to converge to the target low-pressure EGR gas flow rate LPEGR_cmd, i.e. the learning target low-pressure EGR gas flow rate Tgt_lpegr in the state where the high-pressure throttle valve opening HPTH is held at the first predetermined value HPTHREF1.

In the step 134 in FIG. 28, it is determined whether or not the timer value tLEAd of the learning timer set in the step 132 is equal to 1. If the answer to this question is negative (NO), in respective steps 135 and 136, the provisional value HPTH_smc_cmd of the target high-pressure throttle valve opening and the target high-pressure throttle valve opening HPTH_cmd are each set to a fixed second predetermined value HPTHREF2. This second predetermined value HPTHREF2 is set to a value larger than the first predetermined value HPTHREF1.

Along with execution of the step 136, the high-pressure throttle valve opening HPTH is controlled by the high-pressure TH controller 113 such that it converges to the target high-pressure throttle valve opening HPTH_cmd. Further, the correction of the target high-pressure throttle valve opening HPTH_cmd based on the first interaction suppression value HPTH_dc_cmd is not executed, that is, the correction is stopped.

In a step 137 following the step 136, it is determined whether or not the timer value tMDELd of the wait timer set in the step 131 is equal to 0. If the answer to this question is negative (NO), the target low-pressure throttle valve opening LPTH_cmd is set to the learning target low-pressure TH opening LPTH_cmdG set in the step 129 (step 138), followed by terminating the present process.

Along with execution of the step 138, the low-pressure throttle valve opening LPTH is controlled by the low-pressure TH controller 112 such that it converges to the target low-pressure throttle valve opening LPTH_cmd, i.e. the learning target low-pressure TH opening LPTH_cmdG. Further, the correction of the target low-pressure throttle valve opening LPTH_cmd based on the second interaction suppression value LPTH_dc_cmd is not executed, that is, the correction is stopped. Furthermore, the low-pressure EGR control valve opening LPVT is held at a target value thereof calculated when the learning target low-pressure TH opening LPTH_cmdG has been set.

On the other hand, if the answer to the question of the step 137 is affirmative (YES) (tMDELd=0), i.e. if the standby time period TMDELd has already elapsed after completion of the second learning preparation operation, the low-pressure EGR gas flow rate difference Dlp is calculated as the difference between the learning target low-pressure EGR gas flow rate Tgt_lpegr set in the step 130 and the low-pressure EGR gas flow rate LPEGR (step 139). Then, it is determined whether or not the calculated low-pressure EGR gas flow rate difference Dlp is within a predetermined range defined by a first predetermined value stlpL and a second predetermined value stlpH (step 140).

If the answer to this question is negative (NO), a timer value tSTBd of a stabilization timer which is counted down to 0 is set to a predetermined stabilization time period TSTBd (e.g. 2.0 sec) (step 141), and a normalized low-pressure EGR difference Fdlp is calculated by dividing the absolute value |Dlp| of the low-pressure EGR gas flow rate difference by a predetermined maximum difference Dlp_max (step 142). This maximum difference Dlp_max is set to the largest possible value of the absolute value |Dlp| of the low-pressure EGR gas flow rate difference.

Next, a reward value Rw_lp is calculated by searching a predetermined map shown in FIG. 29 according to the calculated normalized low-pressure EGR difference Fdlp and the demanded torque TREQb (step 143). In this case, when the demanded torque TREQb takes a value other than the above-mentioned first to third predetermined values TREQb1, TREQa2 and TREQa3, the reward value Rw_lp is calculated by interpolation.

In the above-mentioned map, basically, the reward value Rw_lp is linearly set to a larger value as the normalized low-pressure EGR difference Fdlp is smaller. Further, the reward value Rw_pl is set to a maximum value when the normalized low-pressure EGR difference Fdlp is equal to 0. The reward value Rw_lp is set according to the demanded torque TREQb as follows: When the demanded torque TREQb takes the first predetermined value TREQb1, which is the smallest value of the first to third predetermined values, the reward value Rw_lp is linearly set to a larger value as the value of Fdlp is smaller in the whole range of the normalized low-pressure EGR difference Fdlp ($0 \leq Fdlp \leq 1.0$).

Further, when the demanded torque TREQb takes the second predetermined value TREQb2, which is the intermediate value, the slope of the reward value Rw_lp with respect to the normalized low-pressure EGR difference Fdlp is set to a larger vale in a range of $0 \leq Fdlp \leq$ a first predetermined value Fdlp1, whereas in a range of Fdlp>the first predetermined value Fdlp1, it is set to a smaller value. Further, when the demanded torque TREQb takes the third predetermined value TREQb3, which is the largest value, the slope of the reward value Rw_lp with respect to the normalized low-pressure EGR difference Fdlp is set to a larger vale in a range of $0 \leq Fdlp \leq$ a second predetermined value Fdlp2, whereas in a range of Fdlp>Fdlp2, it is set to a smaller value. Furthermore, the first and second predetermined values Fdlp1 and Fdlp2 are set to values which satisfy the relationship of $0 < Fdlp2 < Fdlp1 < 1.0$.

As is apparent from the above description, in the FIG. 29 map, as the demanded torque TREQb is smaller, a range where the slope of the reward value Rw_lp with respect to the normalized low-pressure EGR difference Fdlp is relatively large is set to be larger. This is because as the demanded torque TREQb is smaller, i.e. as the load on the engine 81 is lower, the sensitivity of the low-pressure EGR gas flow rate LPEGR to the target low-pressure throttle valve opening LPTH_cmd is higher, and hence the above-mentioned range is set to be larger in order to set the reward value Rw_lp in a fine-grained manner in a larger range of the normalized low-pressure EGR difference Fdlp.

In a step 144 following the step 143, the weighting factor ωd is learned by reinforcement learning based on the reward value Rw_lp calculated in the step 143. This learning is performed as follows: First, the weighting factor ωd having been set at each current time (the immediately preceding value thereof) is stored sequentially in each of the plurality of buffers as the learned value ωdG of the weighting factor in association with the calculated reward value Rw_lp. Then, the weighting factor ωd (the current value thereof) is set at random to one of a plurality of predetermined values different from each other which are set in advance empirically, e.g. by experiment. If this time is a first loop after the start of the learning, as is apparent from the step 138, the weighting factor ωd has not yet been set, so that the learned value ωdG is set to 0, and is stored in association with the reward value Rw_lp.

In a step 145 following the step 144, the provisional value LPTH_smc_cmd of the target low-pressure throttle valve opening is set to the learning target low-pressure TH opening LPTH_cmdG set in the step 129. Then, in a step 146, the second interaction suppression value LPTH_dc_cmd is calculated, as described in the description of the second interaction suppression value-calculating section 106. More specifically, the second interaction suppression value LPTH_dc_cmd is calculated by a neural network using, as inputs, the operating condition parameters, such as the engine speed NEb, the low-pressure EGR gas flow rate difference Dlp calculated in the step 139, the provisional value HPTH_smc_cmd of the target high-pressure throttle valve opening set in the step 135, and so forth.

Next, the target low-pressure throttle valve opening LPTH_cmd is calculated by adding the second interaction suppression value LPTH_dc_cmd calculated in the step 146 to the provisional value LPTH_smc_cmd set in the step 145 (step 147), followed by terminating the present process. Along with execution of the step 147, the low-pressure throttle valve opening LPTH is controlled by the low-pressure TH controller 112 such that it converges to the target low-pressure throttle valve opening LPTH_cmd. Furthermore, the low-pressure EGR control valve opening LPVT is held at a target value thereof calculated when the learning target low-pressure TH opening LPTH_cmdG has been set.

As described above, when the second learning preparation operation is completed (YES to the step 122), the correction by the first interaction suppression value HPTH_dc_cmd is stopped in the same manner as during the execution of the second learning preparation operation, and the high-pressure throttle valve opening HPTH is controlled such that it is changed in a stepped manner from the first predetermined value HPTHREF1 to the fixed second predetermined value HPTHREF2, and is then held at the second predetermined value HPTHREF2 (step 136). Further, the target low-pressure throttle valve opening LPTH_cmd is held at the learning target low-pressure TH opening LPTH_cmdG (step 138). As described hereinabove, the learning target low-pressure TH opening LPTH_cmdG is set to such a value that will cause the low-pressure EGR gas flow rate LPEGR to converge to the learning target low-pressure EGR gas flow rate Tgt_lpegr in a state where the high-pressure throttle valve opening HPTH is held at the first predetermined value HPTHREF1. As is apparent from the above, the low-pressure EGR gas flow rate LPEGR is changed by execution of the steps 136 and 138 such that it deviates from the learning target low-pressure EGR gas flow rate Tgt_lpegr. Further, in this case, the amount of deviation of the low-pressure EGR gas flow rate LPEGR from the learning target low-pressure EGR gas flow rate Tgt_lpegr excellently represents the amount of change of the low-pressure EGR gas flow rate LPEGR caused by interaction of the target high-pressure throttle valve opening HPTH_cmd.

When the standby time period TMDELd has elapsed after completion of the second learning preparation operation (YES to the step 137), the learning of the weighting factor ωd is started (the step 139 and the steps 142 to 144). The reason for starting the learning of the weighting factor ωd after waiting for the standby time period TMDELd to elapse after completion of the second learning preparation operation is to perform the learning in a state where the low-pressure EGR gas flow rate LPEGR is positively deviated from the learning target low-pressure EGR gas flow rate Tgt_lpegr by the execution of the steps 136 and 138, that is, in a state where influence of the interaction of the target high-pressure throttle valve opening HPTH_cmd is positively reflected on the low-pressure EGR gas flow rate LPEGR.

Further, during the above learning, the reward value Rw_lp is calculated to be a larger value as the normalized low-pressure EGR difference Fdlp proportional to the absolute value |Dlp| of the low-pressure EGR gas flow rate difference is smaller (step 143). Furthermore, the weighting factor ωd obtained at each current time, i.e. the immediately preceding value of the weighting factor ωd is stored sequentially in each of the buffers as the learned value ωdG of the weighting factor in association with the current reward value Rw_lp, and the current value of the weighting factor ωd is set at random to one of the plurality of predetermined values (step 144).

Then, the second interaction suppression value LPTH_dc_cmd is calculated using the neural network to which the weighting factor ωd set as described above is applied (step 146). Further, the target low-pressure throttle valve opening LPTH_cmd is calculated by adding the calculated second interaction suppression value LPTH_dc_cmd to the provisional value LPTH_smc_cmd set to the learning target low-pressure TH opening LPTH_cmdG (step 147). That is, the target low-pressure throttle valve opening LPTH_cmd is corrected based on the second interaction suppression value LPTH_dc_cmd.

On the other hand, if the answer to the question of the step 140 is affirmative (YES), i.e. if the low-pressure EGR gas flow rate difference Dlp is within the above-mentioned predetermined range defined by the first and second predetermined values stlpL and stlpH, it is determined whether or not the timer value tSTBd of the stabilization timer set in the step 141 is equal to 0 (step 148). If the answer to this question is negative (NO), the above-mentioned step 142 et seq. are executed.

On the other hand, if the answer to the question of the step 148 has become affirmative (YES) (tSTBd=0), i.e. if the state where the low-pressure EGR gas flow rate difference Dlp is within the predetermined range defined by the first and second predetermined values stlpL and stlpH has continued for the stabilization time period TSTBd, it is determined that the low-pressure EGR gas flow rate LPEGR is stable in a state substantially converged to the learning target low-pressure EGR gas flow rate Tgt_lpegr, and it is determined that the learning of the weighting factor ωd has been completed. Then, one of the weighting factors ωdG stored in the step 144, which is associated with the largest one of the reward values Rw_lp, is read out, and is set as the weighting factor ωd to thereby update the weighting factor ωd (step 148A). Subsequently, to indicate the completion of the learning, the second learning completion flag F_LEDONEd is set to 1 (step 149), followed by terminating the present process. Further, after execution of the step 149, the answer to the question of the step 121 in FIG. 27 becomes affirmative (YES). In this case, the present process is immediately terminated.

On the other hand, if the answer to the question of the step 134 has become affirmative (YES) (tLEAd=0), i.e. if the learning time period TLEAd has elapsed after completion of the second learning preparation operation, the learning of the weighting factor ωd in the step 144, etc., has been sufficiently performed, and hence it is determined that the learning has completed. Then, by executing the step 148A, the one of the stored weighting factors ωdG, which is associated with the largest one of the reward values Rw_lp, is set as the weighting factor ωd to thereby update the weighting factor ωd, whereafter to indicate completion of the learning, the step 149 is executed, followed by terminating the present process.

As described above, if one of the condition that the state where the low-pressure EGR gas flow rate difference Dlp is within the predetermined range has continued for the stabilization time period TSTBd, and the condition that the learning time period TLEAd has elapsed after completion of the second learning preparation operation is satisfied, it is determined at the time point that the learning has completed.

The above-described second embodiment corresponds to the invention as claimed in claims 1 to 3 and 5 ((hereinafter generically referred to as the "second invention"). Correspondence between elements of the second embodiment and elements of the second invention are as follows: The ECU 72 and the first and second controllers 103 and 104 of the second embodiment correspond to the control input-calculating means of the second invention; the ECU 72 and the first and second interaction suppression value-calculating sections 105 and 106 of the second embodiment correspond to the interaction suppression parameter-calculating means of the second invention; and the ECU 72 and the first and second adders 107 and 108 of the second embodiment correspond to correction means of the second invention.

Further, the ECU 72 and the target value-calculating section 101 of the second embodiment correspond to the target value-setting means of the second invention; the intake pressure sensor 25, the exhaust pressure sensor 34, the low-pressure EGR opening sensor 36, the exhaust temperature sensor 35, the intake chamber pressure sensor 31, the exhaust manifold pressure sensor 28, the high-pressure EGR opening sensor 37, the exhaust manifold temperature sensor 29, and the ECU 72 of the second embodiment correspond to controlled variable-detecting means of the second invention. Further, the ECU 72 and the learning section 121 of the second embodiment correspond to learning means of the second invention; the low-pressure EGR device 90, the low-pressure throttle valve 84, and the low-pressure TH actuator 84a of the second embodiment correspond to first EGR device of the second invention; and the high-pressure EGR device 91, the high-pressure throttle valve 87, and the high-pressure TH actuator 87a of the second embodiment correspond to second EGR device of the second invention.

Further, the target low-pressure throttle valve opening LPTH_cmd and the target high-pressure throttle valve opening HPTH_cmd correspond to control inputs of the second invention, and the low-pressure EGR gas flow rate LPEGR and the high-pressure EGR gas flow rate HPEGR correspond to controlled variables of the second invention. Furthermore, the first and second interaction suppression value HPTH_dc_cmd and LPTH_dc_cmd correspond to interaction suppression parameters of the second invention, and the target low-pressure EGR gas flow rate LPEGR_cmd and the target high-pressure EGR gas flow rate HPEGR_cmd of the second embodiment correspond to target values of the second invention.

Further, the reward values Rw_hp and Rw_lp of the second embodiment correspond to rewards of the second invention, and the weighting factors ωc and ωd of the second embodiment correspond to neuron parameters of the second invention. The learning target high-pressure TH opening HPTH_cmdG and the learning target low-pressure TH opening LPTH_cmdG of the second embodiment correspond to values calculated immediately before the start of learning of the neuron parameters according to the second invention, and the learning target high-pressure EGR gas flow rate Tgt_hpegr and the learning target low-pressure EGR gas flow rate Tgt_lpegr of the second embodiment correspond to target values set immediately before the start of the learning of the neuron parameters according to the second invention. Further, the target low-pressure throttle valve opening LPTH_cmd of the second embodiment corresponds to first EGR control parameter of the second invention, and the target high-pressure throttle valve opening HPTH_cmd of the second embodiment corresponds to second EGR control parameter of the second invention. Furthermore, the low-pressure EGR gas flow rate LPEGR and the high-pressure EGR gas flow rate HPEGR of the second embodiment correspond to the flow rate of the first EGR gas and the flow rate of the second EGR gas, respectively.

As described above, according to the second embodiment, in the plant 111 including the engine 81, interaction occurs between the target low-pressure throttle valve opening LPTH_cmd and the target high-pressure throttle valve opening HPTH_cmd as control inputs, and between the low-pressure EGR gas flow rate LPEGR and the high-pressure EGR gas flow rate HPEGR as controlled variables. Further, the first interaction suppression value HPTH_dc_cmd is calculated using the neural network which is constructed by using the provisional value LPTH_smc_cmd of the target low-pressure throttle valve opening as an input and the first interaction suppression value HPTH_dc_cmd as an output. Furthermore, the target high-pressure throttle valve opening HPTH_cmd is corrected based on the calculated first interaction suppression value HPTH_dc_cmd. Further, the second interaction suppression value LPTH_dc_cmd is calculated using the neural network which is constructed by using the provisional value HPTH_smc_cmd of the target high-pressure throttle valve opening as an input and the second interaction suppression value LPTH_dc_cmd as an output. Furthermore, the target low-pressure throttle valve opening LPTH_cmd is corrected based on the calculated second interaction suppression value LPTH_dc_cmd.

With the above, it is possible to properly correct the target low-pressure throttle valve opening LPTH_cmd and the target high-pressure throttle valve opening HPTH_cmd such that the interaction therebetween is suppressed. In this case, although the plant 111 includes the engine 81, which is a nonlinear system, the neural network has a characteristic that it can model the nonlinear system properly and easily, so that it is possible to construct respective neural networks for calculating the first and second interaction suppression values HPTH_dc_cmd and LPTH_dc_cmd properly and easily. With the above, in the plant 111, which is the nonlinear system, it is possible to properly suppress the interaction occurring between the target low-pressure throttle valve opening LPTH_cmd and the target high-pressure throttle valve opening HPTH_cmd, and the low-pressure EGR gas flow rate LPEGR and the high-pressure EGR gas flow rate HPEGR, whereby it is possible to properly control the low-pressure EGR gas flow rate LPEGR and the high-pressure EGR gas flow rate HPEGR and design the control system 71 with ease.

Further, the weighting factors $\omega c$ and $\omega d$ used in the neural networks are learned separately from each other, i.e. on a neural network-by-neural network basis. Furthermore, before learning of the weighting factor $\omega c$, the target high-pressure throttle valve opening HPTH_cmd is calculated with the response-specifying control algorithm, which is a feedback control algorithm, such that the calculated high-pressure EGR gas flow rate HPEGR becomes equal to the target high-pressure EGR gas flow rate HPEGR_cmd. Further, the target low-pressure throttle valve opening LPTH_cmd is held at the fixed first predetermined value LPTHREF1, and the correction of the target high-pressure throttle valve opening HPTH_cmd based on the first interaction suppression value HPTH_dc_cmd and the correction of the target low-pressure throttle valve opening LPTH_cmd based on the second interaction suppression value LPTH_dc_cmd are stopped. With the above, the high-pressure EGR gas flow rate HPEGR is held in the state converged to the target high-pressure EGR gas flow rate HPEGR_cmd.

Then, when the learning of the weighting factor $\omega c$ is started, the target low-pressure throttle valve opening LPTH_cmd is held at the second predetermined value LPTHREF2, and the correction of the target low-pressure throttle valve opening LPTH_cmd based on the second interaction suppression value LPTH_dc_cmd is stopped. Further, the provisional value HPTH_smc_cmd of the target high-pressure throttle valve opening is not calculated with the response-specifying control algorithm, but is set to the learning target high-pressure TH opening HPTH_cmdG calculated immediately before the start of the learning of the weighting factor $\omega c$, and is held thereat. With the above, at the start of the learning of the weighting factor $\omega c$, the high-pressure EGR gas flow rate HPEGR, which has been held in a state converged to the learning target high-pressure EGR gas flow rate Tgt_hpegr, which is the target high-pressure EGR gas flow rate HPEGR_cmd set immediately before the start of the learning, deviates from the learning target high-pressure EGR gas flow rate Tgt_hpegr. Further, during the learning of the weighting factor $\omega c$, the high-pressure EGR gas flow rate difference Dhp is calculated as the difference between the learning target high-pressure EGR gas flow rate Tgt_hpegr and the high-pressure EGR gas flow rate HPEGR. As described above, at the start of the learning of the weighting factor $\omega c$, the high-pressure EGR gas flow rate difference Dhp excellently represents the amount of change of the high-pressure EGR gas flow rate HPEGR caused by interaction of the target low-pressure throttle valve opening LPTH_cmd.

Further, during the learning of the weighting factor $\omega c$, the weighting factor $\omega c$ is set to one of the plurality of predetermined values, and the first interaction suppression value HPTH_dc_cmd is calculated using the neural network to which the set weighting factor $\omega c$ is applied. Then, the high-pressure EGR gas flow rate HPEGR is controlled using the target high-pressure throttle valve opening HPTH_cmd corrected by the calculated first interaction suppression value HPTH_dc_cmd. Further, as the normalized high-pressure EGR difference Fdhp obtained by the control of the high-pressure EGR gas flow rate HPEGR is smaller, i.e. as the absolute value |Dhp| of the high-pressure EGR gas flow rate difference is smaller, the reward value Rw_hp is calculated to be a larger value, and the weighting factor $\omega c$ is sequentially stored as the learned value $\omega cG$ in association with the reward value Rw_hp. Furthermore, the weighting factor $\omega c$ is updated to one of the stored learned values $\omega cG$, which is associated with the largest one of the reward values Rw_hp, that is, the learned value $\omega cG$ at which the absolute value |Dhp| of the high-pressure EGR gas flow rate difference, which is the difference between the learning target high-pressure EGR gas flow rate Tgt_hpegr and the high-pressure EGR gas flow rate HPEGR, is minimized, whereby the learning of the weighting factor $\omega c$ is completed.

As described above, reinforcement learning of the weighting factor ωc is performed using the reward value Rw_hp based on the high-pressure EGR gas flow rate difference Dhp such that the high-pressure EGR gas flow rate HPEGR, which is controlled using the target high-pressure throttle valve opening HPTH_cmd corrected by the first interaction suppression value HPTH_dc_cmd, becomes equal to the learning target high-pressure EGR gas flow rate Tgt_hpegr. This makes it possible to properly learn the weighting factor ωc.

Further, the learning of the weighting factor ωd is performed similarly to the case of the weighting factor ωd. That is, before learning the weighting factor ωc, the target low-pressure throttle valve opening LPTH_cmd is calculated with the response-specifying control algorithm such that the calculated low-pressure EGR gas flow rate LPEGR becomes equal to the target low-pressure EGR gas flow rate LPEGR_cmd. Furthermore, the target high-pressure throttle valve opening HPTH_cmd is held at the fixed first predetermined value HPTHREF1. The correction of the target low-pressure throttle valve opening LPTH_cmd using the second interaction suppression value LPTH_dc_cmd and the correction of the target high-pressure throttle valve opening HPTH_cmd using the first interaction suppression value HPTH_dc_cmd are stopped. With the above, the low-pressure EGR gas flow rate LPEGR is held in a state converged to the target low-pressure EGR gas flow rate LPEGR_cmd.

Then, when the learning of the weighting factor ωd is started, the target high-pressure throttle valve opening HPTH_cmd is held at the second predetermined value HPTHREF2, and the correction of the target high-pressure throttle valve opening HPTH_cmd based on the first interaction suppression value HPTH_dc_cmd is stopped. Further, the provisional value LPTH_smc_cmd of the target low-pressure throttle valve opening is not calculated with the response-specifying control algorithm, but is set to the learning target low-pressure TH opening LPTH_cmdG calculated immediately before the start of the learning of the weighting factor ωd, and is held thereat. With the above, at the start of the learning of the weighting factor ωd, the low-pressure EGR gas flow rate LPEGR, which has been held in a state converged to the learning target low-pressure EGR gas flow rate Tgt_lpegr, which is the target low-pressure EGR gas flow rate LPEGR_cmd set immediately before the start of the learning of the weighting factor ωd, deviates from the learning target low-pressure EGR gas flow rate Tgt_lpegr. Further, during the learning of the weighting factor ωd, the low-pressure EGR gas flow rate difference Dlp is calculated as the difference between the learning target low-pressure EGR gas flow rate Tgt_lpegr and the low-pressure EGR gas flow rate LPEGR. As described above, at the start of the learning of the weighting factor ωd, the low-pressure EGR gas flow rate difference Dlp excellently represents the amount of change of the low-pressure EGR gas flow rate LPEGR caused by interaction of the target high-pressure throttle valve opening HPTH_cmd.

Further, during the learning of the weighting factor ωd, the weighting factor ωd is set to one of the plurality of predetermined values. The second interaction suppression value LPTH_dc_cmd is calculated using the neural network to which the set weighting factor ωd is applied, and the low-pressure EGR gas flow rate LPEGR is controlled using the target low-pressure throttle valve opening LPTH_cmd corrected by the calculated second interaction suppression value LPTH_dc_cmd. Further, as the normalized low-pressure EGR difference Fdlp obtained by the control of the low-pressure EGR gas flow rate LPEGR is smaller, i.e. as the absolute value |Dlp| of the low-pressure EGR gas flow rate difference is smaller, the reward value Rw_lp is calculated to be a larger value, and the weighting factor ωd is sequentially stored as the learned value ωdG in association with the reward value Rw_lp. Furthermore, the weighting factor ωd is updated to one of the stored learned values ψdG, which is associated with the largest one of the reward values Rw_lp, that is, the learned value ωdG at which the absolute value |Dlp| of the low-pressure EGR gas flow rate difference, which is the difference between the learning target low-pressure EGR gas flow rate Tgt_lpegr and the low-pressure EGR gas flow rate LPEGR, is minimized, whereby the learning of the weighting factor ωd is completed.

As described above, the reinforcement learning of the weighting factor ωd is performed using the reward value Rw_lp based on the low-pressure EGR gas flow rate difference Dlp such that the low-pressure EGR gas flow rate LPEGR, which is controlled using the target low-pressure throttle valve opening LPTH_cmd corrected by the second interaction suppression value LPTH_dc_cmd, becomes equal to the learning target low-pressure EGR gas flow rate Tgt_lpegr. This makes it possible to properly learn the weighting factor ωd.

According to the second embodiment, the target high-pressure throttle valve opening HPTH_cmd and the target low-pressure throttle valve opening LPTH_cmd are corrected based on the first and second interaction suppression values HPTH_dc_cmd and LPTH_dc_cmd calculated using the neural networks that perform learning as described above, respectively, so that it is possible to more properly suppress the interaction.

The reinforcement learning is used as a method of learning the weighting factors ωc and ωd, so that similarly to the first embodiment, it is possible to design the control system 71 more easily. For the same reason, even when neural networks for a plurality of control inputs and a plurality of controlled variables, different from each other e.g. in the manner of interaction, are constructed on a control input-by-control input and controlled variable-by-controlled variable basis, there is no need, differently from the above-described conventional case, to set model equations from the beginning, which makes it possible to construct the neural networks with ease. Therefore, in this case as well, the control system can be easily designed.

Further, since the first and second interaction suppression values HPTH_dc_cmd and LPTH_dc_cmd are calculated according to the above-mentioned operating condition parameters (the engine speed NEb, the demanded torque TREQb, etc.), it is possible to properly calculate HPTH_dc_cmd and LPTH_dc_cmd while reflecting the operating conditions of the engine 81 thereon.

Although in the second embodiment, the response-specifying control algorithms are used as feedback control algorithms for calculating the provisional value LPTH_smc_cmd of the target low-pressure throttle valve opening and the provisional value HPTH_smc_cmd of the target high-pressure throttle valve opening as control inputs, this is not limitative, but there may be used other suitable feedback control algorithms, such as PID control algorithms.

Further, although in the second embodiment, the provisional values LPTH_smc_cmd and HPTH_smc_cmd are calculated with the feedback control algorithms such that the low-pressure EGR gas flow rate LPEGR and the high-pressure EGR gas flow rate HPEGR as calculated controlled variables become equal to the target low-pressure EGR gas flow rate LPEGR_cmd and the target high-pressure EGR gas flow rate HPEGR_cmd, respectively, the provisional values LPTH_smc_cmd and HPTH_smc_cmd may be calculated by searching maps according to the target low-pressure EGR gas flow rate LPEGR_cmd and the target high-pressure EGR gas flow rate HPEGR_cmd, respectively. In this case, for calculations of the high-pressure EGR gas flow rate difference Dhp and the low-pressure EGR gas flow rate difference Dlp during learning of the weighting factors ωc and ωd, the target high-pressure EGR gas flow rate HPEGR_cmd and the target low-pressure EGR gas flow rate LPEGR_cmd calculated at each time are used in place of the learning target high-pressure EGR gas flow rate Tgt_hpegr and the learning target low-pressure EGR gas flow rate Tgt_lpegr, respectively.

Furthermore, although in the second embodiment, the low-pressure EGR gas flow rate LPEGR and the high-pressure EGR gas flow rate HPEGR are calculated by computation, they may be each directly detected using a sensor. In this case, a hot-wire sensor, a vane sensor, or a Karman sensor is used as the sensor. Further, although in the second embodiment, the reward values Rw_hp and Rw_lp are linearly set based on the normalized high-pressure EGR difference Fdhp and the normalized low-pressure EGR difference Fdlp, respectively, they may be nonlinearly set.

Further, although in the second embodiment, the normalized high-pressure EGR difference Fdhp is used as a parameter for calculating the reward value Rw_hp, the high-pressure EGR gas flow rate difference Dhp or the absolute value |Dhp| thereof may be used. Alternatively, as the parameter for calculating the reward value Rw_hp, there may be used another suitable parameter indicative of a result of comparison between the learning target high-pressure EGR gas flow rate Tgt_hpegr and the high-pressure EGR gas flow rate HPEGR, e.g. a ratio of one of the learning target high-pressure EGR gas flow rate Tgt_hpegr and the high-pressure EGR gas flow rate HPEGR to the other thereof.

This also applies to the reward value Rw_lp. More specifically, the low-pressure EGR gas flow rate difference Dlp or the absolute value |Dlp| thereof may be used as a parameter for calculating the reward value Rw_lp. Alternatively, as the parameter for calculating the reward value Rw_lp, there may be used another suitable parameter indicative of a result of comparison between the learning target low-pressure EGR gas flow rate Tgt_lpegr and the low-pressure EGR gas flow rate LPEGR, e.g. a ratio of one of the learning target low-pressure EGR gas flow rate Tgt_lpegr and the low-pressure EGR gas flow rate LPEGR to the other thereof.

Furthermore, as a parameter input to the neural network so as to calculate the first interaction suppression value HPTH_dc_cmd, there may be used, in addition to the aforementioned various parameters, a time period having elapsed after a time point when the low-pressure throttle valve opening LPTH started to change from a fixed state. Since the high-pressure EGR gas flow rate HPEGR changes with a response delay with respect to the change of the low-pressure throttle valve opening LPTH, it is possible to properly calculate the first interaction suppression value HPTH_dc_cmd while favorably reflecting such a response delay thereon. Similarly, as a parameter input to the neural networks so as to calculate the second interaction suppression value LPTH_dc_cmd, there may be used a time period having elapsed after a time point when the high-pressure throttle valve opening HPTH has started to change from a fixed state. Since the low-pressure EGR gas flow rate LPEGR changes with a response delay with respect to the change of the high-pressure throttle valve opening HPTH, it is possible to properly calculate the second interaction suppression value LPTH_dc_cmd while favorably reflecting such a response delay thereon.

Further, in the second embodiment, when one of the condition that the state where the high-pressure EGR gas flow rate difference Dhp is within the predetermined range has continued for the stabilization time period TSTBc, and the condition that the learning time period TLEAc has elapsed after completion of the first learning preparation operation is satisfied, the weighting factor ωc is updated to one of the plurality of learned values ωcG stored up to the time, which is associated with the largest one of the reward values Rw_hp, whereby the weighting factor ωc is learned, but the weighting factor ωc may be learned as follows: Also when one of the above-described two conditions is satisfied, the reward value Rw_hp is calculated, and the weighting factor ωc having been set at the time is stored as the learned value ωcG in association with the calculated reward value Rw_hp. Then, the weighting factor ωc is updated to one of the learned values ωcG including the stored current learned value ωcG, which is associated with the largest one of the reward values Rw_hp, whereby the learn of the weighting factor ωc may be performed.

This also applies to the weighting factor ωd. More specifically, also when one of the condition that the state where the low-pressure EGR gas flow rate difference Dlp is within the predetermined range has continued for the stabilization time period TSTBd, and the condition that the learning time period TLEAd has elapsed after completion of the second learning preparation operation is satisfied, the reward value Rw_lp is calculated, and the weighting factor ωd having been set at the time is stored as the learned value ωdG in association with the calculated reward value Rw_lp. Then, the weighting factor ωd is updated to one of a plurality of learned values ωdG including the stored current learned value ωdG, which is associated with the largest one of the reward values Rw_lp, whereby the learning of the weighting factor ωd may be performed.

Furthermore, although in the second embodiment, whenever the reward value Rw_hp is calculated, the learned value ωcG is stored, and the weighting factor ωc is updated to one of the stored learned values ωcG, which is associated with the largest one of the calculated reward values Rw_hp, only when the currently calculated reward value Rw_hp is larger than the reward values Rw_hp calculated up to the time, the weighting factor ωc having been set at the time may be stored as the learned values ωcG, to update the learned values ωcG, as occasion arises, and the weighting factor ωc may be updated to the stored learned value ωcG. This makes it possible to obtain the same advantageous effects as described above.

This also applies to the learned value ωdG. More specifically, only when the currently calculated reward value Rw_lp is larger than the reward values Rw_lp calculated up to the time, the weighting factor ωd having been set at the time may be stored as the learned values ωdG, to update the learned values ωdG, as occasion arises, and the weighting factor ωd may be updated to the stored learned value ωdG.

Further, although in the second embodiment, the setting of the weighting factor ωc for learning and the storage of the learned value ωcG (step 104) are performed whenever the first learning process is executed (at the control period ΔT), the high-pressure EGR gas flow rate HPEGR changes with a response delay with respect to the change of the high-pressure throttle valve opening HPTH, and hence the setting of the weighting factor ωc and the storage of the learned value ωcG may be performed whenever a predetermined time period dependent on the response delay elapses. Similarly, although in the second embodiment, the setting of the weighting factor ωd for learning and the storage of the learned value ωdG (step 144) are performed whenever the second learning process is executed (at the control period ΔT), the low-pressure EGR gas flow rate LPEGR changes with a response delay with respect to the change of the low-pressure throttle valve opening LPTH, and hence the setting of the weighting factor ωd and the storage of the learned value ωdG may be performed whenever a predetermined time period dependent on the response delay elapses.

The present invention is by no means limited to the first and second embodiments described above (hereinafter generically referred to as the "embodiment"), but can be practiced in various forms. For example, although in the embodiment, the hierarchical neural network NN is employed, another suitable neural networks, such as an interconnection neural network may be employed. Further, although in the embodiment, reinforcement learning is used as the method of learning the weighting factors ωa, ωb, ωc and d, another suitable learning method, such as the error back-propagation method, may be employed.

Furthermore, although in the embodiment, the learning is performed using the engine 3 or 81, the learning may be performed using an engine simulator. Further, although in the embodiment, only the weighting factors ωa, ωb, ωc, and ωd are learned, this is not limitative, but in place of or in combination with the weighting factors, there may be learned at least one of the slope gains βA, βb, βc, and βd, the offset values εa, εb, εc, and εd, the output gains αa, αb, αc, and αd, the slope gains γa, γb, γc, and γd, and the offset values δa, δb, δc, and δd.

Further, although in the embodiment, both the number of the control inputs and that of the controlled variables are two, they may be set as desired insofar as a plurality of control inputs and a plurality of controlled variables are used and interaction occurs therebetween. In this case, the ratio of the number of the control inputs and that of the controlled variables are not necessarily 1:1. For example, it is possible to apply the present invention to a plant in which each of two controlled variables is controlled by two or more control inputs. Further, although in the embodiment, the present invention is applied to the plant including the engine 3 or 81, by way of example, this is not limitative, but the present invention can be applied to any suitable plant of an interacting system for other industrial machines.

It is further understood by those skilled in the art that the foregoing are preferred embodiments of the invention, and that various changes and modifications may be made without departing from the spirit and scope thereof.

What is claimed is:

1. A control system for a plant in which a plurality of controlled variables are controlled by a plurality of control inputs, respectively, and interaction occurs between the plurality of control inputs and the plurality of controlled variables, comprising:

control input-calculating means for calculating each of the plurality of control inputs; interaction suppression parameter-calculating means for calculating a plurality of interaction suppression parameters for respectively correcting the control inputs such that the interaction is suppressed, wherein each interaction suppression parameter is output from a neural network having inputs that are control inputs other than a control input corrected by the outputted interaction suppression parameter; and correction means for correcting each of the plurality of control inputs calculated by said control input-calculating means, based on an associated one of the calculated interaction suppression parameters.

2. The control system as claimed in claim 1, further comprising target value-setting means for setting a plurality of target values that serve as respective targets of the controlled variables, wherein said control input-calculating means calculates the plurality of control inputs such that the plurality of controlled variables become equal to the plurality of target values set by said target value-setting means, respectively, the control system further comprising:

controlled variable-detecting means for detecting each of the plurality of controlled variables; and learning means for learning neuron parameters, which are parameters used in the neural networks, by reinforcement learning that uses rewards based on results of comparison between the detected controlled variables and the target values, such that each of the plurality of controlled variables controlled by the control inputs corrected by the interaction suppression parameters becomes equal to an associated one of the plurality of target values.

3. The control system as claimed in claim 2, wherein said learning means learns each neuron parameter on a neural network-by-neural network basis, wherein before said learning means learns the neuron parameter, said control input-calculating means calculates a learning target control input, which is, out of the plurality of control inputs, a control input which is corrected by an interaction suppression parameter associated with one of the neural networks, which learns the neuron parameter, with a predetermined feedback control algorithm, such that an associated one of the plurality of controlled variables detected by said controlled variable-detecting means becomes equal to an associated one of the target values, and holds a non-learning target control input, which is, out of the plurality of control inputs, a control input other than the learning target control input, at a fixed first predetermined value, said correction means stopping correction of the plurality of control inputs, and wherein during learning of the neuron parameter, said control input-calculating means holds the learning target control input at a value calculated immediately before the start of the learning of the neuron parameter, and holds the non-learning target control input at a fixed second predetermined value different from the first predetermined value, said correction means correcting the learning target control input based on the interaction suppression parameter associated with the neural network that learns the neuron parameter, and stopping the correction based on interaction suppression parameters associated with other neural networks than the neural network, said learning means performing the reinforcement learning by using a reward based on a result of comparison between the detected controlled variable and the target value of the controlled variable, such that the controlled variable controlled by the corrected learning target control input becomes equal to the target value set immediately before the start of the learning of the neuron parameter.

4. The control system as claimed in claim 1, wherein the plant includes an internal combustion engine provided with a throttle valve mechanism for changing a degree of opening of a throttle valve, and a variable valve lift mechanism for changing a lift of intake valves, wherein the plurality of control inputs are an opening control parameter for controlling the degree of opening of the throttle valve and a lift control parameter for controlling the lift of the intake valves, and wherein the plurality of controlled variables are a pressure within an intake passage of the engine and an amount of intake air drawn into the engine.

5. The control system as claimed in claim 1, wherein the plant includes an internal combustion engine provided with a first EGR device for recirculating part of burned gases into an intake passage as a first EGR gas, and a second EGR device for recirculating part of burned gases to a location in the intake passage closer to cylinders than said first EGR device is, wherein the plurality of control inputs are a first EGR control parameter for controlling said first EGR device, and a second EGR control parameter for controlling said second EGR device, and wherein the plurality of controlled variables are a flow rate of the first EGR gas, and a flow rate of the second EGR gas.

* * * * *